United States Patent
Chaturvedi et al.

(10) Patent No.: US 8,352,563 B2
(45) Date of Patent: Jan. 8, 2013

(54) SYSTEM AND METHOD FOR PEER-TO-PEER MEDIA ROUTING USING A THIRD PARTY INSTANT MESSAGING SYSTEM FOR SIGNALING

(75) Inventors: Sivakumar Chaturvedi, Allen, TX (US); Satish Gundabathula, Irving, TX (US)

(73) Assignee: Damaka, Inc., Richardson, TX (US)

( * ) Notice: Subject to any disclaimer, the term of this patent is extended or adjusted under 35 U.S.C. 154(b) by 509 days.

(21) Appl. No.: 12/770,482

(22) Filed: Apr. 29, 2010

(65) Prior Publication Data

US 2011/0270932 A1      Nov. 3, 2011

(51) Int. Cl.
G06F 15/16    (2006.01)
H04L 12/28    (2006.01)

(52) U.S. Cl. .................................. 709/206; 370/389

(58) Field of Classification Search .................. None
See application file for complete search history.

(56) References Cited

U.S. PATENT DOCUMENTS

| | | |
|---|---|---|
| 5,442,637 A | 8/1995 | Nguyen |
| 5,761,309 A | 6/1998 | Ohashi et al. |
| 5,790,637 A | 8/1998 | Johnson et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,202,084 B1 | 3/2001 | Kumar et al. |
| 6,219,638 B1 | 4/2001 | Padmanabhan et al. |
| 6,311,150 B1 | 10/2001 | Ramaswamy et al. |
| 6,343,067 B1 | 1/2002 | Drottar et al. |
| 6,360,196 B1 | 3/2002 | Poznaski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,741,691 B1 | 5/2004 | Ritter et al. |
| 6,766,373 B1 | 7/2004 | Beadle et al. |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |

(Continued)

FOREIGN PATENT DOCUMENTS

EP    1404082 A2    3/2004

(Continued)

OTHER PUBLICATIONS

Chathapuram, "Security in Peer-To-Peer Networks", Aug. 8. 2001, XP002251813.

(Continued)

*Primary Examiner* — Peling Shaw
(74) *Attorney, Agent, or Firm* — Howison & Arnott, L.L.P.

(57) ABSTRACT

An improved system and method are disclosed for peer-to-peer communications. In one example, the method enables an endpoint to engage in a call with another endpoint using a third party instant message system to carry instant messages containing signaling information and a route that is external to the third party instant message system for both signaling and media information.

24 Claims, 37 Drawing Sheets

U.S. PATENT DOCUMENTS

| | | |
|---|---|---|
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,013,155 B1 | 3/2006 | Ruf et al. |
| 7,079,529 B1 | 7/2006 | Khuc |
| 7,080,158 B1 | 7/2006 | Squire |
| 7,117,526 B1 | 10/2006 | Short |
| 7,184,415 B2 | 2/2007 | Chaney et al. |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,512,652 B1 | 3/2009 | Appelman et al. |
| 7,542,472 B1 | 6/2009 | Gerendai et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,664,495 B1 | 2/2010 | Bonner et al. |
| 7,778,187 B2 | 8/2010 | Chaturvedi et al. |
| 8,009,586 B2 | 8/2011 | Chaturvedi et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0143548 A1 | 10/2002 | Korall et al. |
| 2002/0150110 A1 | 10/2002 | Inbar et al. |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | LaVallee et al. |
| 2004/0044517 A1 | 3/2004 | Palmquist |
| 2004/0052234 A1 | 3/2004 | Ameigeiras et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0143678 A1 | 7/2004 | Chari et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0136911 A1 | 6/2005 | Csapo et al. |
| 2005/0138119 A1 | 6/2005 | Saridakis |
| 2005/0143105 A1 | 6/2005 | Okamoto |
| 2005/0187957 A1 | 8/2005 | Kramer et al. |
| 2005/0195802 A1 | 9/2005 | Klein et al. |
| 2005/0208947 A1 | 9/2005 | Bahl |
| 2005/0246193 A1 | 11/2005 | Roever et al. |
| 2005/0249196 A1* | 11/2005 | Ansari et al. ................... 370/352 |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0120375 A1 | 6/2006 | Ravikumar et al. |
| 2006/0121986 A1 | 6/2006 | Pelkey et al. |
| 2006/0148516 A1 | 7/2006 | Reddy et al. |
| 2006/0168643 A1 | 7/2006 | Howard et al. |
| 2006/0182100 A1 | 8/2006 | Li et al. |
| 2006/0183476 A1 | 8/2006 | Morita et al. |
| 2006/0187926 A1 | 8/2006 | Imai |
| 2006/0203750 A1 | 9/2006 | Ravikumar et al. |
| 2006/0218624 A1* | 9/2006 | Ravikumar et al. ............... 726/3 |
| 2006/0230166 A1 | 10/2006 | Philyaw |
| 2006/0246903 A1 | 11/2006 | Kong et al. |
| 2007/0016921 A1 | 1/2007 | Levi et al. |
| 2007/0019545 A1 | 1/2007 | Alt et al. |
| 2007/0078785 A1 | 4/2007 | Bush et al. |
| 2007/0110043 A1 | 5/2007 | Girard |
| 2007/0111794 A1 | 5/2007 | Hogan et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0297430 A1 | 12/2007 | Nykanen et al. |
| 2008/0005328 A1 | 1/2008 | Shively et al. |
| 2008/0032695 A1 | 2/2008 | Zhu et al. |
| 2008/0069105 A1 | 3/2008 | Costa et al. |
| 2008/0080392 A1 | 4/2008 | Walsh et al. |
| 2008/0192756 A1 | 8/2008 | Damola et al. |
| 2008/0235511 A1 | 9/2008 | O'Brien et al. |
| 2008/0320096 A1 | 12/2008 | Szeto |
| 2009/0003322 A1 | 1/2009 | Isumi |
| 2009/0052399 A1 | 2/2009 | Silver et al. |
| 2009/0192976 A1 | 7/2009 | Spivack et al. |
| 2009/0240821 A1 | 9/2009 | Juncker et al. |
| 2009/0300673 A1 | 12/2009 | Bachet et al. |
| 2009/0327516 A1 | 12/2009 | Amishima et al. |
| 2010/0049980 A1 | 2/2010 | Barriga et al. |

FOREIGN PATENT DOCUMENTS

| | | |
|---|---|---|
| EP | 1848163 A1 | 10/2007 |
| EP | 1988697 A1 | 11/2008 |

| | | |
|---|---|---|
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 2004/063843 | 7/2004 |
| WO | WO 2005/009019 | 1/2005 |
| WO | WO 03/079635 | 9/2005 |
| WO | WO 2006/075677 A1 | 7/2006 |

OTHER PUBLICATIONS

International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN—Simple Traversal of UDP Through NAT", Sep. 2002, XP015005058.
Salman A. Baset, et al, "An Analysis of The Skype Peer-To-Peer Internet Telephony Protocol", Department of Computer Science, Columbia University, New York, NY, USA, Sep. 15, 2004.
Singh et al., "Peer-to Peer Internet Telephony Using SIP", Department of Computer Science, Columbia University, Oct. 31, 2004, XP-002336408.
Sinha, S. and Oglieski, A., A TCP Tutorial, Nov. 1998 (Date posted on Internet: Apr. 19, 2001) [Retrieved from the Internet <URL:http://www.ssfnet.org/Exchange/tcp/tcpTutorialNotes.html>].
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.
International Search Report and Written Opinion of the International Searching Authority from PCT/US2008/078142, dated Mar. 27, 2009.
International Search Report and Written Opinion of the International Searching Authority from PCT/US2008/084950, dated Apr. 27, 2009.
Hao Wang, Skype VoIP service-architecture and comparison, In: INFOTECH Seminar Advanced Communication Services (ASC), 2005, pp. 4, 7, 8.
Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.
International Search Report and Written Opinion of the International Searching Authority from PCT/US2008/075141, dated Mar. 5, 2009.
Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.
Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.
PCT: International Preliminary Report on Patentability of PCT/US2008/084950; Jun. 1, 2010; 5 pgs.
PCT: International Search Report and Written Opinion for PCT/US2011/024870; Oct. 26, 2011; 12 pages.
J. Rosenberg et al. "Session Traversal Utilities for NAT (STUN)", draft-ietf-behave-rfc3489bis-06, Mar. 5, 2007.
PCT: International Search Report and Written Opinion for PCT/US2011/028685; Nov. 9, 2011; 10 pages.
PCT: International Search Report and Written Opinion for PCT/US2011/029954; Nov. 24, 2011; 8 pages.
PCT: International Search Report and Written Opinion for PCT/US2011/024891; Nov. 25, 2011; 9 pages.
PCT: International Search Report and Written Opinion for PCT/US2011/031245; Dec. 26, 2011; 13 pages.
PCT: International Search Report and Written Opinion for PCT/US2011/031246; Dec. 27, 2011; 8 pages.
PCT: International Search Report and Written Opinion for PCT/US2011/041565; Jan. 5, 2012; 7 pages.
Wireless Application Protocol—Wireless Transport Layer Security Specification, Version Feb. 18, 2000, Wireless Application Forum, Ltd. 2000; 99 pages.
PCT: International Preliminary Report on Patentability of PCT/US2008/075141; Mar. 9, 2010; 5 pgs.
PCT: International Preliminary Report on Patentability of PCT/US2007/068820; Dec. 31, 2008; 8 pgs.
PCT: International Preliminary Report on Patentability of PCT/US2007/068823; Nov. 27, 2008; 8 pgs.
PCT: International Preliminary Report on Patentability of PCT/US2006/047841; Nov. 6, 2008; 7 pgs.
PCT: International Preliminary Report on Patentability of PCT/US2007/002424; Aug. 7, 2008; 6 pgs.
PCT: International Preliminary Report on Patentability of PCT/US2006/040312; May 2, 2008; 5 pgs.
PCT: International Preliminary Report on Patentability of PCT/IB2005/000821; Oct. 19, 2006; 10 pgs.

* cited by examiner

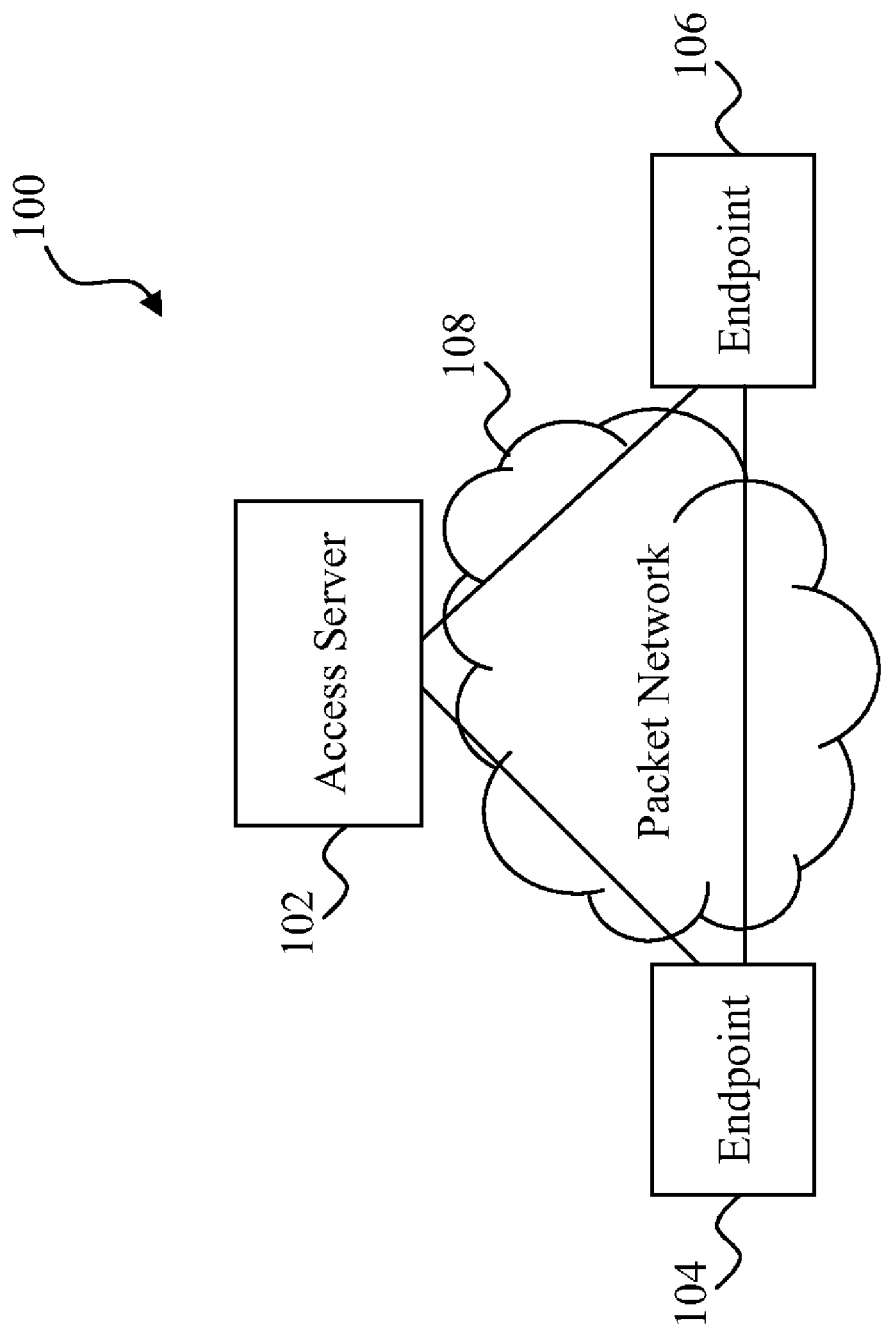

SYSTEM AND METHOD FOR PEER-TO-PEER MEDIA ROUTING USING A THIRD PARTY INSTANT MESSAGING SYSTEM FOR SIGNALING

INCORPORATION BY REFERENCE

This application incorporates by reference in their entirety U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS, and U.S. patent application Ser. No. 12/705,925, filed on Feb. 15, 2010, and entitled SYSTEM AND METHOD FOR STRATEGIC ROUTING IN A PEER-TO-PEER ENVIRONMENT.

BACKGROUND

Current packet-based communication networks may be generally divided into peer-to-peer networks and client/server networks. Traditional peer-to-peer networks support direct communication between various endpoints without the use of an intermediary device (e.g., a host or server). Each endpoint may initiate requests directly to other endpoints and respond to requests from other endpoints using credential and address information stored on each endpoint. However, because traditional peer-to-peer networks include the distribution and storage of endpoint information (e.g., addresses and credentials) throughout the network on the various insecure endpoints, such networks inherently have an increased security risk. While a client/server model addresses the security problem inherent in the peer-to-peer model by localizing the storage of credentials and address information on a server, a disadvantage of client/server networks is that the server may be unable to adequately support the number of clients that are attempting to communicate with it. As all communications (even between two clients) must pass through the server, the server can rapidly become a bottleneck in the system.

Accordingly, what is needed are a system and method that addresses these issues.

BRIEF DESCRIPTION OF THE DRAWINGS

For a more complete understanding, reference is now made to the following description taken in conjunction with the accompanying Drawings in which:

FIG. 1 is a simplified network diagram of one embodiment of a hybrid peer-to-peer system.

DETAILED DESCRIPTION

Figure 2A:
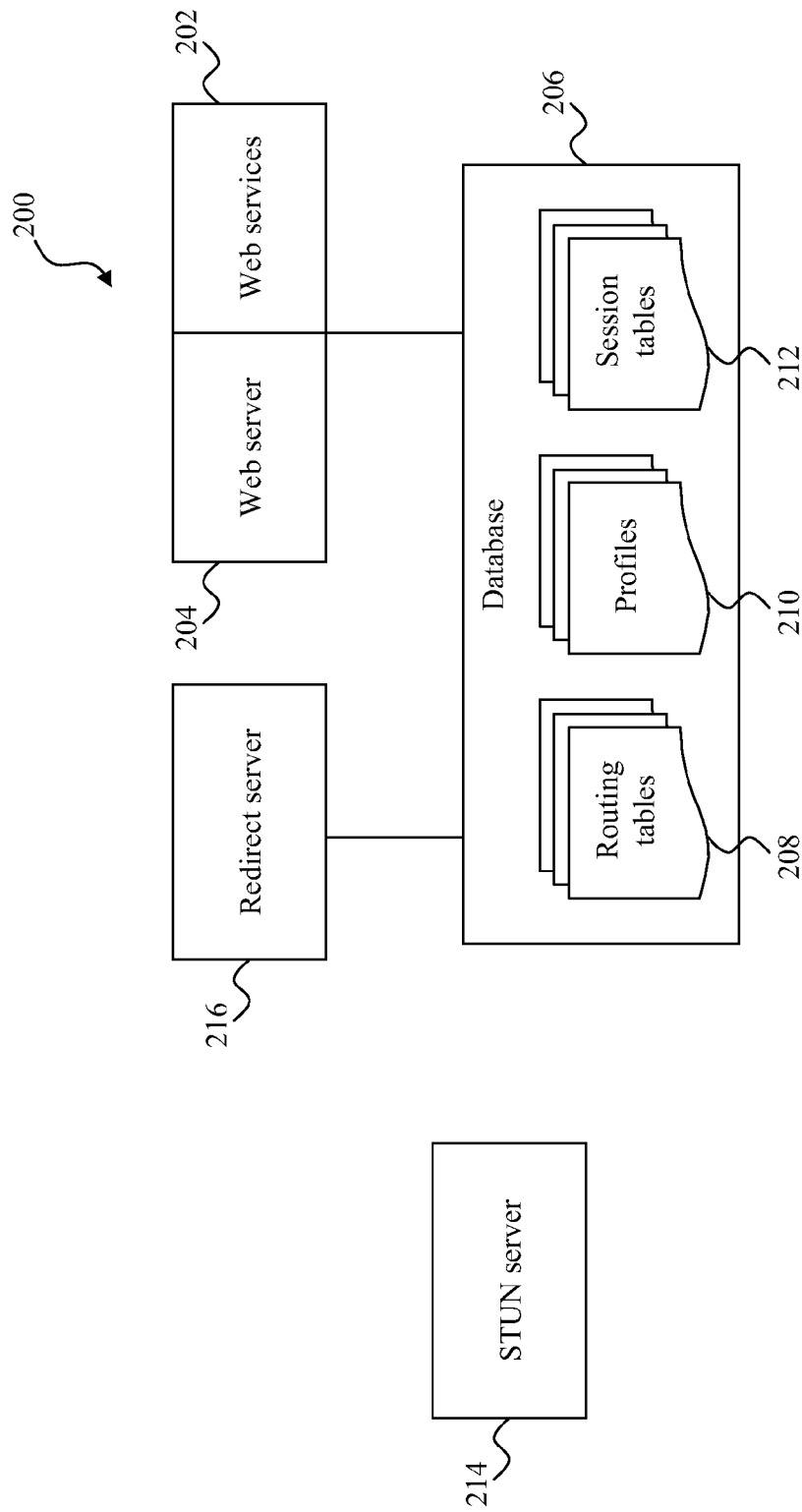
FIG. 2a illustrates one embodiment of an access server architecture that may be used within the system of FIG. 1.

The present disclosure is directed to a system and method for peer-to-peer hybrid communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a peer-to-peer hybrid system 100 is illustrated. The system 100 includes an access server 102 that is coupled to endpoints 104 and 106 via a packet network 108. Communication between the access server 102, endpoint 104, and endpoint 106 is accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)). For example, signaling communications (e.g., session setup, management, and teardown) may use a protocol such as the Session Initiation Protocol (SIP), while actual data traffic may be communicated using a protocol such as the Real-time Transport Protocol (RTP). As will be seen in the following examples, the use of standard protocols for communication enables the endpoints 104 and 106 to communicate with any device that uses the same standards. The communications may include, but are not limited to, voice calls, instant messages, audio and video, emails, and any other type of resource transfer, where a resource represents any digital data. In the following description, media traffic is generally based on the user datagram protocol (UDP), while authentication is based on the transmission control protocol/internet protocol (TCP/IP). However, it is understood that these are used for purposes of example and that other protocols may be used in addition to or instead of UDP and TCP/IP.

Connections between the access server 102, endpoint 104, and endpoint 106 may include wireline and/or wireless communication channels. In the following description, it is understood that the term "direct" means that there is no endpoint or access server in the communication channel(s) between the endpoints 104 and 106, or between either endpoint and the access server. Accordingly, the access server 102, endpoint 104, and endpoint 106 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 102 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 4). The access server 102 provides the relevant profile information and routing table to each of the endpoints 104 and 106 so that the endpoints can communicate directly with one another. Accordingly, in the present embodiment, one function of the access server 102 is to serve as a storage location for information needed by an endpoint in order to communicate with other endpoints and as a temporary storage location for requests, voicemails, etc., as will be described later in greater detail.

With additional reference to FIG. 2a, one embodiment of an architecture 200 for the access server 102 of FIG. 1 is illustrated. The architecture 200 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 202 (e.g., based on functionality provided by XML, SOAP, .NET, MONO), web server 204 (using, for example, Apache or IIS), and database 206 (using, for example, mySQL or SQLServer) for storing and retrieving routing tables 208, profiles 210, and one or more session tables 212. Functionality for a STUN (Simple Traversal of UDP through NATs (Network Address Translation)) server 214 is also present in the architecture 200. As is known, STUN is a protocol for assisting devices that are behind a NAT firewall or router with their packet routing. The architecture 200 may also include a redirect server 216 for handling requests originating outside of the system 100. One or both of the STUN server 214 and redirect server 216 may be incorporated into the access server 102 or may be a standalone device. In the present embodiment, both the server 204 and the redirect server 216 are coupled to the database 206.

Figure 2B:
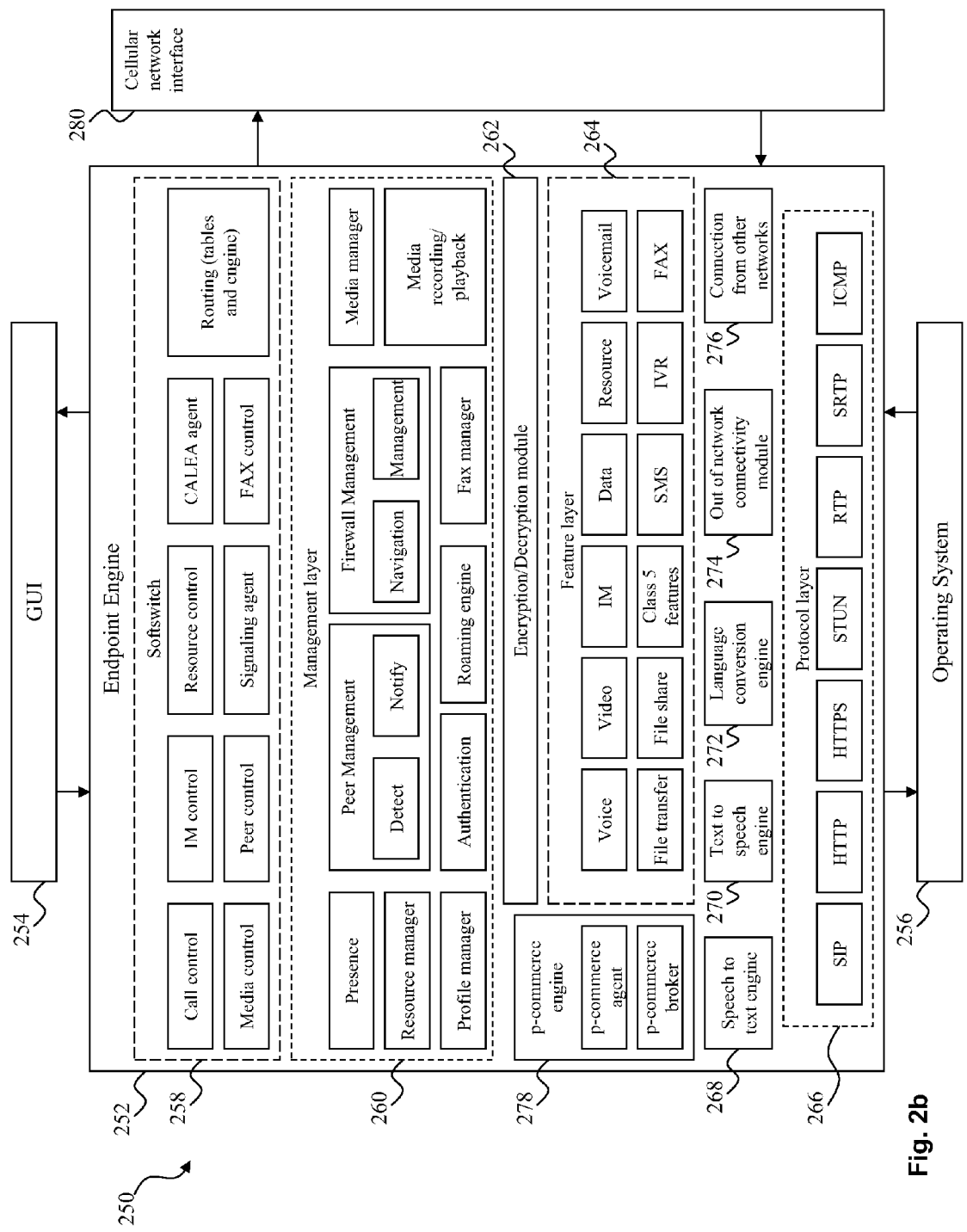
FIG. 2b illustrates one embodiment of an endpoint architecture that may be used within the system of FIG. 1.

Referring to FIG. 2b, one embodiment of an architecture 250 for the endpoint 104 (which may be similar or identical to the endpoint 106) of FIG. 1 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. Such devices generally include a network interface, a controller coupled to the network interface, a memory coupled to the controller, and instructions executable by the controller and stored in the memory for performing the functions described in the present application. Data needed by an endpoint may also be stored in the memory. The architecture 250 includes an endpoint engine 252 positioned between a graphical user interface (GUI) 254 and an operating system 256. The GUI 254 provides user access to the endpoint engine 252, while the operating system 256 provides underlying functionality, as is known to those of skill in the art.

The endpoint engine 252 may include multiple components and layers that support the functionality required to perform the operations of the endpoint 104. For example, the endpoint engine 252 includes a softswitch 258, a management layer 260, an encryption/decryption module 262, a feature layer 264, a protocol layer 266, a speech-to-text engine 268, a text-to-speech engine 270, a language conversion engine 272, an out-of-network connectivity module 274, a connection from other networks module 276, a p-commerce (e.g., peer commerce) engine 278 that includes a p-commerce agent and a p-commerce broker, and a cellular network interface module 280.

Each of these components/layers may be further divided into multiple modules. For example, the softswitch 258 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 260 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 262 provides encryption for outgoing packets and decryption for incoming packets. In the present example, the encryption/decryption module 262 provides application level encryption at the source, rather than at the network. However, it is understood that the encryption/decryption module 262 may provide encryption at the network in some embodiments.

The feature layer 264 provides support for various features such as voice, video, IM, data, voicemail, file transfer, file sharing, class 5 features, short message service (SMS), interactive voice response (IVR), faxes, and other resources. The protocol layer 266 includes protocols supported by the endpoint, including SIP, HTTP, HTTPS, STUN, RTP, SRTP, and ICMP. It is understood that these are examples only, and that fewer or more protocols may be supported.

The speech-to-text engine 268 converts speech received by the endpoint (e.g., via a microphone or network) into text, the text-to-speech engine 270 converts text received by the endpoint into speech (e.g., for output via a speaker), and the language conversion engine 272 may be configured to convert inbound or outbound information (text or speech) from one language to another language. The out-of-network connectivity module 274 may be used to handle connections between the endpoint and external devices (as described with respect to FIG. 12), and the connection from other networks module 276 handles incoming connection attempts from external devices. The cellular network interface module 280 may be used to interact with a wireless network.

Figure 2C:
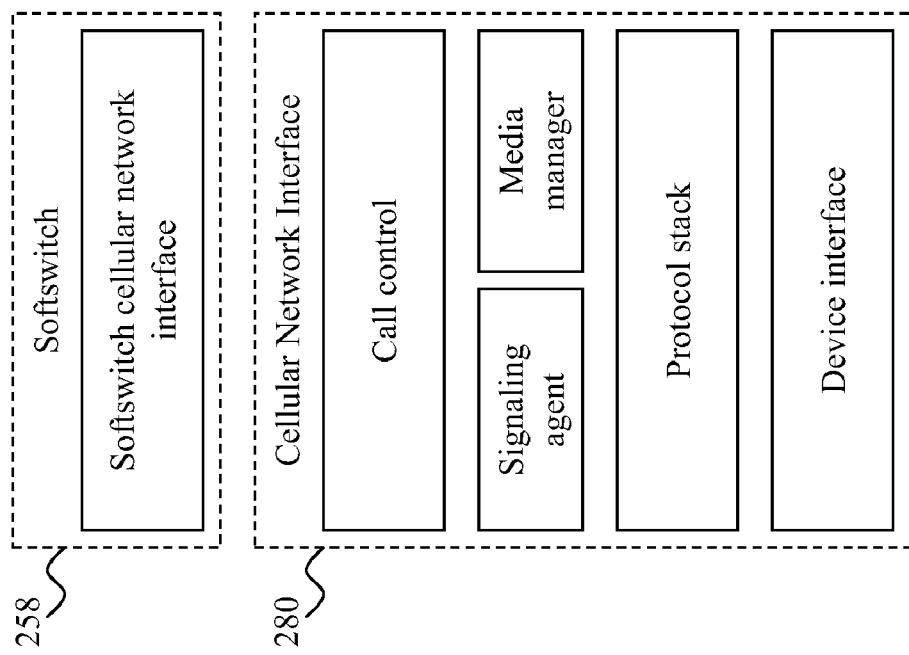
FIG. 2c illustrates one embodiment of components within the endpoint architecture of FIG. 2b that may be used for cellular network connectivity.

With additional reference to FIG. 2c, the cellular network interface module 280 is illustrated in greater detail. Although not shown in FIG. 2b, the softswitch 258 of the endpoint architecture 250 includes a cellular network interface for communication with the cellular network interface module 280. In addition, the cellular network interface module 280 includes various components such as a call control module, a signaling agent, a media manager, a protocol stack, and a device interface. It is noted that these components may correspond to layers within the endpoint architecture 250 and may be incorporated directly into the endpoint architecture in some embodiments.

Figure 2E:
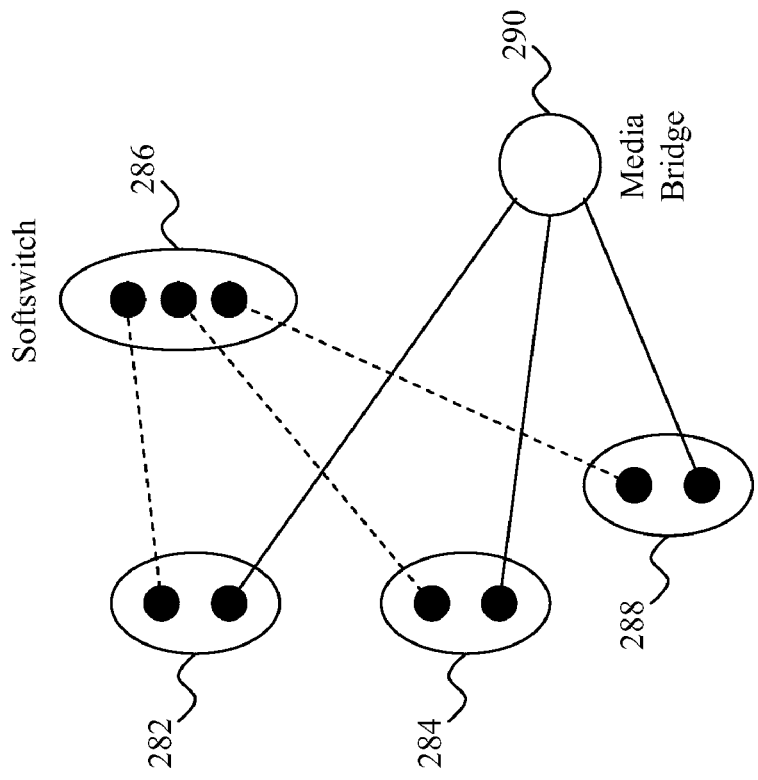
FIG. 2e illustrates a traditional softswitch configuration with three endpoints and a media bridge.
Figure 2D:
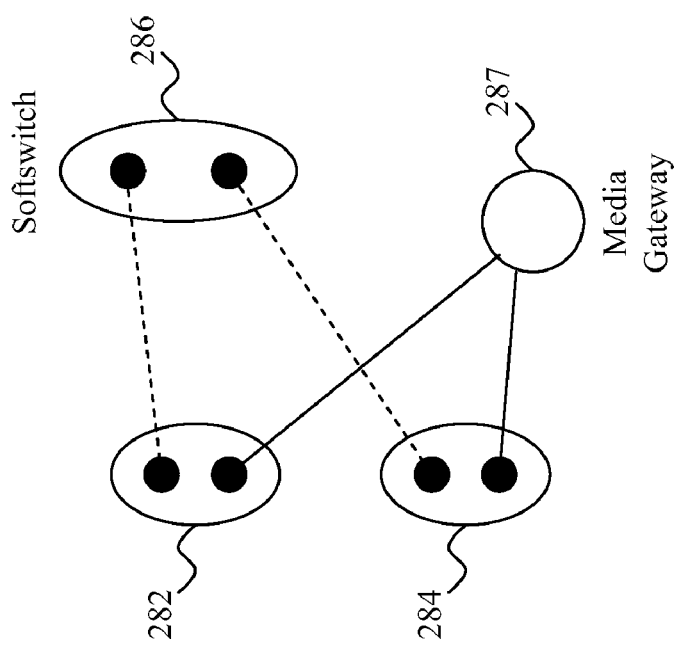
FIG. 2d illustrates a traditional softswitch configuration with two endpoints.

Referring to FIG. 2d, a traditional softswitch architecture is illustrated with two endpoints 282 and 284, neither of which includes a softswitch. In the present example, an external softswitch 286 maintains a first signaling leg (dotted line) with the endpoint 282 and a second signaling leg (dotted line) with the endpoint 284. The softswitch 286 links the two legs to pass signaling information between the endpoints 282 and 284. Media traffic (solid lines) may be transferred between the endpoints 282 and 284 via a media gateway 287.

With additional reference to FIG. 2e, the traditional softswitch architecture of FIG. 2d is illustrated with a third endpoint 288 that also does not include a softswitch. The external softswitch 286 now maintains a third signaling leg (dotted line) with the endpoint 288. In the present example, a conference call is underway. However, as none of the endpoints includes a softswitch, a media bridge 290 connected to each endpoint is needed for media traffic. Accordingly, each endpoint has at most two concurrent connections—one with the softswitch for signaling and another with the media bridge for media traffic.

Figure 2G:
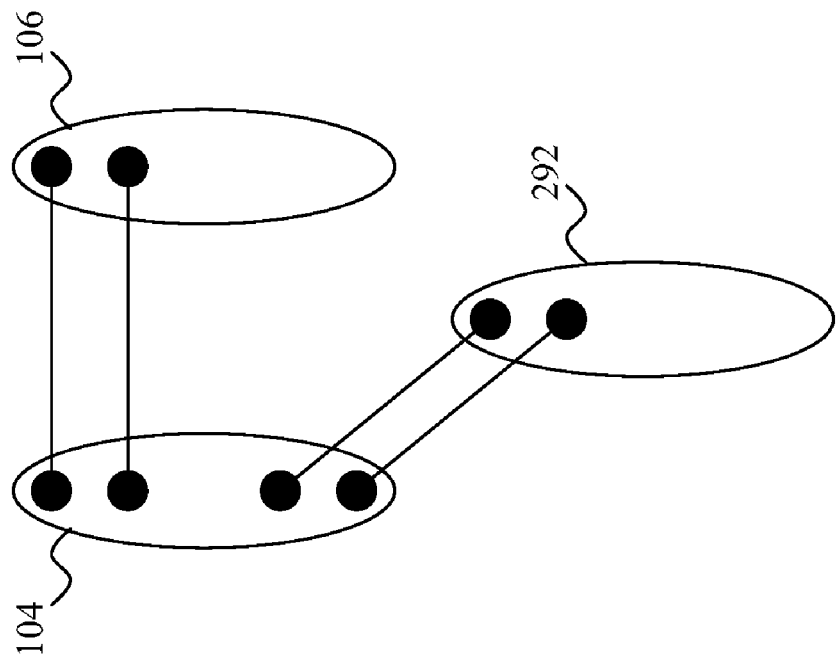
FIG. 2g illustrates one embodiment of the present disclosure with three endpoints, each of which includes a softswitch.
Figure 2F:
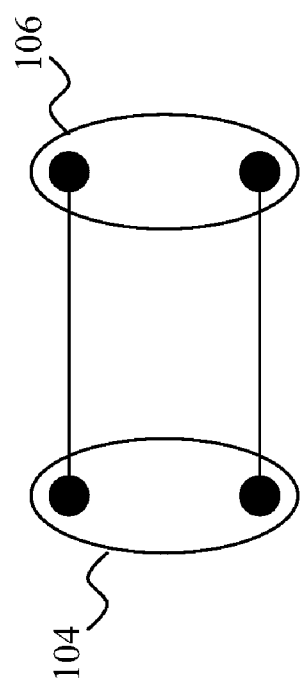
FIG. 2f illustrates one embodiment of the present disclosure with two endpoints, each of which includes a softswitch.

Referring to FIG. 2f, in one embodiment, unlike the traditional architecture of FIGS. 2d and 2e, two endpoints (e.g., the endpoints 104 and 106 of FIG. 1) each include a softswitch (e.g., the softswitch 258 of FIG. 2b). Each endpoint is able to establish and maintain both signaling and media traffic connections (both virtual and physical legs) with the other endpoint. Accordingly, no external softswitch is needed, as this model uses a distributed softswitch method to handle communications directly between the endpoints.

With additional reference to FIG. 2g, the endpoints 104 and 106 are illustrated with another endpoint 292 that also contains a softswitch. In this example, a conference call is underway with the endpoint 104 acting as the host. To accomplish this, the softswitch contained in the endpoint 104 enables the endpoint 104 to support direct signaling and media traffic connections with the endpoint 292. The endpoint 104 can then forward media traffic from the endpoint 106 to the endpoint 292 and vice versa. Accordingly, the endpoint 104 may support multiple connections to multiple endpoints and, as in FIG. 2f, no external softswitch is needed.

Referring again to FIG. 2b, in operation, the softswitch 258 uses functionality provided by underlying layers to handle connections with other endpoints and the access server 102, and to handle services needed by the endpoint 104. For example, as is described below in greater detail with respect to FIGS. 3a and 3b, incoming and outgoing calls may utilize multiple components within the endpoint architecture 250.

Figure 3A:
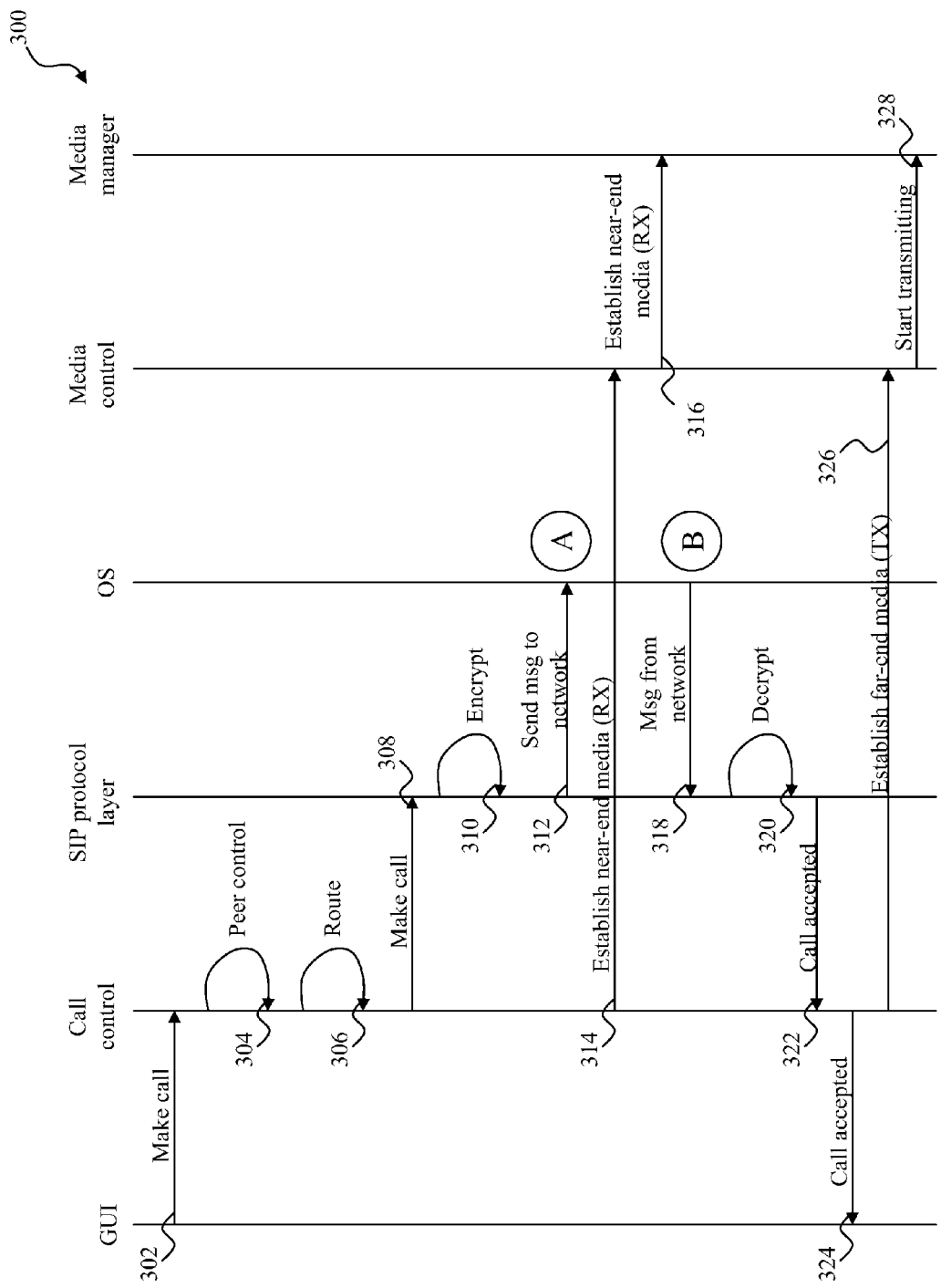
FIG. 3a is a sequence diagram illustrating the interaction of various components of FIG. 2b when placing a call.

Referring to FIG. 3a, a sequence diagram 300 illustrates an exemplary process by which the endpoint 104 may initiate a call to the endpoint 106 using various components of the architecture 250. Prior to step 302, a user (not shown) initiates a call via the GUI 254. In step 302, the GUI 254 passes a message to the call control module (of the softswitch 258) to make the call. The call control module contacts the peer control module (softswitch 258) in step 304, which detects the peer (if not already done), goes to the routing table (softswitch 258) for the routing information, and performs similar operations. It is understood that not all interactions are illustrated. For example, the peer control module may utilize the peer management module (of the management layer 260) for the peer detection. The call control module then identifies a route for the call in step 306, and sends message to the SIP protocol layer (of the protocol layer 266) to make the call in step 308. In step 310, the outbound message is encrypted (using the encryption/decryption module 262) and the message is sent to the network via the OS 256 in step 312.

After the message is sent and prior to receiving a response, the call control module instructs the media control module (softswitch 258) to establish the needed near-end media in step 314. The media control module passes the instruction to the media manager (of the management layer 260) in step 316, which handles the establishment of the near-end media.

Figure 3B:
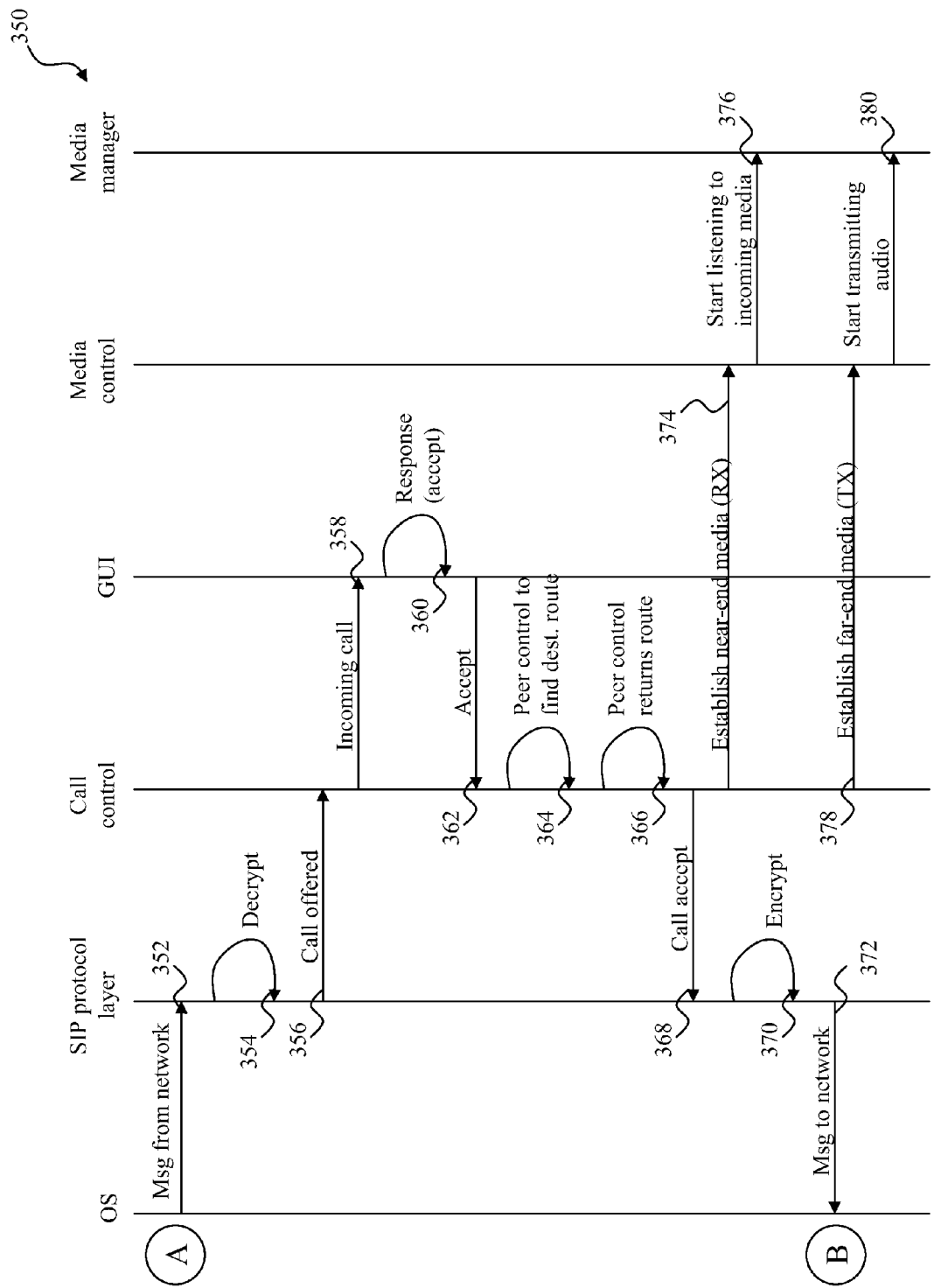
FIG. 3b is a sequence diagram illustrating the interaction of various components of FIG. 2b when receiving a call.

With additional reference to FIG. 3b, the message sent by the endpoint 104 in step 312 (FIG. 3a) is received by the endpoint 106 and passed from the OS to the SIP protocol layer in step 352. The message is decrypted in step 354 and the call is offered to the call control module in step 356. The call control module notifies the GUI of an incoming call in step 358 and the GUI receives input identifying whether the call is accepted or rejected (e.g., by a user) in step 360. In the present example, the call is accepted and the GUI passes the acceptance to the call control module in step 362. The call control module contacts the peer control module in step 364, which identifies a route to the calling endpoint and returns the route to the call control module in step 366. In steps 368 and 370, the call control module informs the SIP protocol layer that the call has been accepted and the message is encrypted using the encryption/decryption module. The acceptance message is then sent to the network via the OS in step 372.

In the present example, after the call control module passes the acceptance message to the SIP protocol layer, other steps may occur to prepare the endpoint 106 for the call. For example, the call control module instructs the media control module to establish near-end media in step 374, and the media control module instructs the media manager to start listening to incoming media in step 376. The call control module also instructs the media control module to establish far-end media (step 378), and the media control module instructs the media manager to start transmitting audio in step 380.

Returning to FIG. 3a, the message sent by the endpoint 106 (step 372) is received by the OS and passed on to the SIP protocol layer in step 318 and decrypted in step 320. The message (indicating that the call has been accepted) is passed to the call control module in step 322 and from there to the GUI in step 324. The call control module then instructs the media control module to establish far-end media in step 326, and the media control module instructs the media manager to start transmitting audio in step 328.

The following figures are sequence diagrams that illustrate various exemplary functions and operations by which the access server 102 and the endpoints 104 and 106 may communicate. It is understood that these diagrams are not exhaustive and that various steps may be excluded from the diagrams to clarify the aspect being described.

Figure 4:
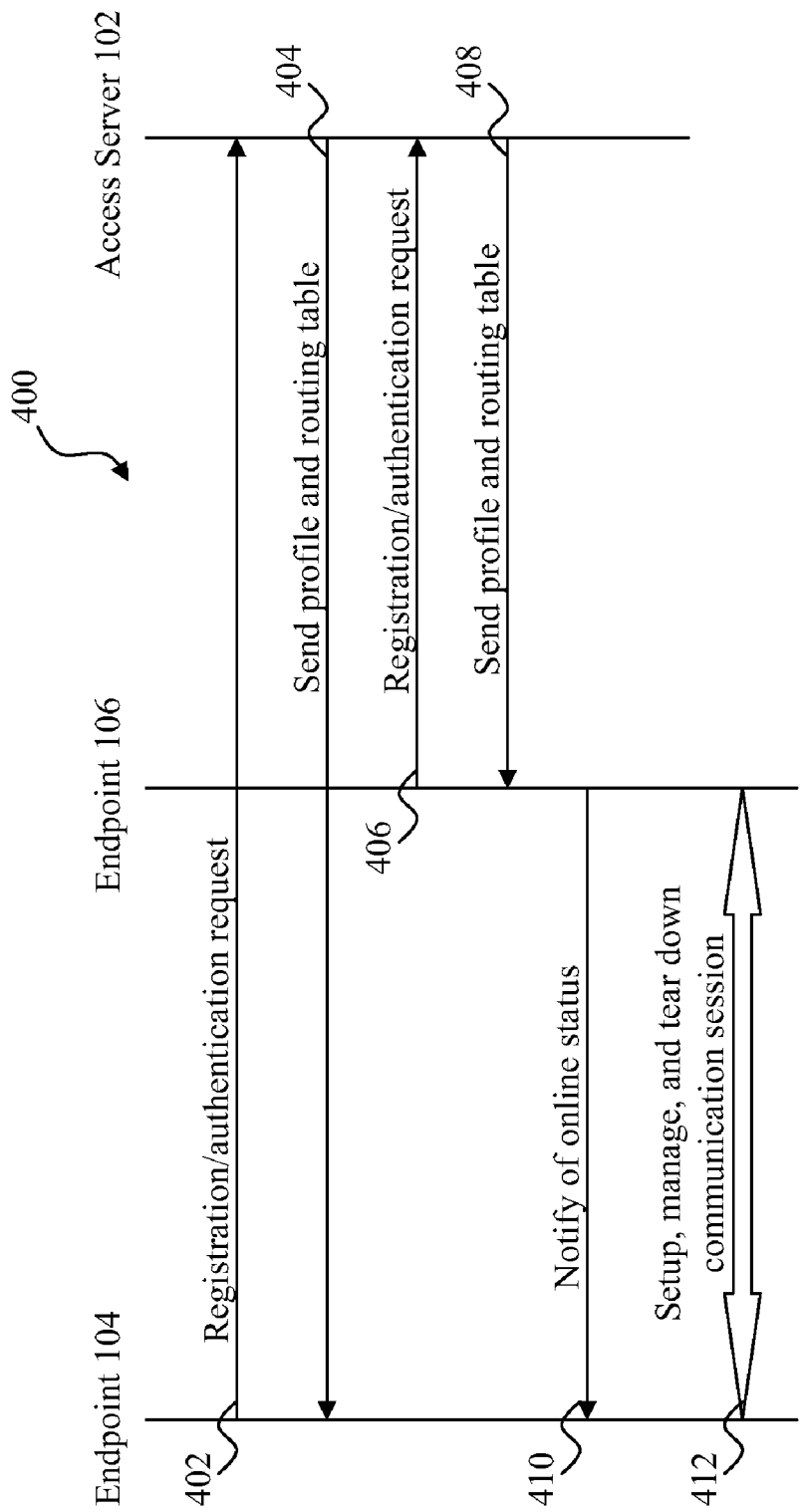
FIG. 4 is a sequence diagram illustrating an exemplary process by which an endpoint of FIG. 1 may be authenticated and communicate with another endpoint.

Referring to FIG. 4 (and using the endpoint 104 as an example), a sequence diagram 400 illustrates an exemplary process by which the endpoint 104 may authenticate with the access server 102 and then communicate with the endpoint 106. As will be described, after authentication, all communication (both signaling and media traffic) between the endpoints 104 and 106 occurs directly without any intervention by the access server 102. In the present example, it is understood that neither endpoint is online at the beginning of the sequence, and that the endpoints 104 and 106 are "buddies." As described above, buddies are endpoints that have both previously agreed to communicate with one another.

In step 402, the endpoint 104 sends a registration and/or authentication request message to the access server 102. If the endpoint 104 is not registered with the access server 102, the access server will receive the registration request (e.g., user ID, password, and email address) and will create a profile for the endpoint (not shown). The user ID and password will then be used to authenticate the endpoint 104 during later logins. It is understood that the user ID and password may enable the user to authenticate from any endpoint, rather than only the endpoint 104.

Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is currently offline, the buddy list will reflect this status. The access server 102 then sends the profile information (e.g., the buddy list) and a routing table to the endpoint 104 in step 404. The routing table contains address information for online members of the buddy list. It is understood that steps 402 and 404 represent a make and break connection that is broken after the endpoint 104 receives the profile information and routing table.

In steps 406 and 408, the endpoint 106 and access server 102 repeat steps 402 and 404 as described for the endpoint 104. However, because the endpoint 104 is online when the endpoint 106 is authenticated, the profile information sent to the endpoint 106 will reflect the online status of the endpoint 104 and the routing table will identify how to directly contact it. Accordingly, in step 410, the endpoint 106 sends a message directly to the endpoint 104 to notify the endpoint 104 that the endpoint 106 is now online. This also provides the endpoint 104 with the address information needed to communicate directly with the endpoint 106. In step 412, one or more communication sessions may be established directly between the endpoints 104 and 106.

Figure 5:
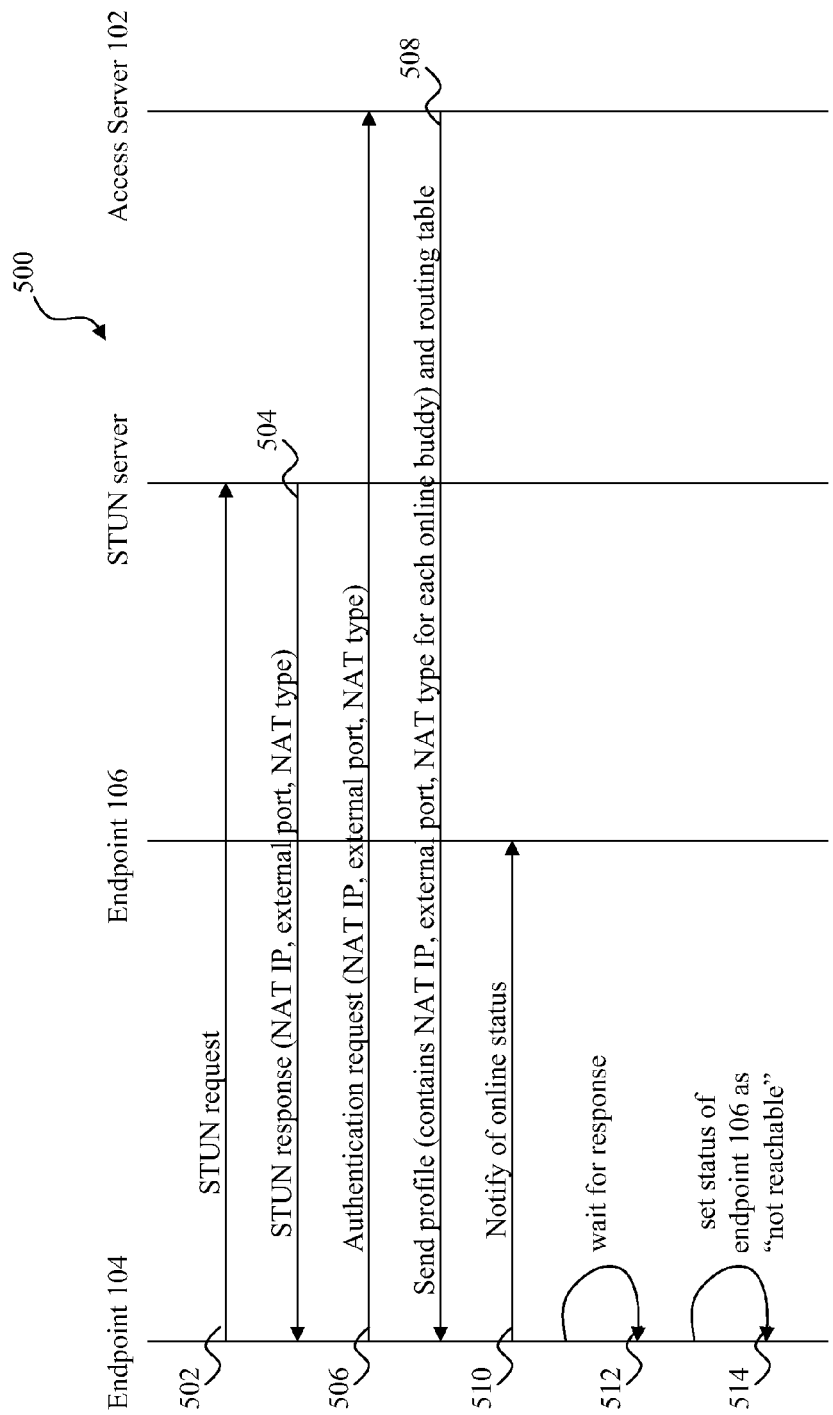
FIG. 5 is a sequence diagram illustrating an exemplary process by which an endpoint of FIG. 1 may determine the status of another endpoint.

Referring to FIG. 5, a sequence diagram 500 illustrates an exemplary process by which authentication of an endpoint (e.g., the endpoint 104) may occur. In addition, after authentication, the endpoint 104 may determine whether it can communicate with the endpoint 106. In the present example, the endpoint 106 is online when the sequence begins.

In step 502, the endpoint 104 sends a request to the STUN server 214 of FIG. 2. As is known, the STUN server determines an outbound IP address (e.g., the external address of a device (i.e., a firewall, router, etc.) behind which the endpoint 104 is located), an external port, and a type of NAT used by the device. The type of NAT may be, for example, full cone, restricted cone, port restricted cone, or symmetric, each of which is discussed later in greater detail with respect to FIG. 10. The STUN server 214 sends a STUN response back to the endpoint 104 in step 504 with the collected information about the endpoint 104.

In step 506, the endpoint 104 sends an authentication request to the access server 102. The request contains the information about endpoint 104 received from the STUN server 214. In step 508, the access server 102 responds to the request by sending the relevant profile and routing table to the endpoint 104. The profile contains the external IP address, port, and NAT type for each of the buddies that are online.

In step 510, the endpoint 104 sends a message to notify the endpoint 106 of its online status (as the endpoint 106 is already online) and, in step 512, the endpoint 104 waits for a response. After the expiration of a timeout period within which no response is received from the endpoint 106, the endpoint 104 will change the status of the endpoint 106 from "online" (as indicated by the downloaded profile information) to "unreachable." The status of a buddy may be indicated on a visual buddy list by the color of an icon associated with each buddy. For example, when logging in, online buddies may be denoted by a blue icon and offline buddies may be denoted by a red icon. If a response to a notify message is received for a buddy, the icon representing that buddy may be changed from blue to green to denote the buddy's online status. If no response is received, the icon remains blue to indicate that the buddy is unreachable. Although not shown, a message sent from the endpoint 106 and received by the endpoint 104 after step 514 would indicate that the endpoint 106 is now reachable and would cause the endpoint 104 to change the status of the endpoint 106 to online. Similarly, if the endpoint 104 later sends a message to the endpoint 106 and receives a response, then the endpoint 104 would change the status of the endpoint 106 to online.

It is understood that other embodiments may implement alternate NAT traversal techniques. For example, a single payload technique may be used in which TCP/IP packets are used to traverse a UDP restricted firewall or router. Another example includes the use of a double payload in which a UDP packet is inserted into a TCP/IP packet. Furthermore, it is understood that protocols other than STUN may be used. For example, protocols such as Internet Connectivity Establishment (ICE) or Traversal Using Relay NAT (TURN) may be used.

Figure 6:
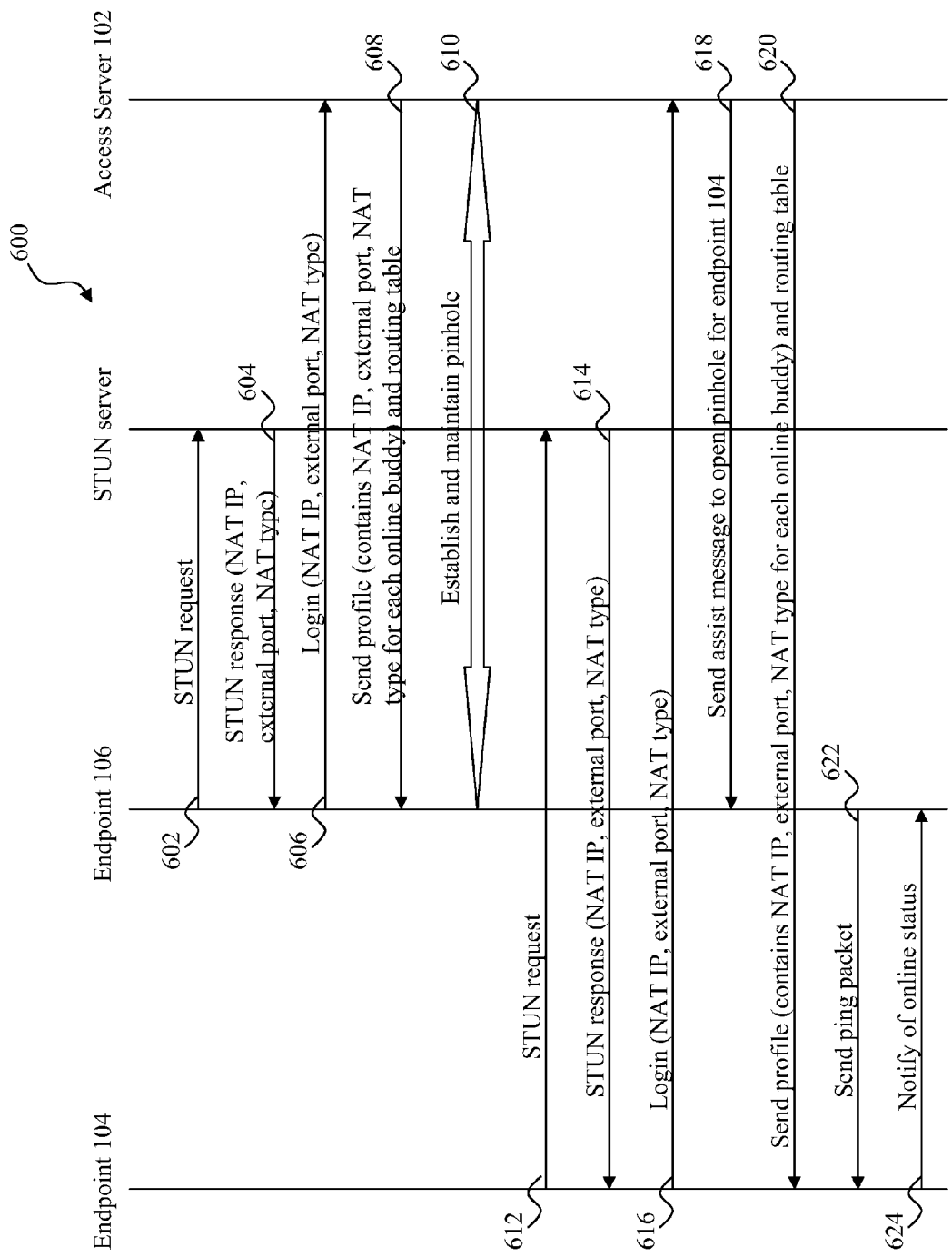
FIG. 6 is a sequence diagram illustrating an exemplary process by which an access server of FIG. 1 may aid an endpoint in establishing communications with another endpoint.

Referring to FIG. 6, a sequence diagram 600 illustrates an exemplary process by which the access server 102 may aid the endpoint 104 in establishing communications with the endpoint 106 (which is a buddy). After rendering aid, the access server 102 is no longer involved and the endpoints may communicate directly. In the present example, the endpoint 106 is behind a NAT device that will only let a message in (towards the endpoint 106) if the endpoint 106 has sent a message out. Unless this process is bypassed, the endpoint 104 will be unable to connect to the endpoint 106. For example, the endpoint 104 will be unable to notify the endpoint 106 that it is now online.

In step 602, the endpoint 106 sends a request to the STUN server 214 of FIG. 2. As described previously, the STUN server determines an outbound IP address, an external port, and a type of NAT for the endpoint 106. The STUN server 214 sends a STUN response back to the endpoint 106 in step 604 with the collected information about the endpoint 106. In step 606, the endpoint 106 sends an authentication request to the access server 102. The request contains the information about endpoint 106 received from the STUN server 214. In step 608, the access server 102 responds to the request by sending the relevant profile and routing table to the endpoint 106. In the present example, the access server 102 identifies the NAT type associated with the endpoint 106 as being a type that requires an outbound packet to be sent before an inbound packet is allowed to enter. Accordingly, the access server 102 instructs the endpoint 106 to send periodic messages to the access server 102 to establish and maintain a pinhole through the NAT device. For example, the endpoint 106 may send a message prior to the timeout period of the NAT device in order to reset the timeout period. In this manner, the pinhole may be kept open indefinitely.

In steps 612 and 614, the endpoint 104 sends a STUN request to the STUN server 214 and the STUN server responds as previously described. In step 616, the endpoint 104 sends an authentication request to the access server 102. The access server 102 retrieves the buddy list for the endpoint 104 and identifies the endpoint 106 as being associated with a NAT type that will block communications from the endpoint 104. Accordingly, in step 618, the access server 102 sends an assist message to the endpoint 106. The assist message instructs the endpoint 106 to send a message to the endpoint 104, which opens a pinhole in the NAT device for the endpoint 104. For security purposes, as the access server 102 has the STUN information for the endpoint 104, the pinhole opened by the endpoint 106 may be specifically limited to the endpoint associated with the STUN information. Furthermore, the access server 102 may not request such a pinhole for an endpoint that is not on the buddy list of the endpoint 106.

The access server 104 sends the profile and routing table to the endpoint 104 in step 620. In step 622, the endpoint 106 sends a message (e.g., a ping packet) to the endpoint 104. The endpoint 104 may then respond to the message and notify the endpoint 106 that it is now online. If the endpoint 106 does not receive a reply from the endpoint 104 within a predefined period of time, it may close the pinhole (which may occur simply by not sending another message and letting the pinhole time out). Accordingly, the difficulty presented by the NAT device may be overcome using the assist message, and communications between the two endpoints may then occur without intervention by the access server 102.

Figure 7:
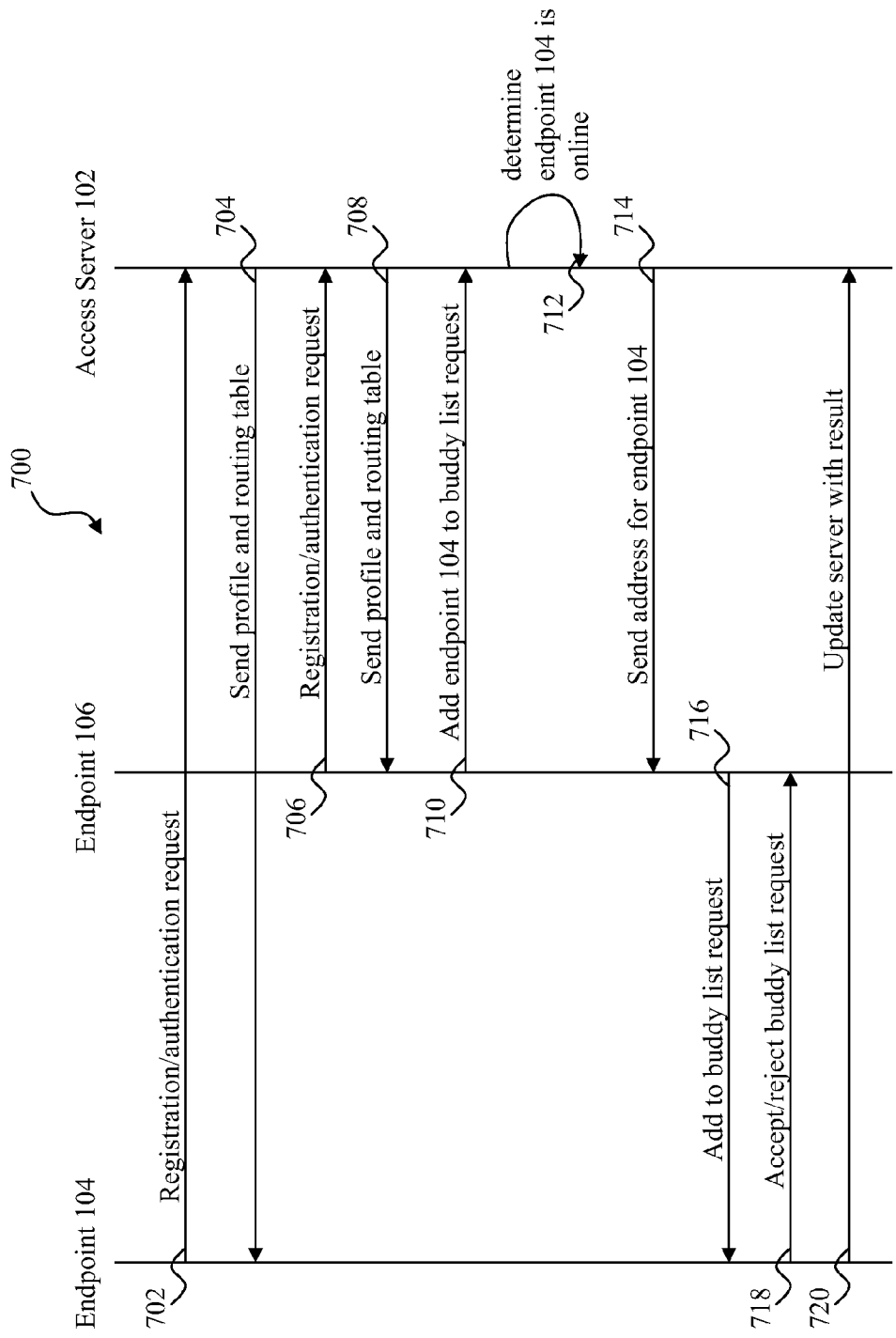
FIG. 7 is a sequence diagram illustrating an exemplary process by which an endpoint of FIG. 1 may request that it be added to the buddy list of another endpoint that is currently online.

Referring to FIG. 7, a sequence diagram 700 illustrates an exemplary process by which the endpoint 106 may request that it be added to the endpoint 104's buddy list. In the present example, the endpoints 104 and 106 both remain online during the entire process.

In step 702, the endpoint 104 sends a registration and/or authentication request message to the access server 102 as described previously. Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is not currently on the buddy list, it will not be present. The access server 102 then sends the profile information and a routing table to the endpoint 104 in step 704.

In steps 706 and 708, the endpoint 106 and access server 102 repeat steps 702 and 704 as described for the endpoint 104. The profile information sent by the access server 102 to the endpoint 106 will not include the endpoint 104 because the two endpoints are not buddies.

In step 710, the endpoint 106 sends a message to the access server 102 requesting that the endpoint 104 be added to its buddy list. The access server 102 determines that the endpoint 104 is online (e.g., using the session table) in step 712 and sends the address for the endpoint 104 to the endpoint 106 in step 714. In step 716, the endpoint 106 sends a message directly to the endpoint 104 requesting that the endpoint 106 be added to its buddy list. The endpoint 104 responds to the endpoint 106 in step 718 with either permission or a denial, and the endpoint 104 also updates the access server 102 with the response in step 720. For example, if the response grants permission, then the endpoint 104 informs the access server 102 so that the access server can modify the profile of both endpoints to reflect the new relationship. It is understood that various other actions may be taken. For example, if the endpoint 104 denies the request, then the access server 102 may not respond to another request by the endpoint 106 (with respect to the endpoint 104) until a period of time has elapsed.

It is understood that many different operations may be performed with respect to a buddy list. For example, buddies may be deleted, blocked/unblocked, buddy status may be updated, and a buddy profile may be updated. For block/unblock, as well as status and profile updates, a message is first sent to the access server 102 by the endpoint requesting the action (e.g., the endpoint 104). Following the access server 102 update, the endpoint 104 sends a message to the peer being affected by the action (e.g., the endpoint 106).

Buddy deletion may be handled as follows. If the user of the endpoint 104 wants to delete a contact on a buddy list currently associated with the online endpoint 106, the endpoint 104 will first notify the access server 102 that the buddy is being deleted. The access server 102 then updates the profile of both users so that neither buddy list shows the other user as a buddy. Note that, in this instance, a unilateral action by one user will alter the profile of the other user. The endpoint 104 then sends a message directly to the endpoint 106 to remove the buddy (the user of the endpoint 104) from the buddy list of the user of endpoint 106 in real time. Accordingly, even though the user is online at endpoint 106, the user of the endpoint 104 will be removed from the buddy list of the endpoint 106

Figure 8:
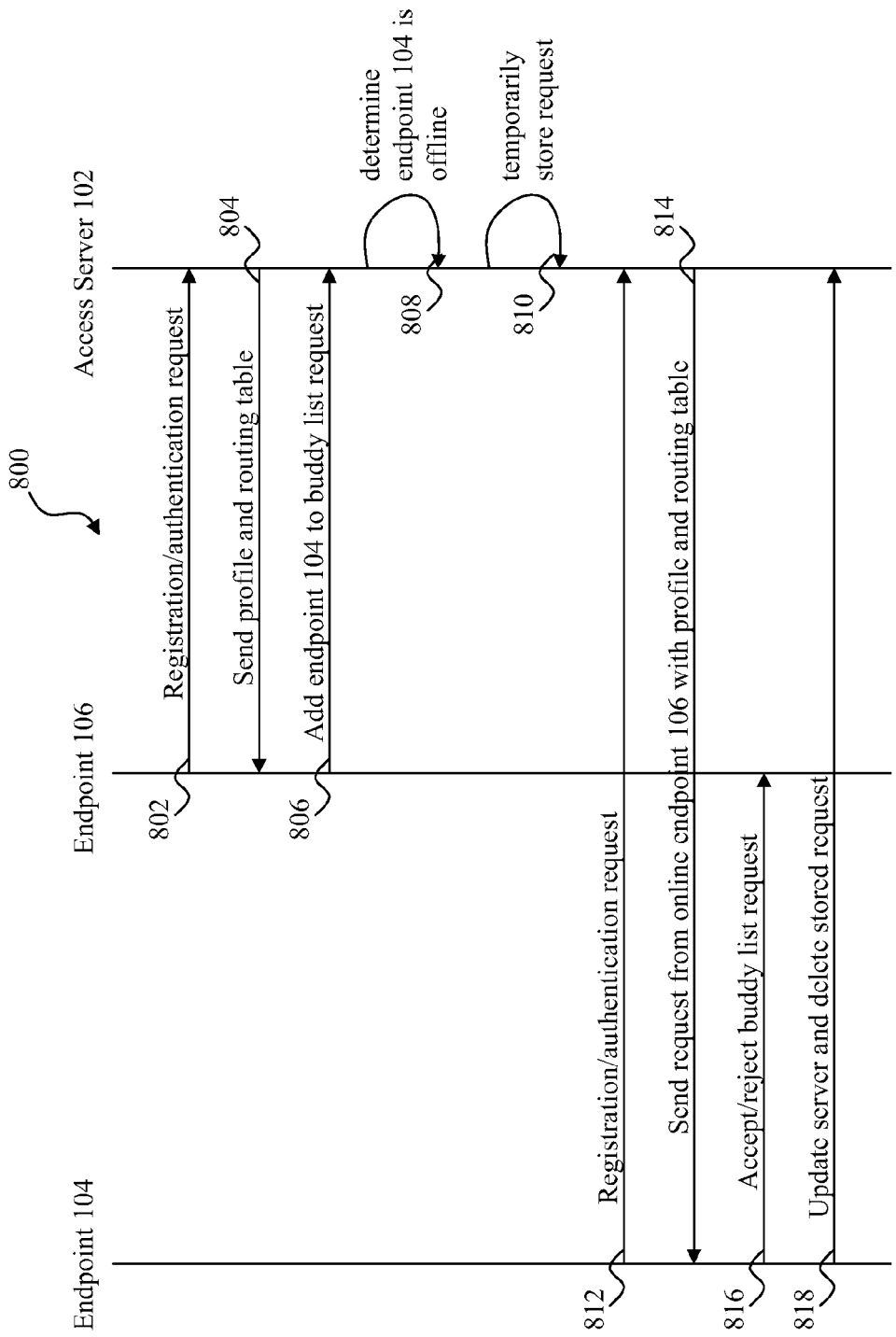
FIG. 8 is a sequence diagram illustrating an exemplary process by which an endpoint of FIG. 1 may request that it be added to the buddy list of another endpoint that is currently offline.

Referring to FIG. 8, a sequence diagram 800 illustrates an exemplary process by which the endpoint 106 may request that it be added to the endpoint 104's buddy list. In the present example, the endpoint 104 is not online until after the endpoint 106 has made its request.

In step 802, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 804.

In step 806, the endpoint 106 sends a message to the access server 102 requesting that the endpoint 104 be added to its buddy list. The access server 102 determines that the endpoint 104 is offline in step 808 and temporarily stores the request message in step 810. In steps 812 and 814, the endpoint 104 and access server 102 repeat steps 802 and 804 as described for the endpoint 106. However, when the access server 102 sends the profile information and routing table to the endpoint 104, it also sends the request by the endpoint 106 (including address information for the endpoint 106).

In step 816, the endpoint 104 responds directly to the endpoint 106 with either permission or a denial. The endpoint 104 then updates the access server 102 with the result of the response in step 818 and also instructs the access server to delete the temporarily stored request.

Figure 9:
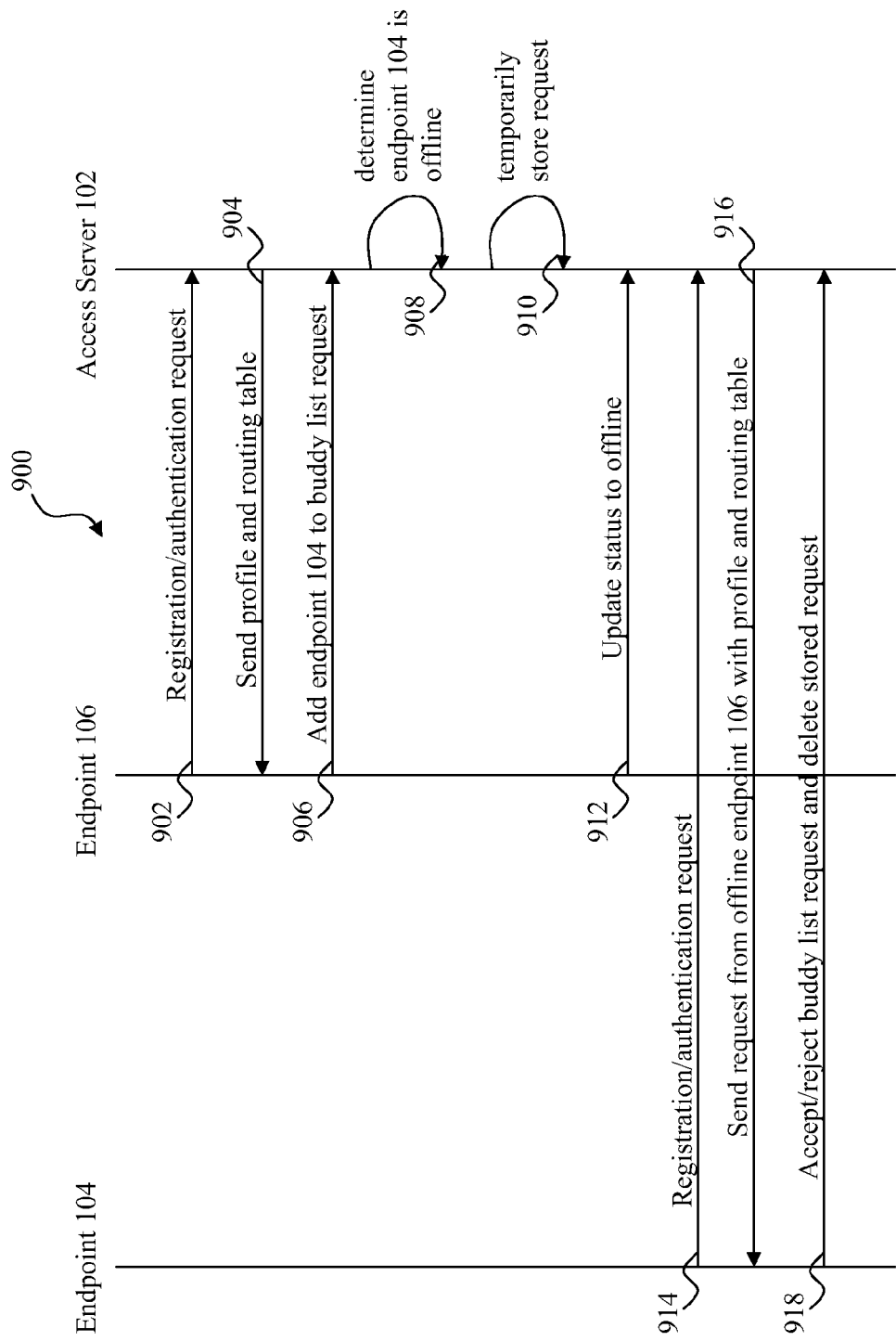
FIG. 9 is a sequence diagram illustrating an exemplary process by which an endpoint of FIG. 1 may request that it be added to the buddy list of another endpoint that is currently offline before it too goes offline.

Referring to FIG. 9, a sequence diagram 900 illustrates an exemplary process by which the endpoint 106 may request that it be added to the endpoint 104's buddy list. In the present example, the endpoint 104 is not online until after the endpoint 106 has made its request, and the endpoint 106 is not online to receive the response by endpoint 104.

In step 902, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 904.

In step 906, the endpoint 106 sends a message to the access server 102 requesting that the endpoint 104 be added to its buddy list. The access server 102 determines that the endpoint 104 is offline in step 908 and temporarily stores the request message in step 910. In step 912, the endpoint 106 notifies the access server 102 that it is going offline.

In steps 914 and 916, the endpoint 104 and access server 102 repeat steps 902 and 904 as described for the endpoint 106. However, when the access server 102 sends the profile information and routing table to the endpoint 104, it also sends the request by the endpoint 106. Endpoint 104 sends its response to the access server 102 in step 918 and also instructs the access server to delete the temporarily stored request. After the endpoint 106's next authentication process, its profile information will include endpoint 104 as a buddy (assuming the endpoint 104 granted permission).

Figure 10:
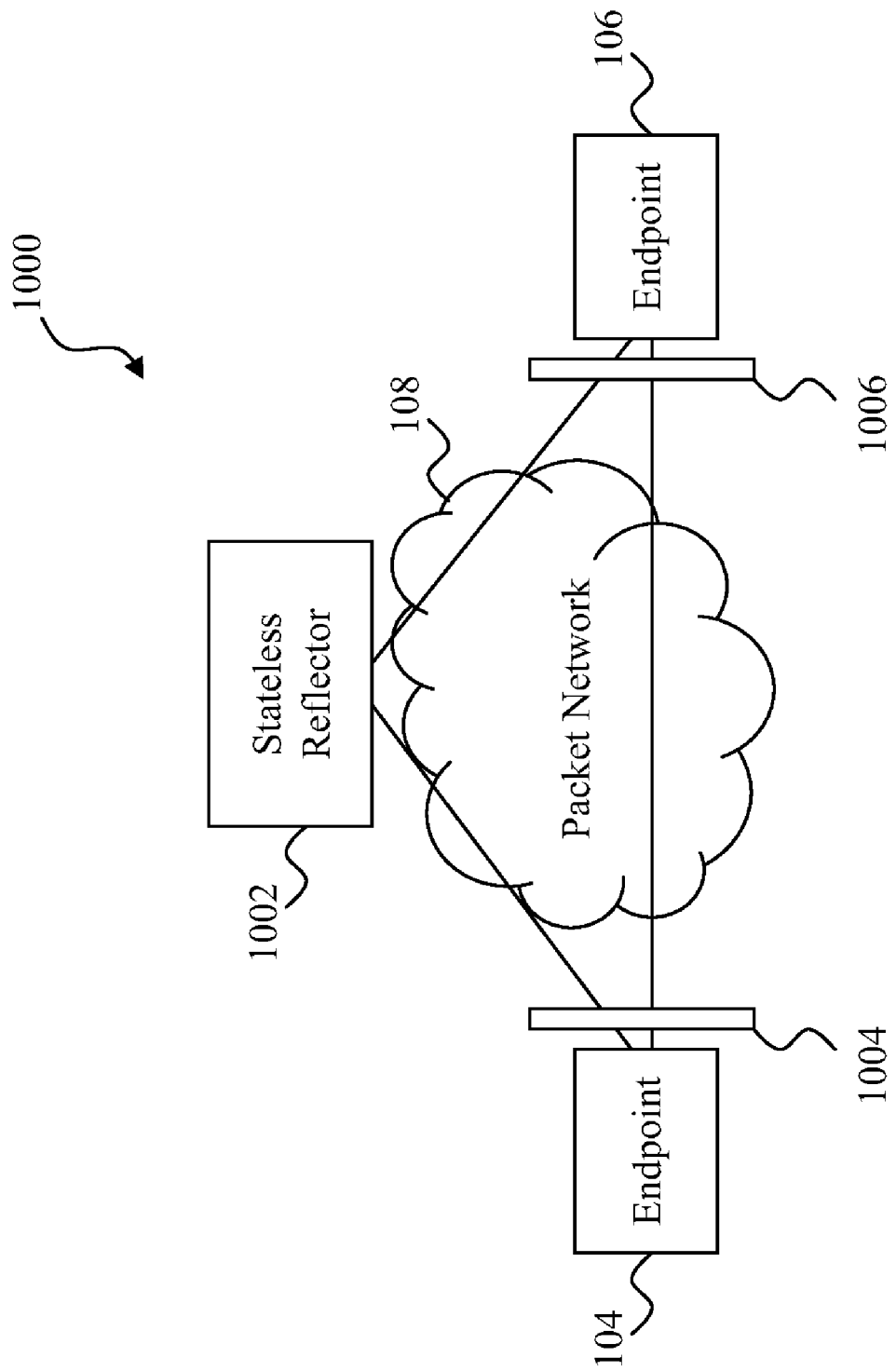
FIG. 10 is a simplified diagram of another embodiment of a peer-to-peer system that includes a stateless reflector that may aid an endpoint in traversing a NAT device to communicate with another endpoint.

Referring to FIG. 10, in one embodiment, a system 1000 includes a stateless reflector 1002 and two endpoints 104 and 106, such as the endpoints 104 and 106 described with respect to the preceding figures. In the present example, each of the endpoints 104 and 106 are behind a device 1004, 1006, respectively, that monitors and regulates communication with its respective endpoint. Each device 1004, 1006 in the present example is a firewall having NAT technology. As described previously, a NAT device may present an obstacle in establishing a peer-to-peer connection because it may not allow unsolicited messages (e.g., it may require a packet to be sent out through the NAT device before allowing a packet in). For example, the NAT device 1006 positioned between the endpoint 106 and network 108 may only let a message in (towards the endpoint 106) if the endpoint 106 has sent a message out. Unless the NAT device's status is shifted from not soliciting messages from the endpoint 104 to soliciting messages from the endpoint 104, the endpoint 104 will be unable to connect to the endpoint 106. For example, the endpoint 104 will be unable to notify the endpoint 106 that it is now online.

As will be described below in greater detail, the stateless reflector 1002 is configured to receive one or more packets from an endpoint and reflect the packet to another endpoint after modifying information within the packet. This reflection process enables the endpoints 104 and 106 to communicate regardless of the presence and type of the NAT devices 1004 and 1006. The stateless reflector 1002 is stateless because state information (e.g., information relating to how an endpoint is to connect with other endpoints) is stored by the endpoints, as described previously. Accordingly, the stateless reflector 1002 processes header information contained within a packet without access to other information about the network or endpoints, such as the database 206 of FIG. 2a. Although only one stateless reflector 1002 is illustrated in FIG. 10, it is understood that multiple stateless reflectors may be provided, and that the endpoints 104 and 106 may each use a different stateless reflector. For example, an endpoint may be configured to use a particular stateless reflector or may select a stateless reflector based on location, NAT type, etc.

Although each endpoint 104, 106 is shown with a separate NAT device 1004, 1006, it is understood that multiple endpoints may be connected to the network 108 via a single NAT device. For example, a LAN may access the network 108 via a single NAT device, and all communications between the endpoints connected to the LAN and the network 108 must pass through the NAT device. However, communications between the endpoints within the LAN itself may occur directly, as previously described, because the endpoints are not communicating through the NAT device. Furthermore, if one of the endpoints 104 or 106 does not have a NAT device, then communications with that endpoint may occur directly as described above even if the endpoints are not in the same network.

Each NAT device 1004 and 1006 includes an internal IP address (on the side coupled to the endpoint 104 for the NAT device 1004 and the side coupled to the endpoint 106 for the NAT device 1006) and an external IP address (on the side coupled to the network 108 for both NAT devices). Each connection is also associated with an internal port and an external port. Therefore, each connection includes both internal IP address/port information and external IP address/port information.

Generally, a NAT device may be defined as full cone, restricted cone, port restricted cone, or symmetric. A full cone NAT is one where all requests from the same internal IP address and port are mapped to the same external IP address and port. Therefore, any external host can send a packet to the internal host by sending a packet to the mapped external address.

A restricted cone NAT is one where all requests from the same internal IP address and port are mapped to the same external IP address and port. Unlike a full cone NAT, an external host can send a packet to the internal host only if the internal host has previously sent a packet to the external host's IP address.

A port restricted cone NAT is like a restricted cone NAT, but the restriction includes port numbers. More specifically, an external host can send a packet with source IP address X and source port P to the internal host only if the internal host has previously sent a packet to the external host at IP address X and port P.

A symmetric NAT is one where all requests from the same internal IP address and port to a specific destination IP address and port are mapped to the same external IP address and port. If the same host sends a packet with the same source address and port, but to a different destination, a different mapping is used. Only the external host that receives a packet can send a UDP packet back to the internal host.

Figure 11:
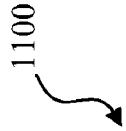
FIG. 11 is a table illustrating various NAT types and illustrative embodiments of processes that may be used to traverse each NAT type within the system of FIG. 10.

Referring to FIG. 11, a table 1100 illustrates one embodiment of a communication structure that may be used to traverse one or both of the NAT devices 1004 and 1006 of FIG. 10. The table 1100 provides five possible types for the NAT devices 1004 and 1006: no NAT, full cone, restricted cone, port restricted cone, and symmetric. It is understood that "no NAT" may indicate that no device is there, that a device is there but does not include NAT functionality, or that a device is there and any NAT functionality within the device has been disabled. Either of the NAT devices 1004 and 1006 may be on the originating side of the communication or on the terminating side. For purposes of convenience, the endpoint 104 is the originating endpoint and the endpoint 106 is the terminating endpoint, and the NAT device 1004 is the originating NAT device and the NAT device 1006 is the terminating NAT device. It is understood that the terms "endpoint" and "NAT device" may be used interchangeably in some situations. For example, sending a packet to the endpoint 106 generally involves sending a packet to the NAT device 1006, which then forwards the packet to the endpoint 106 after performing the network address translation. However, the following discussion may simply refer to sending a packet to the endpoint 106 and it will be understood that the packet must traverse the NAT device 1006.

As illustrated by the table 1100, there are twenty-five possible pairings of NAT types and establishing communication between different NAT types may require different steps. For purposes of convenience, these twenty-five pairings may be grouped based on the required steps. For example, if the originating NAT type is no NAT, full cone, restricted cone, or port restricted cone, then the originating NAT can establish communication directly with a terminating NAT type of either no NAT or full cone.

If the originating NAT type is no NAT or full cone, then the originating NAT can establish communications with a terminating NAT type of either restricted cone or port restricted cone only after using the stateless reflector 1002 to reflect a packet. This process is described below with respect to FIG. 12.

Figure 12:
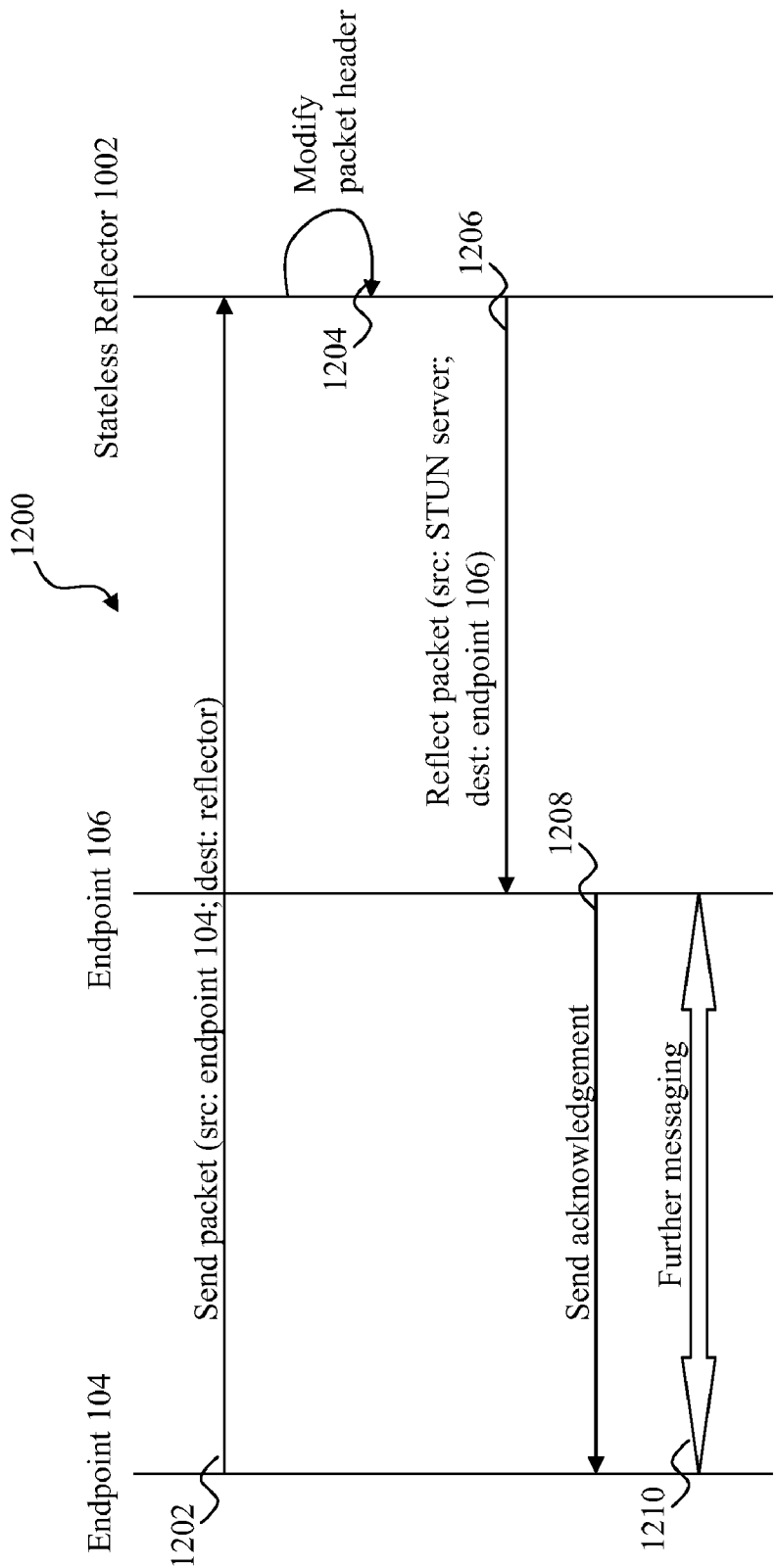
FIG. 12 is a sequence diagram illustrating one embodiment of a process from the table of FIG. 11 in greater detail.

Referring to FIG. 12, the endpoint 104 wants to inform the endpoint 106, which is already logged on, that the endpoint 104 has logged on. The NAT device 1004 is either a no NAT or a full cone type and the NAT device 1006 is either a restricted cone or a port restricted cone type. Accordingly, the endpoint 104 wants to send a message to the endpoint 106, but has not received a message from the endpoint 106 that would allow the endpoint 104 to traverse the NAT device 1006.

Although not shown in FIG. 12, prior to or during authentication, the endpoints 104 and 106 both sent a request to a STUN server (e.g., the STUN server 214 of FIG. 2) (not shown in FIG. 10). The STUN server determined an outbound IP address, an external port, and a type of NAT for the endpoints 104 and 106 (in this example, for the NAT devices 1004 and 1006). The STUN server 214 then sent a STUN response back to the endpoints 104 and 106 with the collected information. The endpoints 104 and 106 then sent an authentication request to an access server (e.g., the access server 102 of FIG. 1) (not shown in FIG. 10). The request contains the information about endpoints 104 and 106 received from the STUN server 214. The access server 102 responds to the requests by sending the relevant profile and routing table to the endpoints 104 and 106. In addition, each NAT device 1004 and 1006 may have a pinhole to the STUN server 214.

In the present example, the NAT device 1004 has an external address/port of 1.1.1.1:1111 and the NAT device 1006 has an external address/port of 2.2.2.2:2222. The STUN server 214 has an address/port of 3.3.3.3:3333 and the stateless reflector has an address/port of 4.4.4.4:4444. It is understood that the STUN server and/or stateless reflector 1002 may have multiple addresses/ports.

Figure 13:
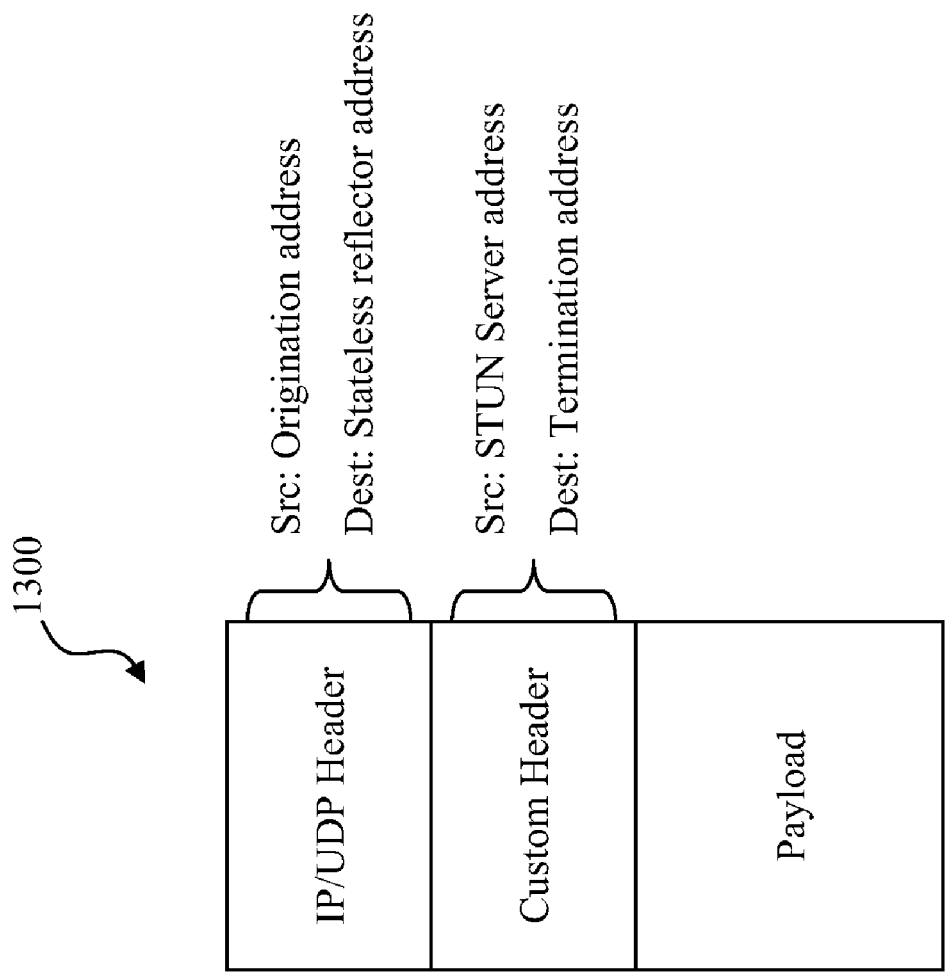
FIG. 13 illustrates one embodiment of a modified packet that may be used within the process of FIG. 12.

Referring to FIG. 12 and with additional reference to FIG. 13, in step 1202, the endpoint 104 sends a packet to the stateless reflector 1002. The packet contains header information identifying the source as the endpoint 104 (or rather, the external IP address of the NAT device 1004) and the destination as the stateless reflector 1002. The packet also contains custom or supplemental header information identifying the source as the STUN server 214 and the destination as the endpoint 106. Accordingly, the IP/UDP header of the packet sent from the endpoint 104 (via the NAT device 1004) identifies its source as 1.1.1.1:1111 and its destination as 4.4.4.4:4444.

In step 1204, the stateless reflector 1002 modifies the packet header by replacing the IP/UDP header with the source and destination from the custom header. In the present example, the stateless reflector 1002 will modify the IP/UDP header to identify the packet's source as 3.3.3.3:3333 and its destination as 2.2.2.2:2222. Identifying the packet's source as the STUN server 214 enables the stateless reflector 1002 to send the packet through the pinhole in the NAT device 1006 that was created when the endpoint 106 logged on. After modifying the header, the stateless reflector 1002 sends the packet to the endpoint 106 via the NAT device 1006 in step 1206.

In step 1208, the endpoint 106 sends an acknowledgement (e.g., a 200 OK) directly to the endpoint 104. The address of the endpoint 104 is contained within the payload of the packet. The endpoint 106 is able to send the acknowledgement directly because the NAT device 1004 is either a no NAT or a full cone type. Because the endpoint 106 has opened a pinhole through the restricted or port restricted NAT device 1006 to the endpoint 104 by sending a message to the endpoint 104, the endpoint 104 is now able to communicate directly with the endpoint 106, as indicated by step 1210.

Referring again to table 1100 of FIG. 11, if the originating NAT type is either a no NAT type or a full cone type, then the originating NAT can establish communications with a terminating NAT type that is symmetric only after using the stateless reflector 1002 to reflect a packet and then performing a port capture. This process is described below with respect to FIG. 14.

Figure 14:
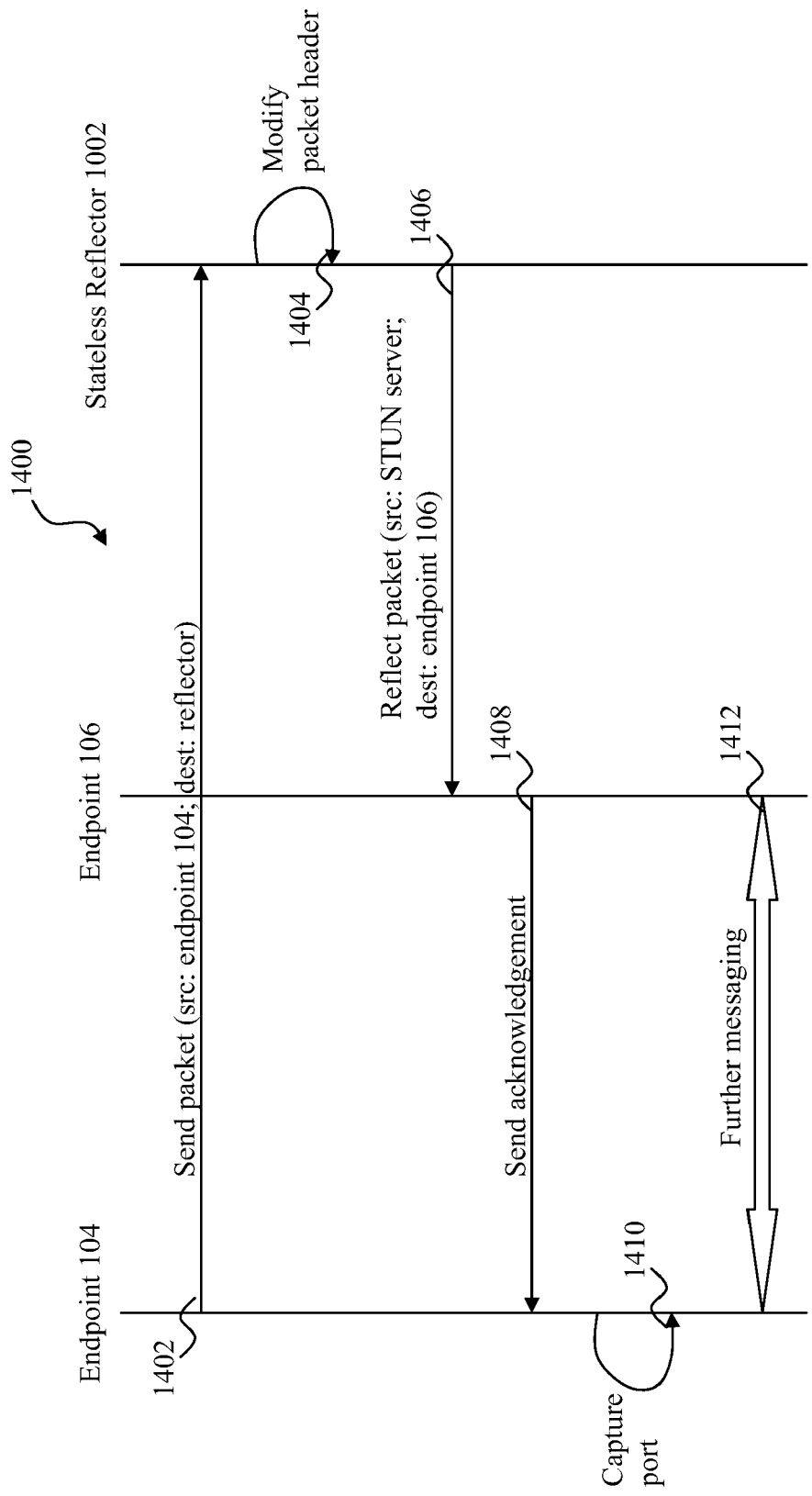
FIGS. 14-18 are sequence diagrams that each illustrate an embodiment of a process from the table of FIG. 11 in greater detail.

Referring to FIG. 14, steps 1402, 1404, 1406, and 1408 are similar to the reflection process described with respect to FIG. 12, and will not be described in detail in the present example. Because the terminating NAT type is symmetric, the originating NAT needs the port of the terminating NAT in order to send packets through the NAT device 1006. Accordingly, in step 1410, the endpoint 104 will capture the external port used by the NAT device 1006 to send the acknowledgement in step 1408. This port, along with the address of the NAT device 1006, may then be used when communicating with the endpoint 106, as indicated by step 1412.

Referring again to table 1100 of FIG. 11, if the originating NAT type is either a restricted cone type or a port restricted cone type, then the originating NAT can establish communications with a terminating NAT type that is either restricted or port restricted by using a fake packet and then using the stateless reflector 1002 to reflect a packet. This process is described below with respect to FIG. 15.

Figure 15:
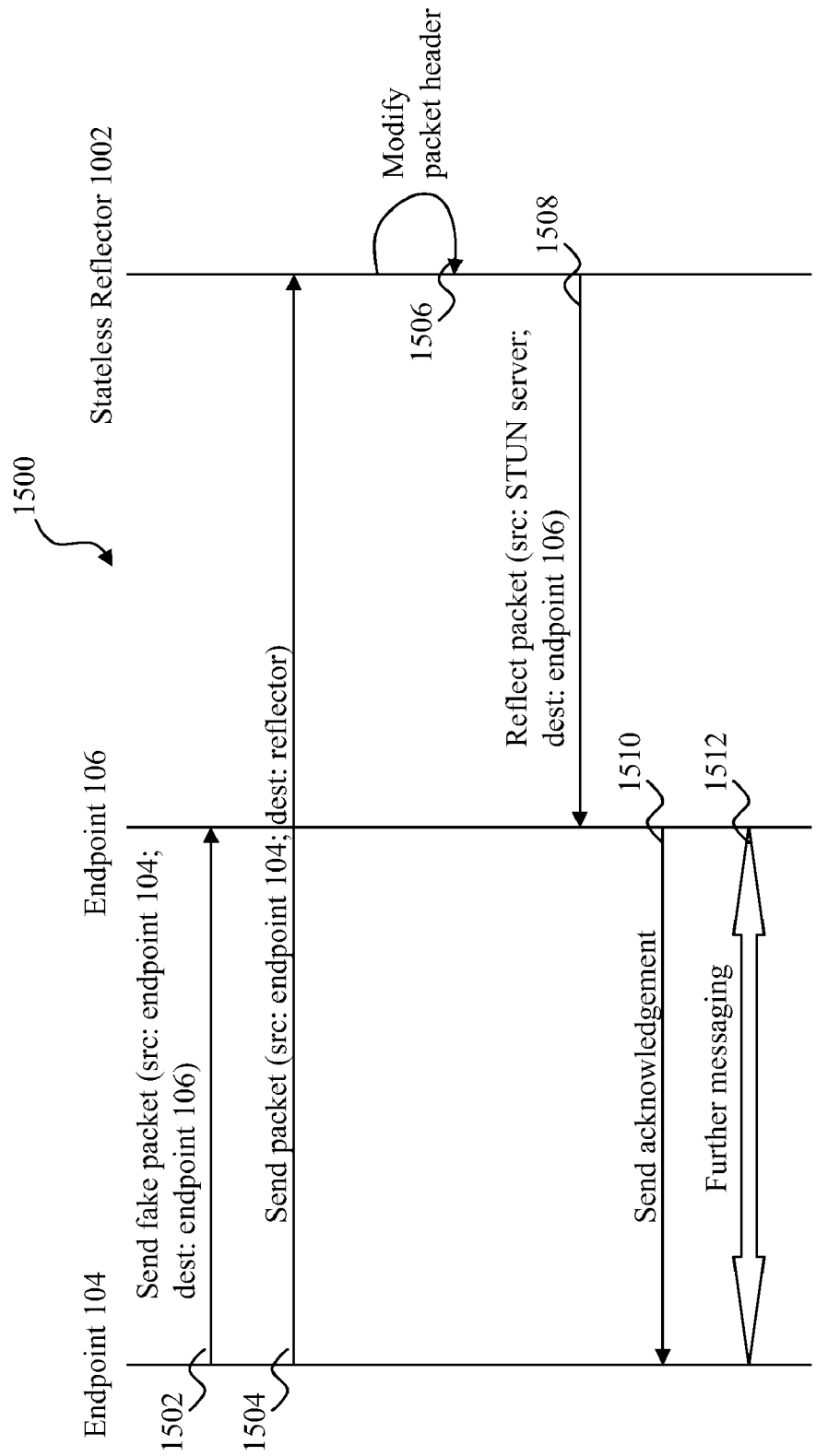

Referring to FIG. 15, in step 1502, the endpoint 104 sends a fake packet to the endpoint 106. Because the originating NAT type is a restricted cone type or a port restricted cone type, the fake packet opens a pinhole to the terminating NAT that will allow a response from the terminating NAT to penetrate the originating NAT. After sending the fake packet, the sequence 1500 proceeds with steps 1504, 1506, 1508, and 1510, which are similar to the reflection process described with respect to FIG. 12, and will not be described in detail in the present example. The endpoints 104 and 106 may then communicate directly, as indicated by step 1512.

Referring again to table 1100 of FIG. 11, if the originating NAT type is a symmetric type, then the originating NAT can establish communications with a terminating NAT type that is either no NAT or full cone after a port capture occurs. This process is described below with respect to FIG. 16.

Figure 16:
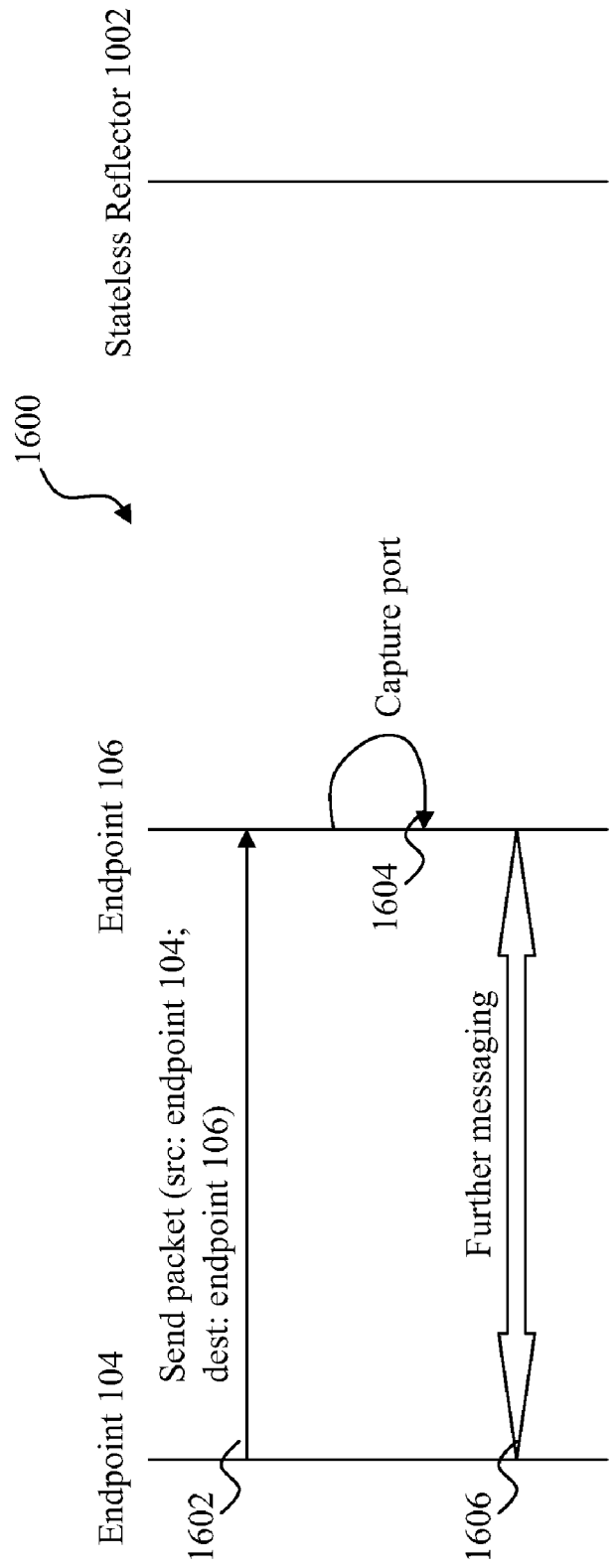

Referring to FIG. 16, in step 1602, the endpoint 104 (symmetric NAT type) sends a message to the endpoint 106. In step 1604, the endpoint 106 captures the external port used by the NAT device 1004 in sending the message. This port, along with the address of the NAT device 1004, may then be used when communicating with the endpoint 104 directly, as indicated by step 1606.

Referring again to table 1100 of FIG. 11, if the originating NAT type is a restricted cone type, then the originating NAT can establish communications with a terminating NAT type that is symmetric by using a fake packet, reflecting a packet using the stateless reflector 1002, and then performing a port capture. This process is described below with respect to FIG. 17.

Figure 17:
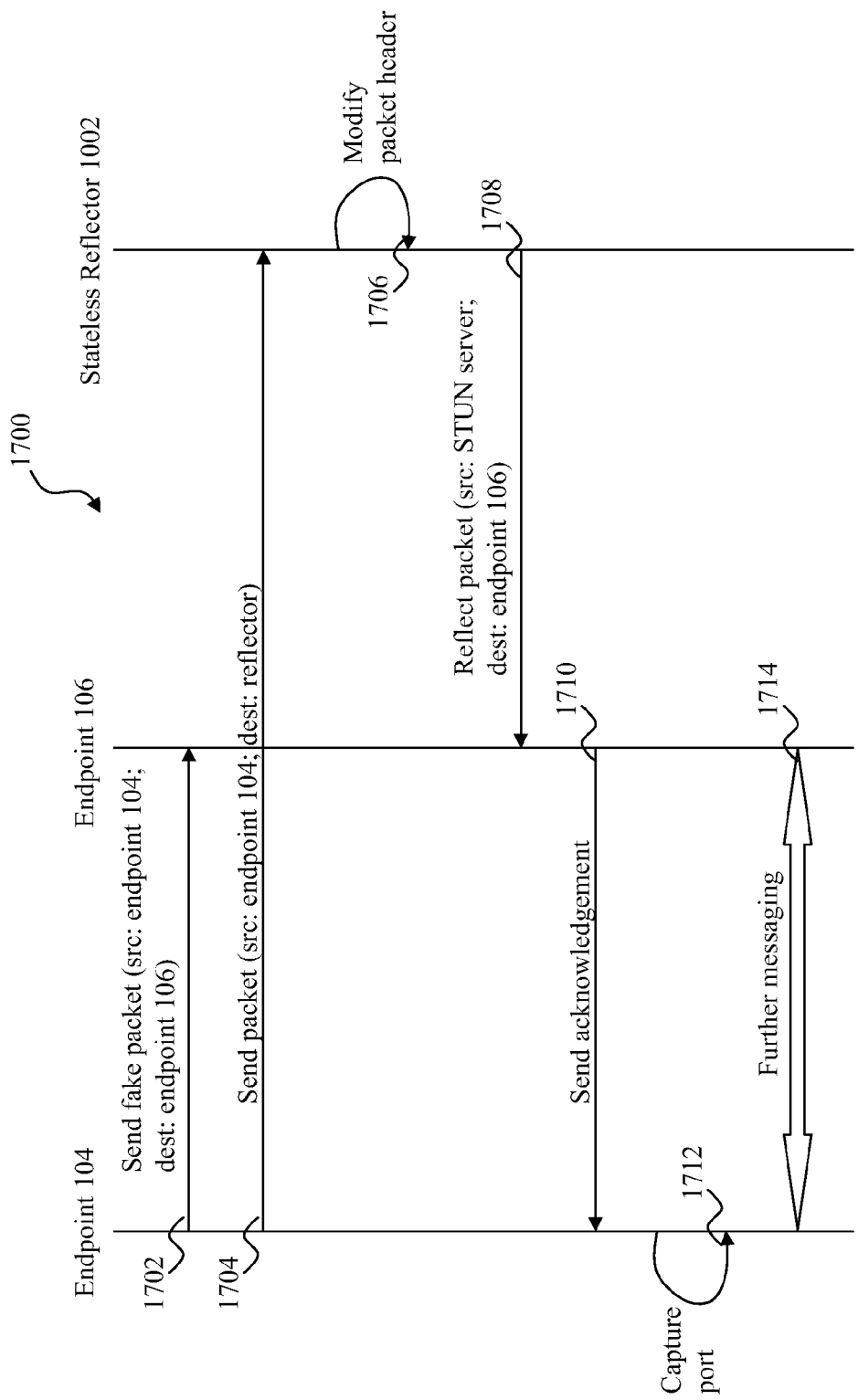

Referring to FIG. 17, in step 1702, the endpoint 104 sends a fake packet to the endpoint 106. Because the originating NAT type is a restricted cone type, the fake packet opens a pinhole to the terminating NAT that will allow a response from the terminating NAT to penetrate the originating NAT. After sending the fake packet, the sequence 1700 proceeds with steps 1704, 1706, 1708, and 1710, which are similar to the reflection process described with respect to FIG. 12, and will not be described in detail in the present example. In step 1712, the endpoint 104 captures the external port used by the NAT device 1006 in sending the acknowledgement in step 1710. This port, along with the address of the NAT device 1006, may then be used when communicating with the endpoint 106 directly, as indicated by step 1714.

Referring again to table 1100 of FIG. 11, if the originating NAT type is a symmetric type, then the originating NAT can establish communications with a terminating NAT type that is a restricted cone type by using a reflect, a fake packet, and a port capture. This process is described below with respect to FIG. 18.

Figure 18:
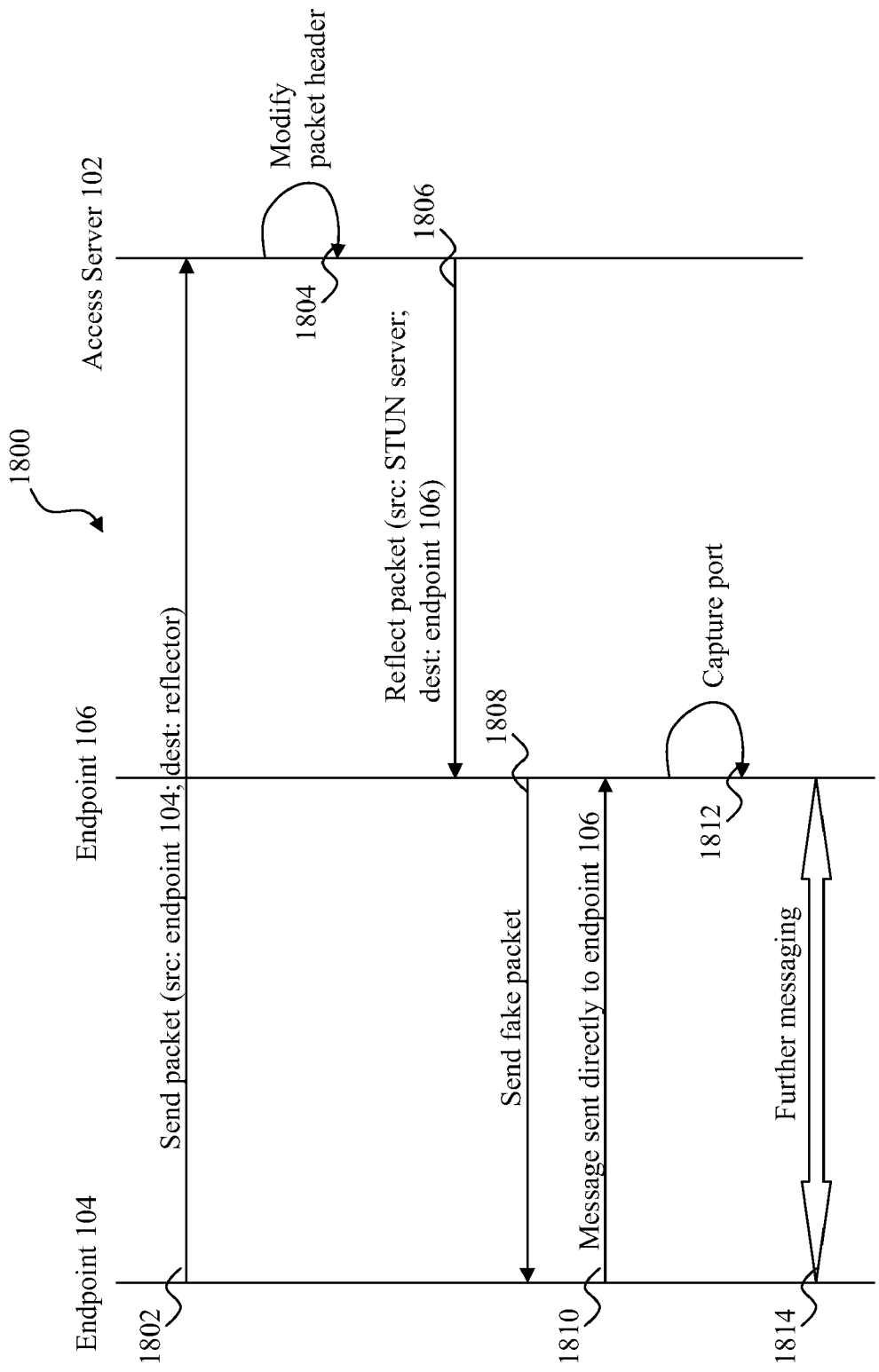

Referring to FIG. 18, steps 1802, 1804, and 1806 are similar to the reflection process described with respect to FIG. 12, and will not be described in detail in the present example. In step 1808, in response to the reflected message from the endpoint 104, the endpoint 106 sends a fake packet to the endpoint 104. Because the terminating NAT type is a restricted cone type, the fake packet opens a pinhole to the endpoint 104 to allow messages from the endpoint 104 to traverse the NAT device 1006. Accordingly, in step 1810, the endpoint 104 can send the next message directly to the endpoint 106 through the pinhole. In step 1812, the endpoint 106 captures the external port used by the NAT device 1004 to send the message in step 1810. This port, along with the address of the NAT device 1004, may then be used by the endpoint 106 when communicating directly with the endpoint 104, as indicated by step 1814.

Referring again to table 1100 of FIG. 11, if the originating NAT type is a symmetric type and the terminating NAT type is a port restricted cone, or if the originating NAT type is a port restricted cone and the terminating NAT type is symmetric, then all signaling between the two NAT devices is relayed via the stateless reflector 1002, while media is transferred via peer-to-peer, as described previously. If both the originating and terminating NAT types are symmetric, then all signaling and media are relayed via the stateless reflector 1002.

Accordingly, the peer-to-peer communications described herein may be achieved regardless of the NAT type that may be used by an endpoint. The stateless reflector 1002 need not know the information for each client, but instead reflects various packets based on information contained within the packet that is to be reflected. Both the custom header and payload may be encrypted for security purposes. However, the stateless reflector 1002 may only be able to decrypt the custom header and the payload itself may only be decrypted by the terminating endpoint. This enables the stateless reflector 1002 to perform the reflection functionality while maintaining the security of the payload itself. As described above, not all processes for traversing a NAT device may use the stateless reflector 1002.

Figure 19A:
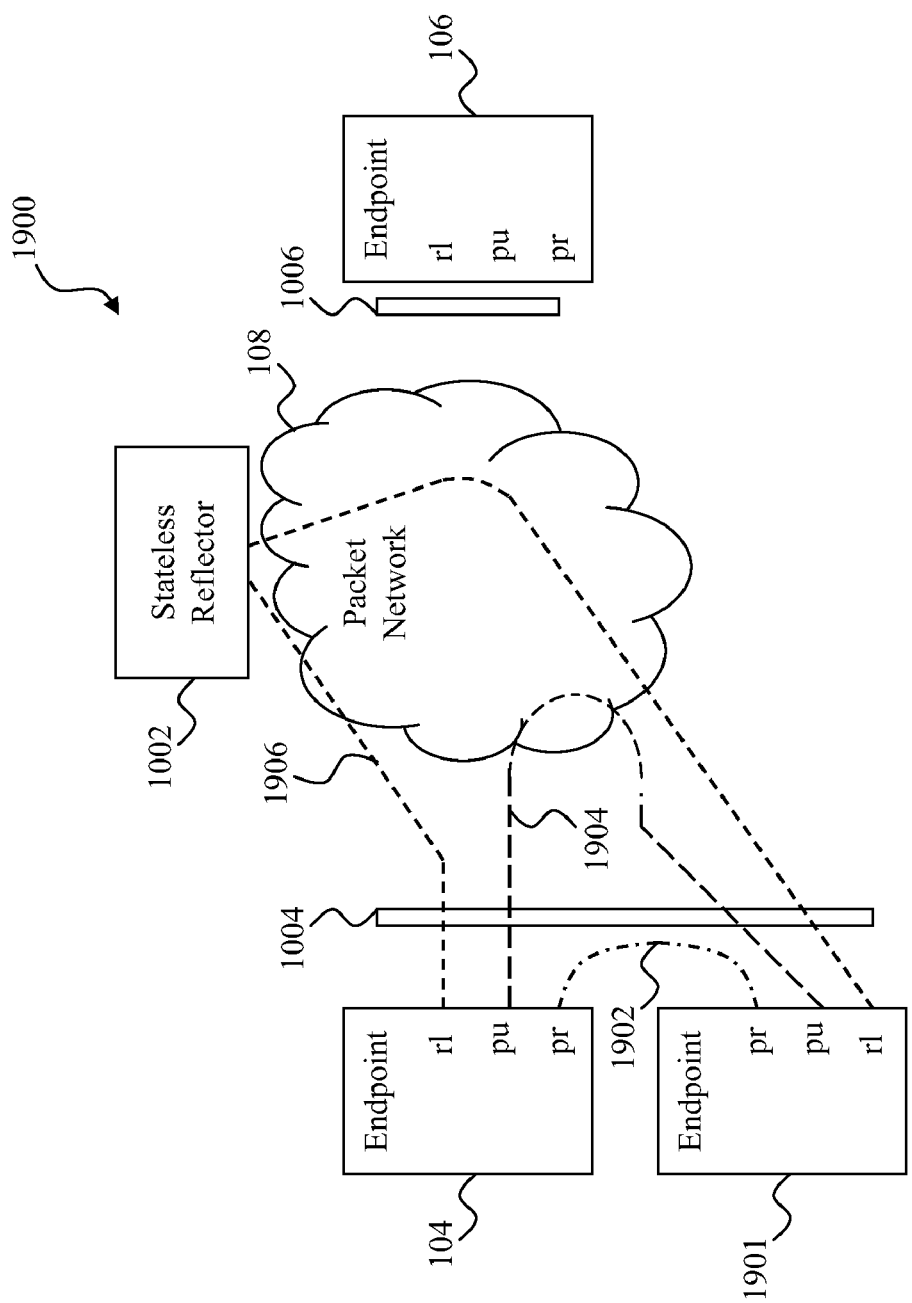
FIGS. 19A and 19B are simplified diagrams of another embodiment of a peer-to-peer system that includes multiple possible routes between endpoints.
Figure 19B:
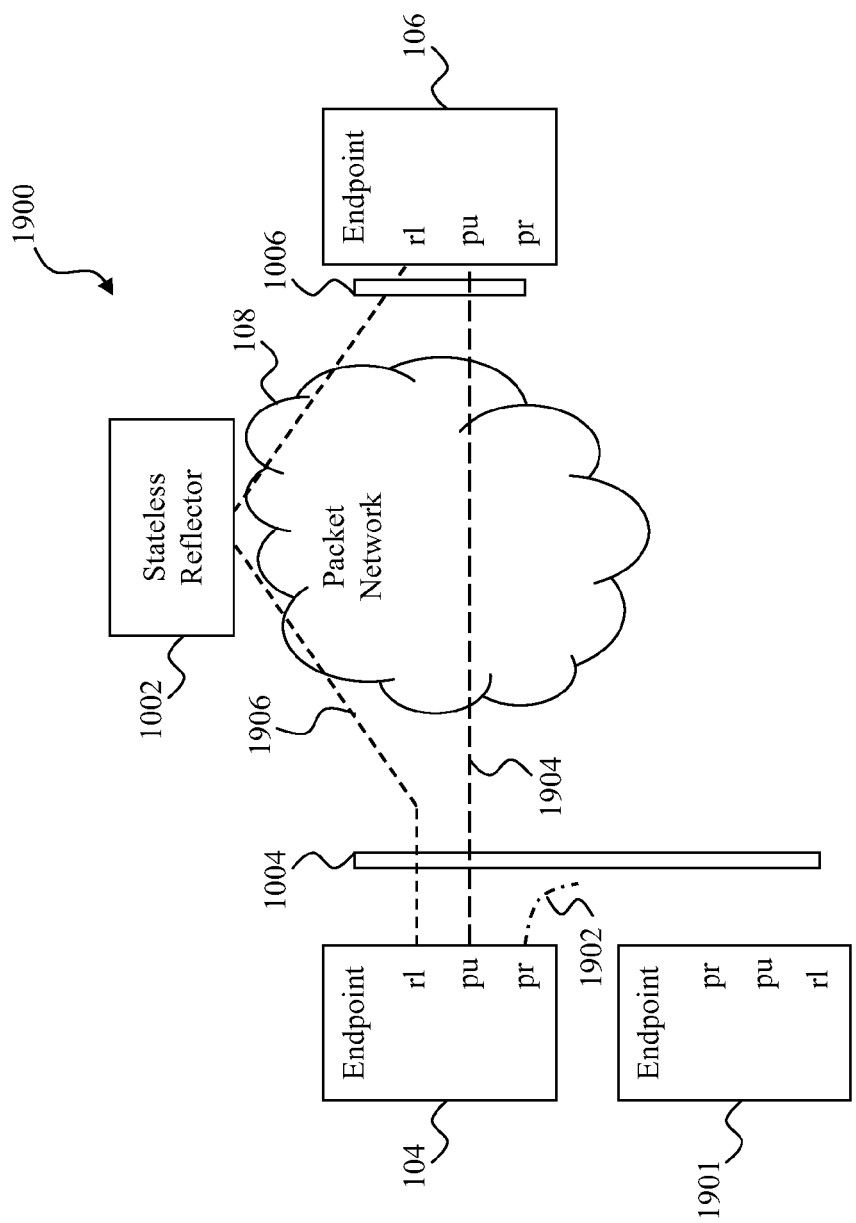

Referring to FIGS. 19A and 19B, in another embodiment, a peer-to-peer environment 1900 includes the two endpoints 104 and 106, the two NAT devices 1004 and 1006, and the stateless reflector 1002 of FIG. 10, and another endpoint 1901. Also illustrated are three possible routes between endpoints: a private (pr) route 1902, a public (pu) route 1904, and a reflected (rl) route 1906. FIG. 19A illustrates the routes 1902, 1904, and 1906 between the endpoint 104 and the endpoint 1901, and FIG. 19B illustrates the routes between the endpoint 104 and the endpoint 106. As will be discussed below in detail, the endpoints 104, 106, and 1901 may contain logic that allows one of the three routes 1902, 1904, and 1906 to be selected in a dynamic and flexible manner rather than relying on the rule-based system described above.

A rule-based system may be fairly inflexible, as such a system generally has a clear set of rules that are defined for various NAT situations and the current relationship between the two endpoints is handled according to those rules. Network configuration changes and other modifications may require revisions to the rules, which is not convenient and may prevent the endpoints from communicating until the rules are revised. Accordingly, in some embodiments, the flexibility described below may enable the endpoints 104, 106, and 1901 to adapt to new network configurations without requiring updated rules as would be required in a strictly rule-based system. In still other embodiments, the logic within the endpoints 104, 106, and 1901 may be updated to handle new network configurations, which also provides flexibility not found in strictly rule-based systems.

Each endpoint 104, 106, and 1901 may include one or more virtual interfaces for communication with other endpoints. In the present example, there are three virtual interfaces including a private virtual interface corresponding to the private route 1902, a public virtual interface corresponding to the public route 1904, and a relay virtual interface corresponding to the relay route 1906. It is understood that the term "virtual interface" is used only for purposes of description to clarify that there are multiple possible routes. Accordingly, the term "virtual interface" need not denote separate physical network interfaces on an endpoint, but may use a single physical network interface.

As described above, each endpoint 104, 106, and 1901 is generally associated with two IP address/port pairs. The first IP address/port pair may be the local (i.e., private) IP address/port information that represents each of the endpoints 104, 106, and 1901 in the network that is "inside" the corresponding NAT device 1004 or 1006. For example, the first IP address/port pair for the endpoint 104 may be the physical address assigned to the endpoint 104 by the corresponding NAT device 1004. This first IP address/port pair corresponds to the private virtual interface and may provide access via the private route to the endpoint 104 by endpoints in the same local network (e.g., the endpoint 1901). The second IP address/port pair may be the public IP address/port information that represents each of the endpoints 104, 106, and 1901 in the network that is "outside" the corresponding NAT device 1004 or 1006. For example, the second IP address/port pair for the endpoint 104 may be the address that is returned to the endpoint 104 by the STUN server as previously described (e.g., the NAT's external IP address/port pair assigned to the endpoint 104). This second IP address/port pair for the endpoint 104 corresponds to the public virtual interface and may provide access via the public route to the endpoint 104 by endpoints both inside and outside the endpoint 104's local network. Each endpoint 104, 106, and 1901 is also aware of the address information of the reflector 1002 as described in previous embodiments, which corresponds to the relay virtual interface of the endpoints. The relay route may be used in (5,4), (4,5), and/or (5,5) conditions according to the table of FIG. 11, where one endpoint must send a packet first, but is unable to do so because the other endpoint must send a packet first.

Figure 20:
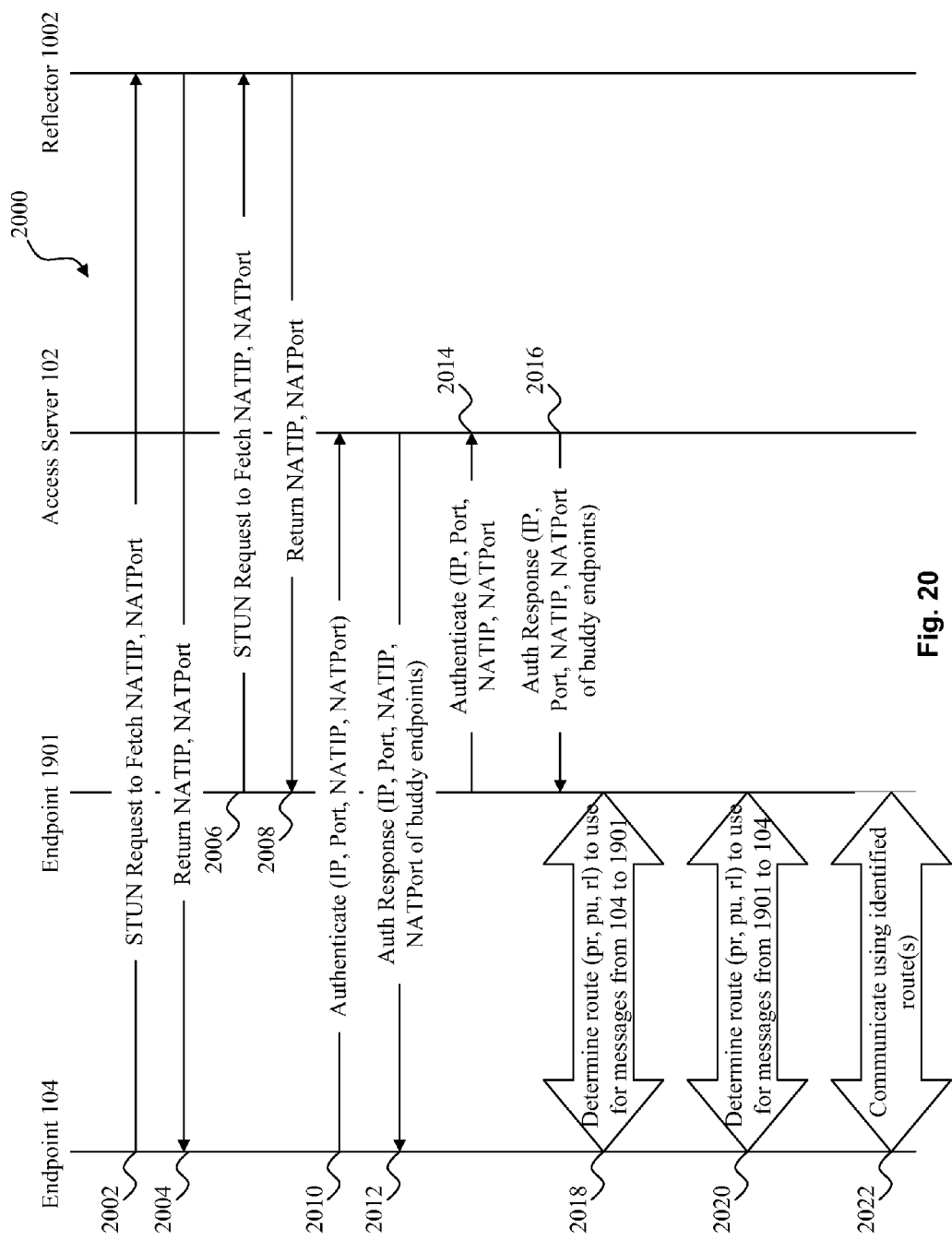
FIG. 20 is a sequence diagram illustrating one embodiment of a process that may be executed by endpoints within the system of FIGS. 19A and 19B.

Referring to FIG. 20, a sequence diagram illustrates one embodiment of a message sequence 2000 that may occur between the endpoints 104 and 1901 of FIG. 19A when identifying which of the routes (i.e., the private route 1902, the public route 1904, and the relay route 1906) will be used for communications. In the present example, the endpoints 104 and 1901 are in a local (i.e., private) network such as an Enterprise network, a local area network (LAN), a virtual LAN (VLAN), or a home network. This local network is isolated from the public network by the NAT device 1004 or a similar network component. Although shown as a single NAT device, it is understood that the NAT device 1004 may be a separate NAT device for each of the endpoints 104 and 1901. In contrast, the endpoint 106 is in a separate network that is only accessible by the endpoints 104 and 1901 via a public network that forms all or part of the packet network 108.

The present example uses a SIP messaging model over UDP, and so accommodates the transaction-based SIP model within connection-less UDP messaging. Because UDP is not transaction based, certain message handling processes may be used to conform to SIP standards, such as discarding multiple messages when the SIP model expects a message belonging to a specific transaction. However, it is understood that the sequence 2000 may be implemented using many different messaging models. In the present example, neither endpoint is online at the beginning of the sequence and the endpoints 104 and 1901 are "buddies." As described above, buddies are endpoints that have both previously agreed to communicate with one another.

In steps 2002 and 2006, the endpoints 104 and 1901, respectively, send STUN requests to obtain their corresponding public IP address/port pairs (NATIP, NATPort). In the present example, the reflector 1002 is serving as a STUN server, but it is understood that the STUN server may be separate from the reflector. The reflector 1002 responds to the STUN requests with the public IP address and port information for each of the endpoints 104 and 1901 in steps 2004 and 2008, respectively.

As the two endpoints 104 and 1901 are not logged in when the present example begins, they must both authenticate with the access server 102. In step 2010, the endpoint 104 sends an authentication request to the access server 102 with its private and public IP address/port pairs. In step 2012, the access server 102 responds to the authentication request and, as described previously, returns information that includes the private and public IP addresses of any buddy endpoints that are currently logged in. However, as the endpoint 1901 has not yet logged in, the information received by the endpoint 104 from the access server 102 will not include any address information for the endpoint 1901.

In step 2014, the endpoint 1901 sends an authentication request to the access server 102 with its private and public IP address/port pairs. In step 2016, the access server 102 responds to the authentication request and, as described previously, returns information that includes the private and public IP addresses of any buddy endpoints that are currently logged in. As the endpoint 104 is currently logged in, the information received by the endpoint 1901 from the access server 102 will include the private and public address information for the endpoint 104. Although not shown, the endpoint 1901 may then send a message to the endpoint 104 informing the endpoint 104 that the endpoint 1901 is currently online. This message may contain the private and public address information of the endpoint 1901. The message may be sent via the three different routes as described below with respect to later messaging, or may be sent via one or more selected routes. For example, the message may only be relayed (i.e., sent via the relay route) due to the high chance of success of that route.

At this point, the endpoint 104 wants to establish a communication session with the endpoint 1901, but does not know which of the three routes (i.e., pr, pu, and rl) should be used. In the previously described rule-based system, the endpoint 1901 would publish its NAT information, which enables the endpoint 104 to determine how to establish a connection. However, in the present example, such information is not published and the endpoint 104 does not know whether the endpoint 1901 is in the same private network as the endpoint 104, whether the endpoint 1901 is only accessible via a public network, whether the endpoint 1901 is behind a NAT device, or, if the endpoint 1901 is behind a NAT device, the settings of the NAT device (full cone, port restricted, etc.). Accordingly, the endpoint 104 needs to dynamically determine which of the three routes to use with the endpoint 1901.

Accordingly, in step 2018, the endpoint 104 interacts with the endpoint 1901 to determine which of the three routes should be used to send messages to the endpoint 1901. Similarly, in step 2020, the endpoint 1901 interacts with the endpoint 104 to determine which of the three routes should be used to send messages to the endpoint 104, which may not be the same route as that used by the endpoint 104 to send messages to the endpoint 1901. Steps 2018 and 2020 are illustrated in greater detail below with respect to FIG. 21. In step 2022, the two endpoints communicate via the determined route(s).

Figure 21:
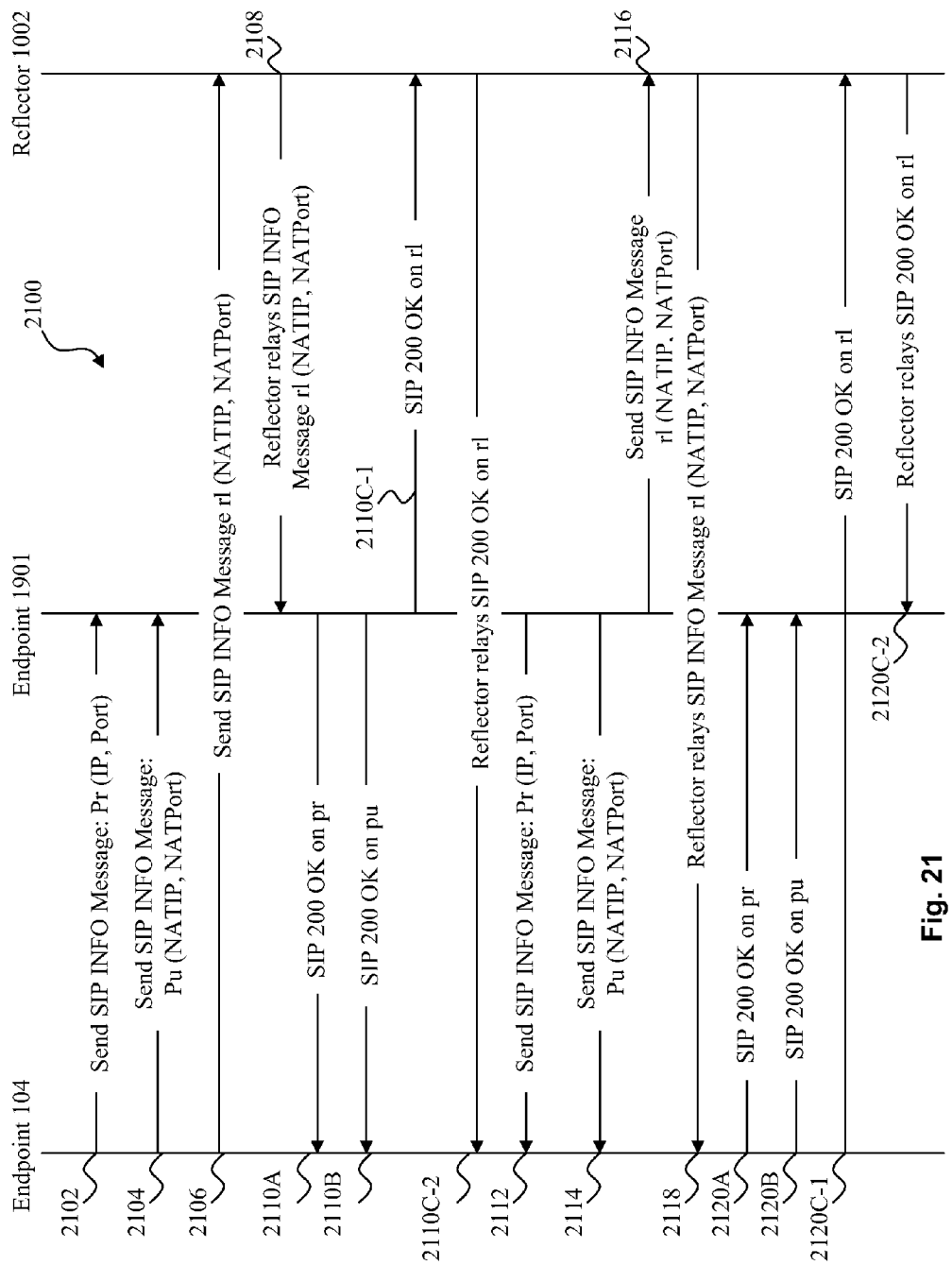
FIG. 21 is a sequence diagram illustrating one embodiment of steps from the sequence diagram of FIG. 20 in greater detail.

Referring to FIG. 21, a sequence diagram illustrates one embodiment of a message sequence 2100 that may occur during steps 2018 and 2020 of FIG. 20 in order to determine which of the routes are to be used. The endpoint 104 may keep a table containing each buddy that is online and the route to be used for that buddy. For example, when the route is unknown, the table may have the information shown in Table 1 below:

TABLE 1

| Buddy Endpoint | Route (send-receive) |
|---|---|
| 1901 | unk-unk |
| X | X |
| X | X |

The endpoint 104 (which is the originating endpoint in the present example) sends out three presence messages in steps 2102, 2104, and 2106. As the current example uses SIP messaging transported via UDP, the message is a SIP INFO message. More specifically, in step 2102, the endpoint 104 sends a SIP INFO message to the private IP address/port pair of the endpoint 1901 (i.e., via the private route) with an identifier such as a 'pr' tag to indicate the route. In step 2104, the endpoint 104 sends a SIP INFO message to the public (NAT) IP address/port pair of the endpoint 1901 (i.e., via the public route) with an identifier such as a 'pu' tag to indicate the route. In step 2106, the endpoint 104 sends a SIP INFO message to the endpoint 1901 via the reflector 1002 (i.e., via the relay route) with an identifier such as an 'rl' tag to indicate the route, which is reflected to the endpoint 1901 in step 2108.

The order in which the messages are sent may vary, but the order follows a hierarchy of desired routes in the present embodiment that places the private route first (i.e., most desirable), the public route next, and the relay route last (i.e., least desirable). However, it is understood that the order in which the messages are sent may vary or, if the endpoint 104 is capable of sending multiple messages simultaneously, the messages may be sent at the same time.

The present example assumes that the endpoint 1901 receives one or more of the messages sent in steps 2102, 2104, and 2106. If more than one message is received, the endpoint 1901 may respond only to the first one received. So, for example, if the message sent via the private route is received before the messages sent via the public and relay routes, the endpoint 1901 will respond only to the private route message and the later messages will be ignored. This reduces network traffic and provides for SIP compliance as the endpoint 104 (from a SIP perspective) expects to receive a single 200 OK message in response to its SIP INFO message. Furthermore, the response message may be sent back along the same route as the presence message to which the response is directed. So a response to the private route message will be sent back along the private route. Accordingly, only one of steps 2110A, 2110B, and 2110C-1 may occur in the present example. Step 2110C-2 is dependent on the occurrence of step 2110C-1 because the response message will not be reflected unless the relay route is used.

The response message returned by the endpoint 1901 is a SIP 200 OK message that may include the tag extracted from the received INFO message to identify which of the routes was successful (e.g., which route carried the message that was received first). For purposes of example, the private route was successful and the table may then be updated as shown in Table 2 below:

TABLE 2

| Buddy Endpoint | Route (send-receive) |
|---|---|
| 1901 | pr-unk |
| X | X |
| X | X |

It is noted that since the private route is successful, the two endpoints 104 and 1901 are in the same private network.

It is understood that the response message (e.g., the SIP 200 OK) may never be received by the endpoint 104. For example, the private route may not be available from the endpoint 1901 to the endpoint 104 due to network configuration settings. Accordingly, if the SIP 200 OK is not received by the endpoint 104, the endpoint 104 may execute a retransmission process that resends the presence messages along the three routes. The resending may occur a set number of times, for a set period of time, or until some other limit is reached. For example, the first set of presence messages may be sent 0.5 seconds after the initial messages are sent, the second set of messages may be sent one second after that, and each additional set of messages may be sent at time periods that are double the previous delay until a total of seven sets of messages are sent. At this time, the endpoint 104 may stop sending messages. If a response is received during the retransmission process, the endpoint 104 will stop retransmitting. However, the response message will generally be received by the endpoint 104.

The outbound SIP INFO messages and the received SIP 200 OK message inform the endpoint 104 of which route to use when sending communications to the endpoint 1901. However, this route may not work in reverse. In other words, just because the endpoint 104 can reach the endpoint 1901 via the private route (to continue the example), it does not necessarily follow that the endpoint 1901 can reach the endpoint 104 using the same route. For example, differences in the configurations of NAT devices or other network differences may mean one endpoint can be reached via a particular route even if the reverse route is not available.

Accordingly, the endpoint 1901 sends out three presence messages in steps 2112, 2114, and 2116. As the current example uses SIP messaging transported via UDP, the message is a SIP INFO message. More specifically, in step 2112, the endpoint 1901 sends a SIP INFO message to the private IP address/port pair of the endpoint 104 (i.e., via the private route). In step 2114, the endpoint 1901 sends a SIP INFO message to the public (NAT) IP address/port pair of the endpoint 104 (i.e., via the public route). In step 2116, the endpoint 1901 sends a SIP INFO message to the endpoint 104 via the reflector 1002 (i.e., via the relay route), which is reflected to the endpoint 104 in step 2118.

The present example assumes that the endpoint 104 receives one or more of the messages sent in steps 2112, 2114, and 2116. If more than one message is received, the endpoint 104 may respond only to the first one received. Accordingly, only one of steps 2120A, 2120B, and 2120C-1 may occur in the present example. Step 2120C-2 is dependent on the occurrence of step 2120C-1 because the response message will not be reflected unless the relay route is used. The response message returned by the endpoint 104 is a SIP 200 OK message that identifies which of the routes was successful (e.g., was received first).

If the first (or only) SIP INFO message received by the endpoint 104 from the endpoint 1901 is received via the same route as that used by the endpoint 104 to send messages to the endpoint 1901 (e.g., the private route), then the communication session is established with messages going both ways on that route. At this point, the table may then be updated as shown in Table 3 below:

TABLE 3

| Buddy Endpoint | Route (send-receive) |
|---|---|
| 1901 | pr-pr |
| X | X |
| X | X |

However, the first (or only) SIP INFO message received by the endpoint 104 from the endpoint 1901 may be received on a different route than that used by the endpoint 104 to send messages to the endpoint 1901. When this occurs, the endpoint 104 flags this as the endpoint 1901 responded to the INFO message via one route but is now communicating via another route. For example, the endpoint 1901 responded on the private route, but is now using the public route. One possibility for this discrepancy is that there is a router or other network device interfering with the return path (i.e., the path used by the endpoint 1901 to send messages to the endpoint 104). Another possibility is that a message went faster one way than another way. For example, while the endpoint 1901 may have received the private message from the endpoint 104 (i.e., the message of step 2102 of FIG. 21) before the other messages, the endpoint 104 may have received the public message from the endpoint 1901 (i.e., the message of step 2114 of FIG. 21) before the public and relay messages.

When this occurs, the endpoint 104 may transition from the private route to the public route. This results in sending and receiving routes of pu-pu as illustrated by Table 4 below:

TABLE 4

| Buddy Endpoint | Route (send-receive) |
|---|---|
| 1901 | pu-pu |
| X | X |
| X | X |

The endpoint 104 may also be configured to confirm that this transition is correct. To confirm the transition, the endpoint 104 executes a confirmation process and sends a confirmation message to the endpoint 1901 on the private route (i.e., the route that the endpoint 104 thinks it should be using to send messages to the endpoint 1901). In the present example, the confirmation message may include a SIP field named MAX_FORWARDS that defines a maximum number of hops that a packet can take before being dropped. The MAX_FORWARDS field has a standard default value of seventy, but the endpoint 104 may set the value to one (i.e., MAX_FORWARDS=1). If the response message from the endpoint 1901 is received by the endpoint 104 and has set the MAX_FORWARDS field to 0, then the endpoint 104 transitions back to the private route and uses that route for sending future messages. This results in different sending and receiving routes as illustrated by Table 5 below:

TABLE 5

| Buddy Endpoint | Route (send-receive) |
|---|---|
| 1901 | pr-pu |
| X | X |
| X | X |

However, if the endpoint 104 does not receive a response message to its confirmation message, it continues using the public route. This results in sending and receiving routes of pu-pu as illustrated by Table 4 above.

Communications between the endpoints 104 and 106 as illustrated in FIG. 19B may follow the same sequence of presence messages and responses as that described above with respect to FIGS. 20 and 21. However, since the endpoints 104 and 106 are in separate networks (i.e., not the same local network), the private route 1902 is not available and the private presence messages will fail to reach their destination. The presence messages may still be sent each way on the private route as the endpoints 104 and 106 do not know the location of the other endpoint, but the messages will be dropped. For example, the NAT devices 1004 and 1006 may both be routers that have an address of 192.168.1.1 in their respective home networks. The NAT device 1004 may assign a private address of 192.168.1.10 to the endpoint 104 and the NAT device 1006 may assign a private address of 192.168.1.15 to the endpoint 106. Although these addresses appear to be in the same local network, they are not. However, as the endpoints 104 and 106 have no way of knowing whether the private addresses are in the same local network until they perform their strategic routing sequences, they may both send their private presence messages along the private route, even though the messages will both fail. Accordingly, the endpoints 104 and 106 will use the public route 1904 and/or the relay route 1906 when communicating.

Figure 22:
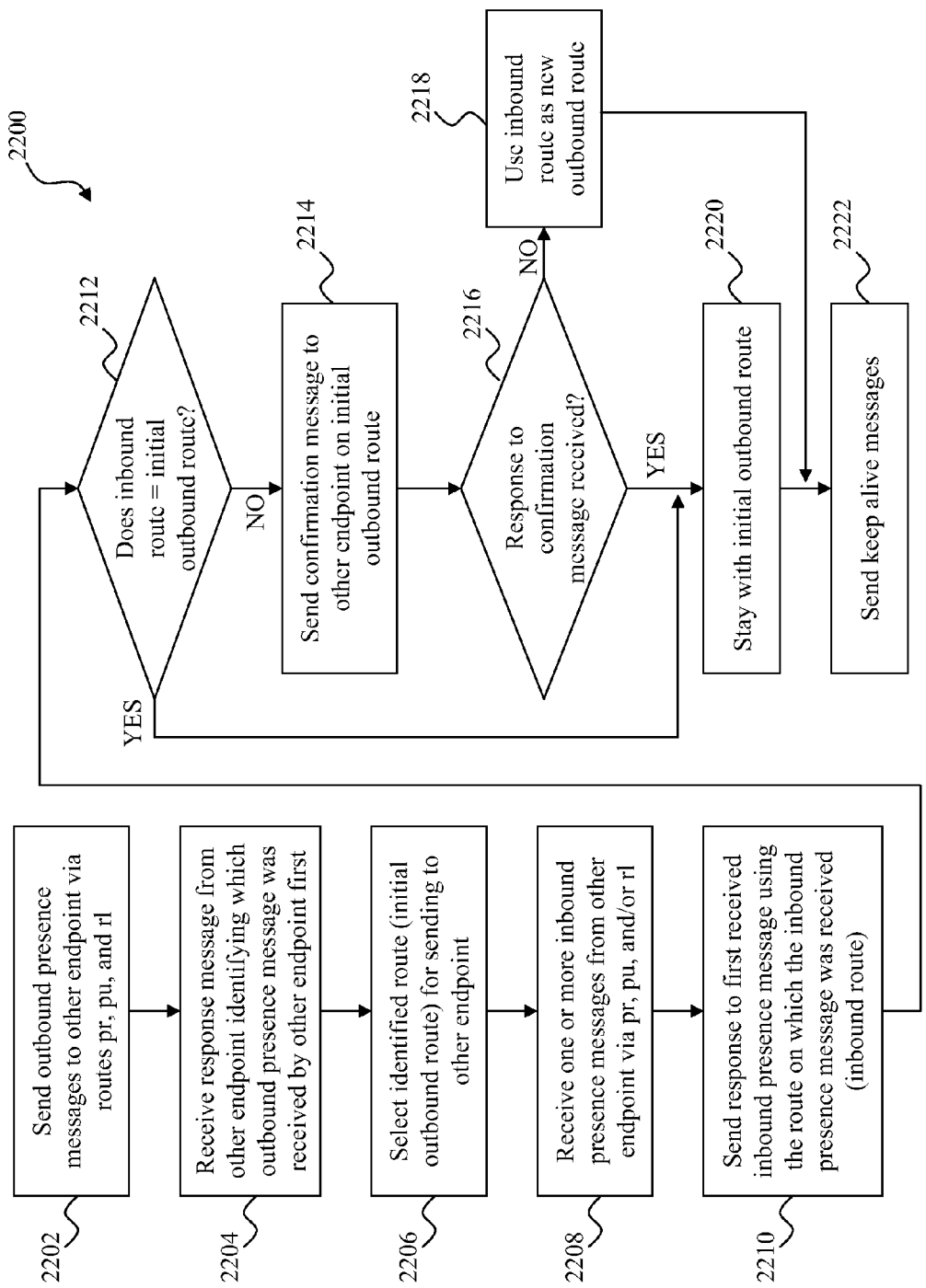
FIG. 22 is a flow chart illustrating one embodiment of a method that may be executed by an endpoint within the system of FIGS. 19A and 19B.

Referring to FIG. 22, a flowchart illustrates one embodiment of a method 2200 that may represent a process by which an endpoint such as the endpoint 104 of FIGS. 19A and 19B establishes a connection with another endpoint as described with respect to FIGS. 20 and 21 above.

In step 2202, the endpoint 104 sends outbound presence messages on the private, public, and relay routes. The presence messages may contain identifiers such as tags or other route indicators, or the receiving endpoint may simply note which virtual interface (i.e., pr, pu, or rl) received a particular presence message and correlate the message with the route upon receipt. In step 2204, the endpoint 104 receives a response message that indicates which of the presence messages was received first. For example, the response message may include the tag from the presence message to identify the route corresponding to the received presence message. In step 2206, the endpoint 104 selects the identified route as the initial outbound route for messages being sent to the other endpoint.

In step 2208, the endpoint receives one or more inbound presence messages from the other endpoint. In step 2210, the endpoint 104 sends a response to the first received inbound presence message.

In step 2212, the endpoint 104 determines whether the inbound route of the message received in step 2210 is the same route as the initial outbound route selected in step 2206. If the routes are the same, the method 2200 continues to step 2220 and uses the initial outbound route to send messages to the other endpoint. If the routes are not the same, the method 2200 moves to step 2214 and sends a confirmation message to the other endpoint using only the initial outbound route. In step 2216, the endpoint 104 determines whether a response to the confirmation message has been received. If no response to the confirmation message has been received, the method 2200 moves to step 2218 and transitions to the inbound route as the new outbound route for messages being sent to the other endpoint. If a response to the confirmation message has been received, the method 2200 continues to step 2220 and uses the initial outbound route to send messages to the other endpoint.

In step 2222, the endpoint 104 may begin sending keep-alive messages to the other endpoint to ensure that the outbound route remains open. For example, one of the networks or NAT devices involved in the established session may undergo a configuration change or a failure while the two endpoints are online, and so an existing route may become unusable. In such a case, the endpoint may detect that the keep-alive messages are failing and so may return to step 2202 to re-establish a valid route. It is noted that the other endpoint may not need to re-establish its outbound route. For example, if the inbound and outbound routes for the endpoint 104 are different, the inbound route may remain valid even though the outbound route is invalid. Accordingly, some steps of the method 2200 may be skipped in some scenarios.

It is noted that many different variations of the method 2200 may exist. For example, the endpoint 104 may transition to the inbound route as the new outbound route if it is determined in step 2212 that the routes are not the same, rather than remaining on the initial outbound route. Then, if a response is received to the confirmation message, the endpoint 104 may transition back to the initial outbound virtual interface. Furthermore, as stated previously, the response message may never be received by the endpoint 104 and so some steps of the method 2200 may not occur or may occur in a different order as there may be no response message available to determine the initial outbound route. It is also noted that some steps of the method 2200 may be performed in a different order than shown. For example, step 2208 may occur before step 2204 depending on network latency and other factors.

Figure 23A:
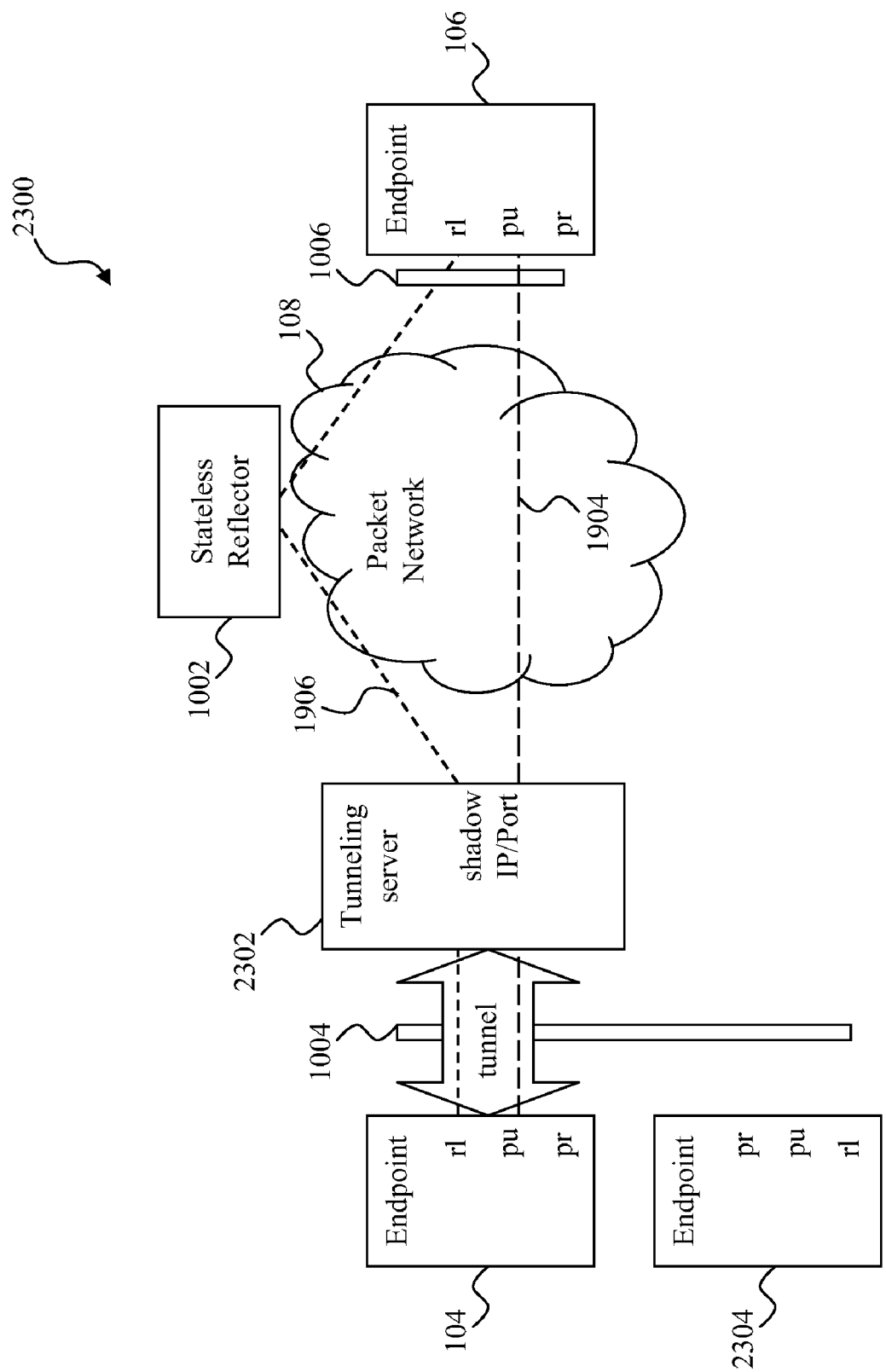
FIGS. 23A and 23B are simplified diagrams of another embodiment of a peer-to-peer system that includes a tunneling server and multiple possible routes between endpoints.
Figure 23B:
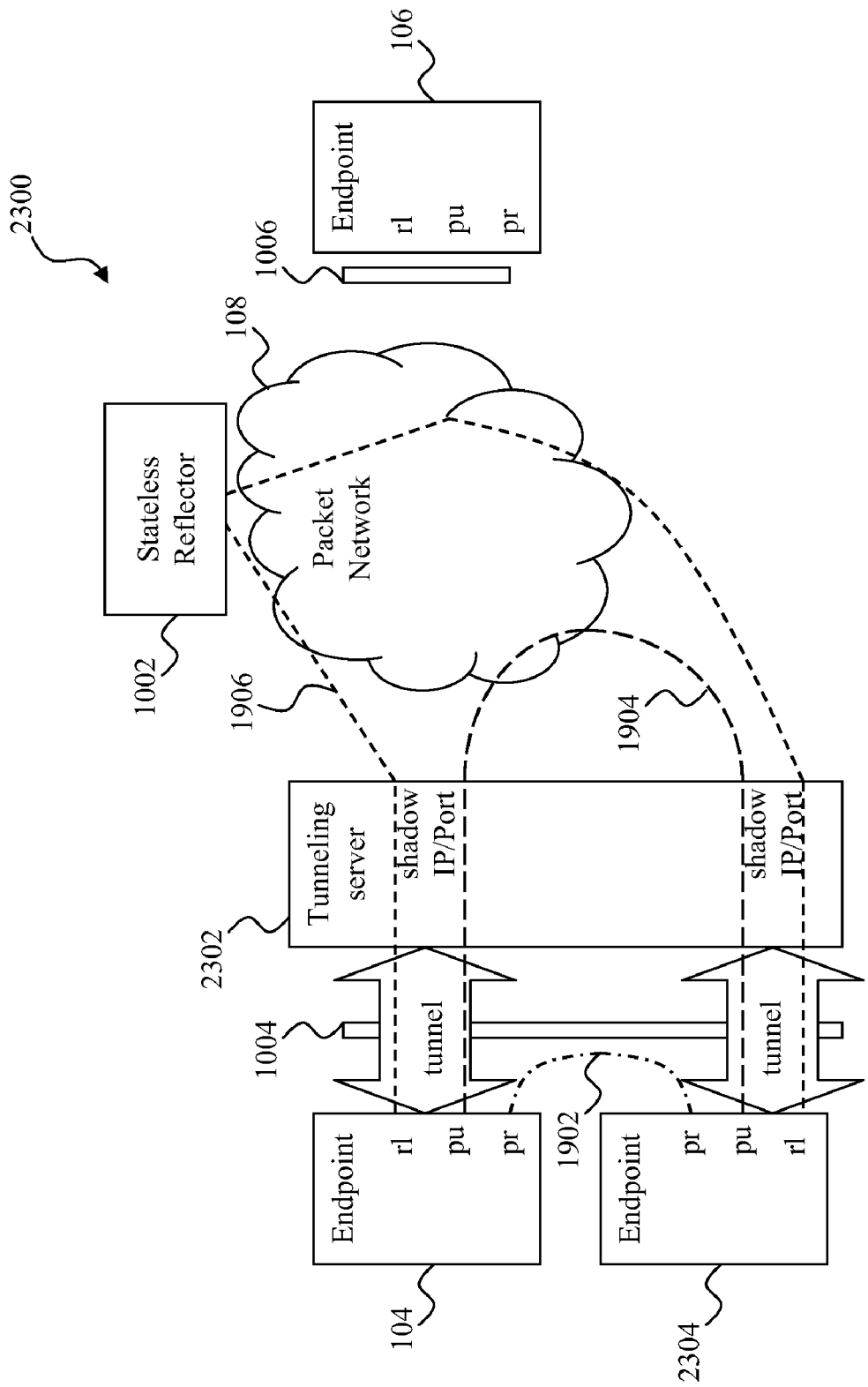

Referring to FIGS. 23A and 23B, in another embodiment, the endpoints 104 and 106, the two NAT devices 1004 and 1006, and the stateless reflector 1002 of FIGS. 19A and 19B are illustrated with a tunneling server or other access device 2302 and another endpoint 2304. The tunneling server 2402 may provide access to other endpoints for an endpoint that does not have UDP access or access to another expected protocol. For example, if the endpoint 104 performs a STUN request and the request fails, the network within which the endpoint 104 is positioned may not support UDP (e.g., the network may be an Enterprise network that has disabled UDP). For purposes of illustration, the endpoints 104 and 2304 are in a private network and not separated by the NAT device 1004, and the endpoint 106 is separated from the endpoint 104 by the NAT devices 1004 and 1006.

Figure 24:
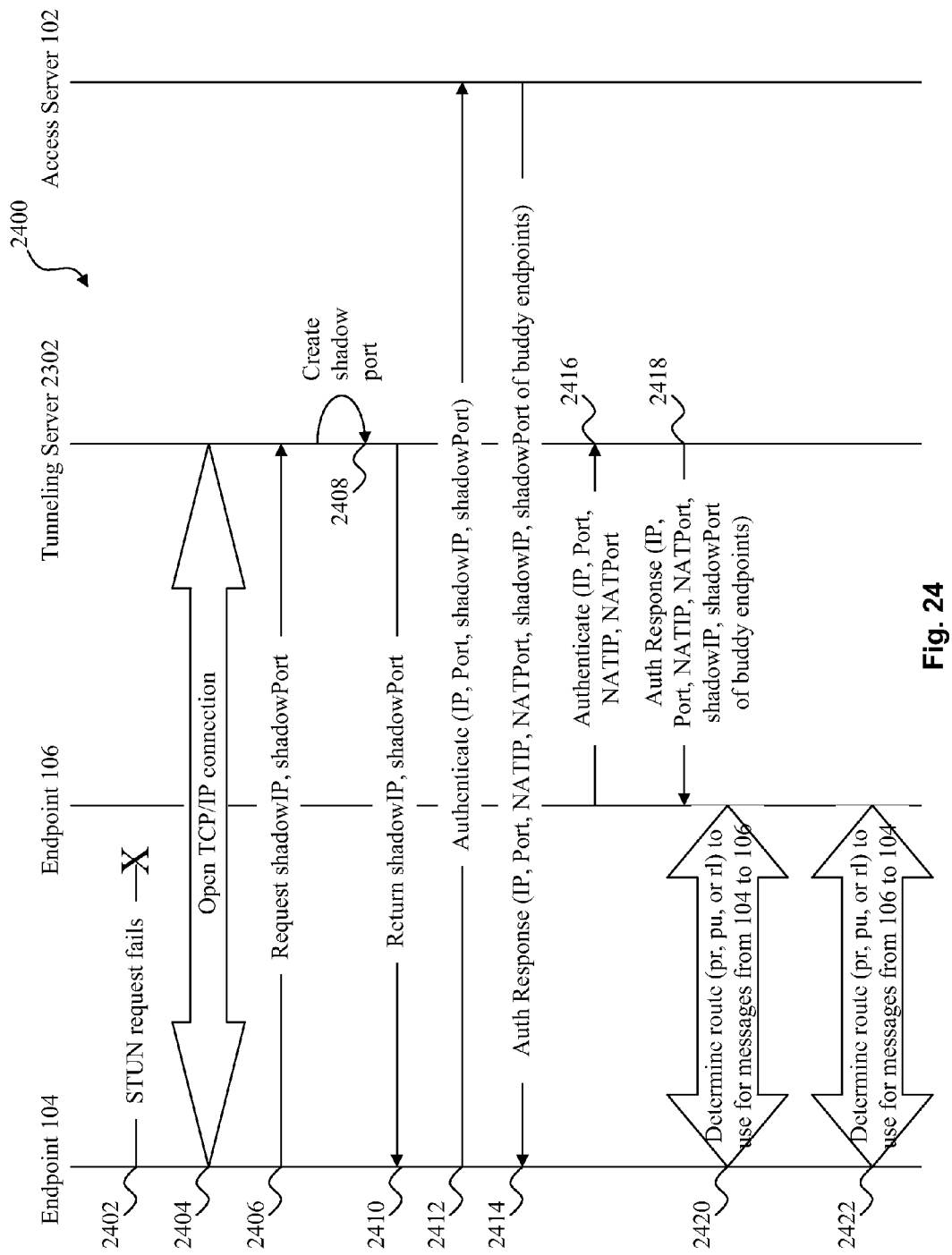
FIG. 24 is a sequence diagram illustrating one embodiment of a process that may be executed by endpoints within the system of FIGS. 23A and 23B.

Referring to FIG. 24, a sequence diagram illustrates one embodiment of a message sequence 2400 that may occur in the environment of FIGS. 23A and 23B to establish a connection between the endpoints 104 and 106. As with the previous discussion of FIG. 20, the endpoints 104 and 106 may each maintain a table, although this is not shown in the present example.

In step 2402, the endpoint 104 sends a STUN request that fails. Based on the failure of the STUN request, the endpoint 104 determines that the network (e.g., the NAT device 1004) has disabled UDP. It is understood that other indicators may be used to determine that UDP is not available. In step 2404, based on the unavailability of UDP, the endpoint 104 opens a TCP/IP connection (i.e., a tunnel) with the tunneling server 2302. This connection may use a port such as port 443 of the NAT device 1004, which is the default TCP port for HTTP Secure (HTTPS) connections using the Transport Layer Security (TLS) or Secure Socket Layer (SSL) protocols. However, it is understood that port 443 is only an example and that other available ports may be used. In step 2406, the endpoint 104 requests a shadow IP address and shadow port on the tunneling server 2302. In step 2408, the tunneling server 2302 creates the shadow IP address and port and returns this information to the endpoint 104 in step 2410.

The shadow IP address and shadow port serve as the public address and port of the endpoint 104 for other endpoints. In other words, the shadow IP address/port replace the NAT IP address/port that would serve as the public contact information for the endpoint 104 in an environment in which UDP is available to the endpoint 104 (e.g., as in FIGS. 19A and 19B). In some embodiments, the shadow IP address/port pairs may be placed on a shadow list as they are provisioned and the shadow list may be available to the access server 102 and/or endpoints. In other embodiments, the access server 102 and/or endpoints may have a list or range of IP addresses/ports that are known to be shadows. In still other embodiments, the knowledge of whether an IP address/port is a shadow is not available to the access server 102 and/or endpoints.

In step 2412, the endpoint 104 authenticates with the access server 102 via the tunnel using its local IP address/port and shadow address/port information. In step 2414, the access server 102 authenticates the endpoint 104 and sends the endpoint 104 the contact information of online buddies, including corresponding private, public, and shadow IP address/port information.

Although not shown in FIG. 24, the endpoint 106 sends a request to a STUN server and receives its public IP address/port information as described with respect to the endpoints 104 and 1901 in FIG. 20. Since the endpoint 106 is successful with its STUN request, it does not need to use the tunneling server 2302. In steps 2416 and 2418, the endpoint 106 authenticates with the access server and receives the private IP address/port and shadow IP address/port of the endpoint 104. As discussed above, the endpoint 106 may or may not know that the endpoint 104 is using a shadow, depending on the particular implementation of the shadow list.

In steps 2420 and 2422, the endpoints 104 and 106 may establish a communication session as described previously with respect to FIGS. 20 and 21. However, the communications between the two endpoints 104 and 106 will use the tunnel between the endpoint 104 and the tunneling server 2302 and the corresponding shadow IP address and port for the endpoint 104.

In embodiments where the endpoint 106 knows that the endpoint 104 is using a shadow, the endpoint 106 may not send a presence message via the private route as the endpoint 106 knows that the private route is not available. In other embodiments, the endpoint 106 may send a presence message via the private route even though the route is not available.

Communications between the endpoints 104 and 2304 as illustrated in FIG. 23B may follow a similar sequence of presence messages and responses as that described above with respect to FIG. 24. However, since the endpoints 104 and 2304 are in the same local network, the private route 1902 is available and the private presence messages may reach their destinations. The endpoint 2304 may not use a relay message to try to reach the endpoint 104, since its failed STUN request will inform the endpoint 2304 that UDP is not available. In order to use the public and relay routes, the endpoint 2304 will create a tunnel with the tunneling server 2303 as described above with respect to the endpoint 104. The public and relay messages may still work via the respective tunnels of the endpoints 104 and 2304.

Figure 25:
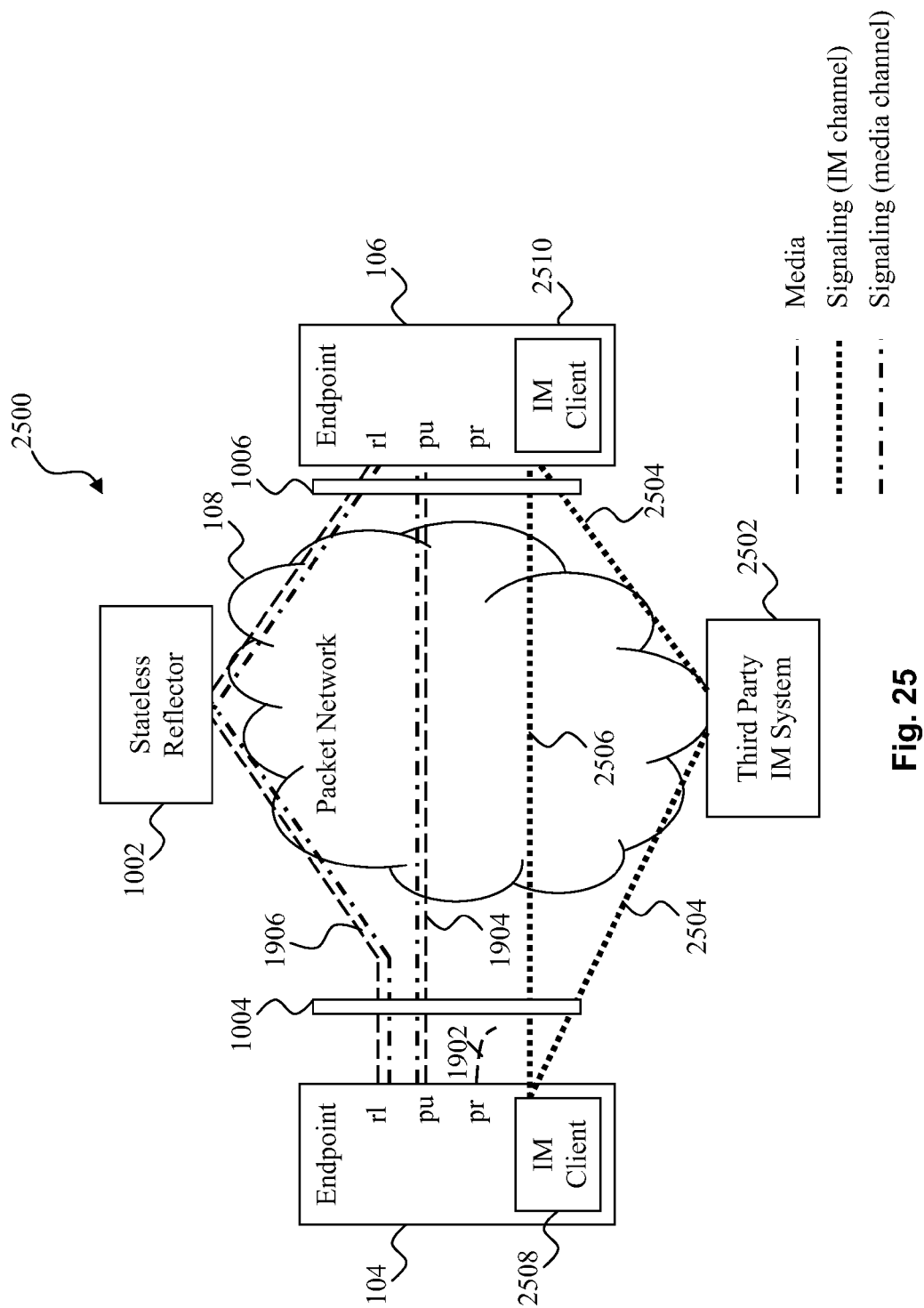
FIG. 25 is a simplified diagram of another embodiment of a peer-to-peer environment in which endpoints may engage in a call by exchanging signaling information via a third party instant message system that is separate from a peer-to-peer hybrid network and by exchanging media information via one or more routes that are established via the peer-to-peer hybrid network and outside of the third party instant message system.

Referring to FIG. 25, in another embodiment, an environment 2500 is illustrated in which the endpoint 104 (FIG. 1) and the endpoint 106 (FIG. 1) may communicate via a third party instant messaging (IM) system 2502. As will be described below, at least the initial signaling between the endpoints 104 and 106 may use the third party IM system 2502 as a signaling path, while media transfers between the endpoint 104 and 106 may occur outside of the third party IM system 2502 using other routes (e.g., the private route 1902, the public route 1904, and/or the reflected route 1906 of FIGS. 19A and 19B). Later signaling may use the third party IM system 2502 and/or the other route(s) as will be described below. In the present embodiment, one or both of the endpoints 104 and 106 are mobile devices, although it is understood that they may be any other type of endpoint as described above. Furthermore, the endpoints 104 and 106 have IM functionality, audio/video functionality, and/or any other functionality that may be provided by an endpoint.

As is known, IM systems such as the third party IM system 2502 allow a user to send and receive instant messages (i.e., text messages) using an IM client provided by the particular third party IM system 2502. In some IM systems, the instant messages may include text formatting options (e.g., allowing bold or italicized text) and may also allow other information, such as HyperText Transfer Protocol (HTTP) links, to be sent and recognized by the IM client. However, such instant messages may be limited to text and may provide limited or no media options. In cases where media options are provided within the third party IM system 2502, the media options may be separate from the instant messages and may be proprietary to the third party IM system 2502. This means that the media options may not be accessible to outside service providers, while the instant message interfaces may be documented for use by outside service providers.

Signaling communications between the endpoints 104 and 106 using the instant message capabilities provided by the third party IM system 2502 may be routed through the third party IM system 2502 (e.g., through a server of the third party system 2502) as illustrated by path 2504, may be routed between the endpoints 104 and 106 as illustrated by path 2506, or may be routed through some combination of the paths 2504 and 2506. Media communications (and some signaling communications in some embodiments) are routed through one or more routes that are supported by a peer-to-peer hybrid network and are outside of the third party IM system 2502. For example, the media routes may include one or more of the private route 1902, the public route 1904, and/or the relay route 1906. Although not shown as an available route in FIG. 25, it is understood that the private route 1902 may be available if the endpoint 106 is in the same network as the endpoint 104 as described with respect to FIG. 19A.

In FIG. 25, the bearer type for a signaling message (i.e., whether the bearer is an IM or a media message such as an RTP message) depends on the channel used to carry the signaling message. For example, if the public route 1904 is used for signaling, the signaling messages will be carried by media packets (e.g., RTP packets). This is referred to as "Signaling (media channel)" in FIG. 25. If the third party IM system is used for signaling, the signaling messages will be carried by IM. This is referred to as "Signaling (IM channel)" in FIG. 25. Accordingly, the public route 1904 is a media route from the perspective of bearer type, but may be both a media route and a signaling route from the perspective of message type. In other words, the public route 1904 may carry both media and signaling, but it carries both as a media bearer channel.

In the present example, the endpoints 104 and 106 each include endpoint functionality for direct communications via the peer-to-peer hybrid network as described previously. The endpoints 104 and 106 also include IM clients 2508 and 2510, respectively, that are compatible with the third party IM system 2502. For example, each endpoint 104 and 106 includes the softswitch 258 that has an IM control module as illustrated in FIG. 2b and this IM control module may include, form, and/or control the IM clients 2508 and 2510. The IM control module may be configured to provide access to the third party IM system 2502 for users of the endpoints 104 and 106. In some embodiments, the IM control module may provide access to multiple third party IM systems. To use the third party IM system 2502, the endpoints 104 and 106 would each select the third party IM system 2502 (if multiple third party IM systems are available for use) and login to the third party IM system 2502. The IM control module would manage the IM session, enabling the endpoints 104 and 106 to use the third party IM system 2502 without actually needing the separate IM client provided by the third party IM system 2502. In other embodiments, the IM control module may control a separate client provided by the third party IM system 2502.

An outside service provider, such as a provider controlling the access server 102 and the client software providing endpoint functionality to the endpoints 104 and 106, may want to provide services to the endpoints 104 and 106 within the third party IM system 2502. However, the services may not be supported by the third party IM system 2502 or use of the services to the outside service provider may be blocked by the third party IM system 2502. Accordingly, the outside service provider may use the available communication channel provided by the instant messaging of the third party IM system 2502 to provide additional services outside of the third party IM system 2502.

Figure 26A:
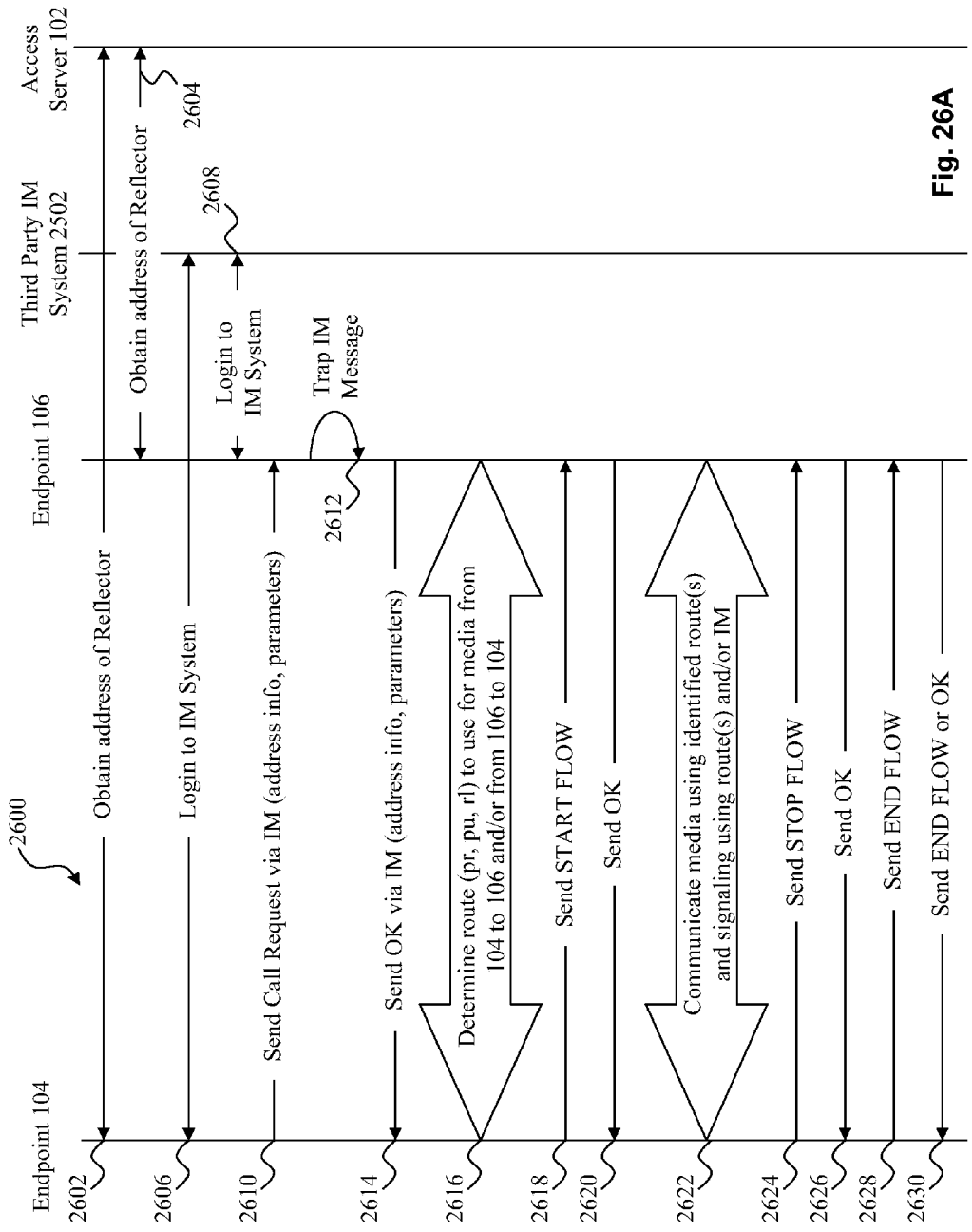
FIG. 26A is a sequence diagram illustrating one embodiment of a message sequence that may occur when two endpoints are communicating within the environment of FIG. 25.

Referring to FIG. 26A, a sequence diagram illustrates one embodiment of a message sequence 2600 that may occur in the environment 2500 of FIG. 25. In the present example, the endpoints 104 and 106 are friends within the third party IM system 2502. The endpoint 104 wants to establish a call with the endpoint 106 using services that are not provided and/or are blocked by the third party IM system 2502. The term "call" as used in the following disclosure may include the transmission and reception of audio, video, and/or data. For example, a call may include one-way or two-way audio or audio/video information that may be streamed or non-streamed, as well as data of various types (e.g., text and/or files). The term "call" may also include multi-party calls, such as conference calls.

In step 2602, the endpoint 104 may contact the access server 102 (FIG. 1) to obtain the address information of a reflector (e.g., the reflector 1002 of FIG. 10). In other embodiments, the endpoint 104 may obtain the address of the reflector 1002 in other ways. Furthermore, the endpoint 104 may be logged into the access server 102 in some embodiments, while it may not be logged into the access server 102 in other embodiments. For example, the access server 102 may be configured to respond to a request for the address information of the reflector 1002 without requiring authentication by the requestor, or the access server 102 may be configured to require authentication prior to responding to the request. Authentication may require that the requestor log into the access server 102 or may simply require that the requestor provide credentials without the need to log in. Similarly, in step 2604, the endpoint 106 may contact the access server 102 to obtain the address information of the reflector 1002.

In step 2606, the endpoint 104 logs into the third party IM system 2502. This may involve sending whatever authentication credentials are required from the endpoint 104 to the third party IM system 2502, such as a user name and a password. The third party IM system 2502 may respond with such information as a friend list that shows the status of various friends of the endpoint 104 within the third party IM system 2502. Similarly, in step 2608, the endpoint 106 logs into the third party IM system 2502 and the third party IM system 2502 may respond with such information as a friend list that shows the status of various friends of the endpoint 106 within the third party IM system 2502. In the present example, the endpoints 104 and 106 are friends within the third party IM system 2502, although they may not be friends if the particular third party IM system 2502 does not require or support friends. It is understood that the login process of steps 2606 and 2608 may vary depending on the particular third party IM system, and that the endpoints 104 and 106 include the functionality needed to login and communicate via the third party IM system 2502.

The third party IM system 2502 views the endpoints 104 and 106 as clients of the third party IM system 2502 and not as peer-to-peer hybrid endpoints as described in the present disclosure. For example, the third party IM system 2502 may not be aware of the endpoints' peer-to-peer hybrid network functionality and instead may be aware only that the endpoints 104 and 106 can communicate with the third party IM system 2502 in the manner required by the third party IM system 2502 and that the endpoints 104 and 106 present proper authentication credentials. Accordingly, the third party IM system 2502 views the login process of steps 2606 and 2608 as a normal process that is performed by clients of the third party IM system 2502.

In step 2610, the endpoint 104 sends a call request to the endpoint 106 using an instant message sent through the third party IM system 2502. In the present example, the call request is for a streaming audio/video connection with the endpoint 106. The call request may include information needed for the endpoint 106 to communicate with the endpoint 104 outside of the third party IM system 2502. Although not shown, the endpoint 104 may have previously performed a STUN request and obtained the public IP address and port information corresponding to the endpoint 104 as previously described. Accordingly, the call request may include the address information of the endpoint 104, such as the public and private (NAT) IP address and port information of the endpoint 104. The call request may also include call parameters such as the type of media for the call (e.g., audio, audio/video, and/or data), codec type, available bandwidth, and other information. It is understood that, if the initial call request message does not include the address information needed to communicate with the endpoint 104 outside of the third party IM system 2502, then a later message may be sent with such information as this information is needed for the call to continue.

In the present example, the request message is encrypted using a public key/private key system or another encryption system prior to being sent, although encryption may not be used in some embodiments. More specifically, an instant message compatible with the third party IM system 2502 may contain required information that is required by the third party IM system 2502 and optional information that represents the text or other data supplied by a user of the third party IM system 2502. For example, the required information may be header information that identifies the sender and destination clients within the third party IM system 2502, while the optional information may be plain text that is to be transported by the instant message. Some or all of the optional information may be encrypted by the endpoint 104. In the present example, the optional information would include the address information of the endpoint 104 and the parameters. The parameters and/or the address information may be encrypted prior to sending the instant message. It is understood that the endpoint 104 may encrypt only those instant messages that are associated with a call and that normal instant messages handled by the endpoint 104 may not be encrypted.

If the endpoint 106 is not an endpoint but is instead a normal client of the third party IM system 2502, the client may display the request message to a user of the client as a meaningless text message. In such cases, there may be no response to the endpoint 104. Accordingly, the call request from the endpoint 104 may time out after the expiration of a predefined amount of time (e.g., thirty seconds) and end the attempt to set up a call. The endpoint 104 may display a message that the endpoint 106 is unavailable or otherwise notify the user of the endpoint 104 that the endpoint 106 is not responding.

In step 2612, the endpoint 104 traps the received instant message. More specifically, the IM control module receives the message and, after decrypting the message if needed, determines that it is a call request rather than a regular text message. It is noted that the encryption itself may trigger the determination that the received instant message is not simply a text message. Although not shown, if the IM control module determines that the received instant message is a regular text message of the kind supported by the third party IM system 2502, it will treat the instant message as simply what it is (i.e., a text message) and display it for the user of the endpoint 106. However, as the instant message contains a call request in the present example, the IM control module will extract the information contained in the instant message and will not display the message to the user. In step 2614, the endpoint 106 sends an instant message to the endpoint 104 approving the call request. This response message may also be encrypted.

In step 2616, the endpoints 104 and 106 determine a route to be used for the media leg of the call. Although the public, private, and relay routes described previously are used in FIG. 26A for purposes of illustration, the route for the media leg may be determined in other ways and may include other routes that are external to the third party IM system 2502. It is understood that the media leg is outside of the third party IM system 2502 and the third party IM system 2502 has no control over the media leg.

In step 2618, the endpoint 104 sends a message using an extended RTP message sent via the media route to the endpoint 106 to start the media flow. Signaling messages between the endpoints 104 and 106 following the initial signaling messages (i.e., the messages of steps 2610 and 2614) may be sent via the third party IM system 2502 and/or the media route(s). In the present example, the signaling messages are sent via the media route(s) as RTP messages that are extended to carry desired information. There may be different extended RTP messages to perform different functions, such as "start flow," "stop flow," "pause," "resume" or "restart," "ok," "end call" or "end flow," and any other desired message types. In the present example, a stop flow message differs from an end flow message in that the stop flow message indicates that the flow is to be stopped temporarily (e.g., put on hold), while the end flow message indicates that the flow is to be terminated.

These extended RTP signaling messages use the media channel to bypass the third party IM system 2502. This outside route avoids flooding the third party IM system 2502 with the relatively high number of messages that may be needed for call setup and call maintenance. It is understood that the third party IM system 2502 may be used as the only signaling channel in some embodiments, although instant messages carrying text commands or other commands would replace the extended RTP messages of the present example. Furthermore, it is understood that other media protocols than RTP may be used to carry signaling information and that RTP messages are used to provide an example of such messages.

In step 2620, the endpoint 106 sends an OK message to the endpoint 104 using an extended RTP message sent via the media route. For purposes of example, the call request is for a streaming audio/video call that streams audio/video information one-way from the endpoint 106 to the endpoint 104. If the audio/video were to also stream from the endpoint 104 to the endpoint 106, as it would for a two-way audio/video call, the endpoint 106 would also send a start flow message to the endpoint 104.

In step 2622, the endpoints 104 and 106 are engaged in the call. As described above, signaling for the call in the present example uses the media route(s) with corresponding media messages (e.g., extended RTP messages), while signaling in other embodiments may use instant messages passed through the third party IM system 2502. Media for the call uses the media route(s) outside of the third party IM system 2502 (e.g., one or more of the private, public, and relay routes). In the present example, all information (both signaling and media) carried on the media route is encrypted. Encryption of any signaling information carried via the third party IM system 2502 may occur as described previously.

It is understood that many messages may be exchanged during the time period covered by step 2622. For example, although not shown, the endpoint 104 may send a pause message and then, at a later time, a resume message. The endpoint 106 may respond to these messages by pausing and then resuming the audio/video stream. Accordingly, using the extended RTP messages, the endpoints 104 and 106 may exert control over the call. Although not shown, one or more other endpoints may be included in the call (e.g., a conference call) and the signaling may also handle the addition and/or removal of the other endpoint(s).

In step 2624, when the endpoint 104 wants to stop the media flow, the endpoint 104 sends a stop flow message to the endpoint 106 via the media route. In step 2626, the endpoint 106 sends an OK message to the endpoint 104 via the media route. In step 2628, the endpoint 104 sends an end flow message to the endpoint 106 to break down the media leg and finish the call. In step 2630, the endpoint 106 sends an end flow message or another message, such as an OK message, to the endpoint 104. This ends the call. After the call is ended, the media leg(s) are terminated and the endpoints 104 and 106 may continue to send instant messages through the third party IM system 2502.

It is understood that various steps may occur in a different order than shown in FIG. 26A. For example, one or both of the endpoints 104 and 106 may obtain the reflector address information after logging in to the third party IM system 2502. In some embodiments, an endpoint may not obtain the reflector information until needed (e.g., until a call is placed that may use the relay route). Furthermore, although not shown, some steps may occur repeatedly. For example, step 2612 may occur each time one of the endpoints 104 and 106 receives an instant message via the third party IM system 2502. Additional steps of encrypting and decrypting may occur each time an instant message that is not a normal text message is sent and received via the third party IM system 2502 in embodiments where encryption is used.

Accordingly, an audio/video call or another type of call may be established using the third party IM system 2502 as an initial signaling channel. This allows an outside service provider to provide services, such as streaming video, to users of the third party IM system 2502 without needed access to proprietary interfaces of the third party IM system 2502. Furthermore, it allows the outside service provider to provide services that may not be available on the third party IM system 2502. For example, if the third party IM system 2502 does not provide video on demand to its users, the outside service provider may do so using the instant messaging signaling and separate media leg(s) described above.

Figure 26B:
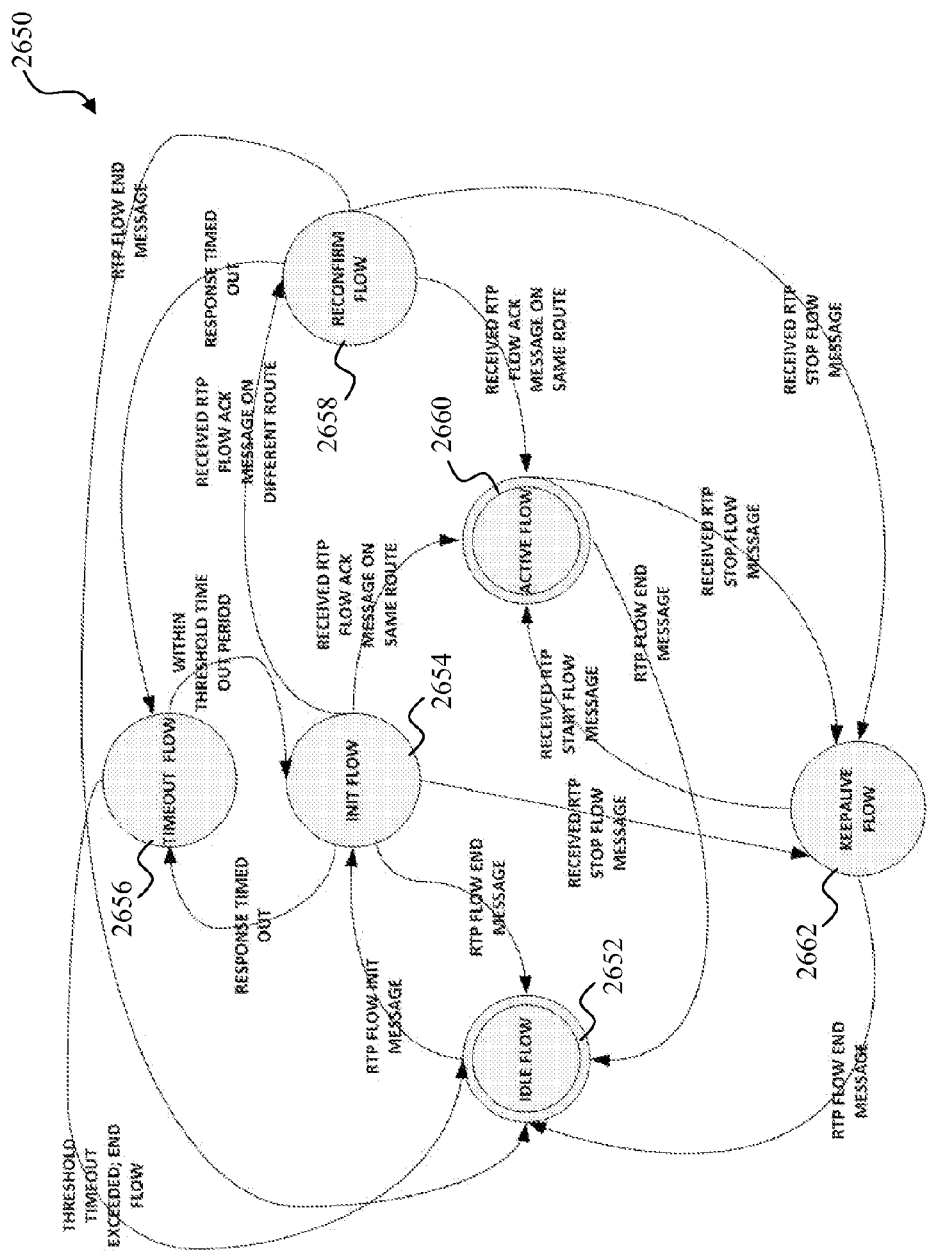
FIG. 26B is a diagram illustrating one embodiment of state changes that may occur in a state machine that is in an endpoint within the environment of FIG. 25.

Referring to FIG. 26B, a state diagram illustrates one embodiment of a state machine 2650 that may be used by the endpoint 104 in the environment of FIG. 25. In the present example, the state machine 2650 may be used to control messages sent via one of the selected private route 1902, public route 1904, and relay route 1906, but it is understood that the state machine 2650 may be associated with any route used by the endpoint 104. The state machine 2650 is used herein to illustrate basic state machine changes that may occur to control RTP messaging within the endpoint 104 and may not reflect an actual implementation within an endpoint. Furthermore, the state machine 2650 in the present example may be used to control the messaging for a single one of the private, public, and relay routes. Accordingly, each route may be associated with its own state machine and these state machines may be running on the endpoint 104 simultaneously to handle the messaging on their respective routes.

The state machine 2650 has six states in the present example: an IDLE FLOW state 2652, an INIT FLOW state 2654, a TIMEOUT FLOW state 2656, a RECONFIRM FLOW state 2658, an ACTIVE FLOW state 2660, and a KEEPALIVE FLOW state 2662. The IDLE FLOW state 2652 and the ACTIVE FLOW state 2660 are operating states (indicated by double concentric circles) and the INIT FLOW state 2654, TIMEOUT FLOW state 2656, RECONFIRM FLOW state 2658, and KEEPALIVE FLOW state 2662 are transitional states (indicated by a single circle).

The state machine 2650 is initially in the IDLE FLOW state 2652. The state machine 2650 remains in the IDLE FLOW state 2652 while no messaging is occurring on its corresponding route. When the endpoint 104 initiates a message sequence, it sends an RTP flow initialization message on the private route 1902, public route 1904, and relay route 1906 as described previously with respect to step 2202 of FIG. 22. For purposes of example, the state machine 2650 is associated with the public route 1904. The flow initialization message transitions the state machine 2650 from the IDLE FLOW state 2652 to the INIT FLOW state 2654.

If the endpoint 104 receives an end flow message while in the INIT FLOW state 2654, the state machine 2650 transitions back to the IDLE FLOW state 2652. The state machine 2650 remains in the IDLE FLOW state 2652 until a message is sent or received on the public route 1904.

While waiting for the response while in the INIT FLOW state 2654, the state machine 2650 transitions to the TIMEOUT FLOW state 2656. The state machine 2650 then transitions from the TIMEOUT FLOW state 2656 back to the INIT FLOW state 2654 if still within a timeout period or if the period is extended. The transitions between the INIT FLOW state 2654 and the TIMEOUT FLOW state 2656 may occur until a timeout occurs or another state transition is triggered. If a timeout occurs, the state machine 2650 transitions from the TIMEOUT FLOW state 2656 to the IDLE FLOW state 2652.

If the endpoint 104 receives an acknowledgement back on a different route (e.g., on the relay route 1906 rather than the public route 1904 as determined in step 2212 of FIG. 22) while in the INIT FLOW state 2654, the INIT FLOW state 2654 transitions to the RECONFIRM FLOW state 2658. While in the RECONFIRM FLOW state 2658, the endpoint 104 sends a confirmation message as described with respect to step 2214 of FIG. 22. If the response times out while the state machine 2650 is in the RECONFIRM FLOW state 2658, the state machine 2650 transitions to the TIMEOUT FLOW state 2656. If the endpoint 104 receives an end flow message while in the RECONFIRM FLOW state 2658, the state machine 2650 transitions to the IDLE FLOW state 2652. If the endpoint 104 receives an acknowledgement on the same route while in the RECONFIRM FLOW state 2658, the state machine 2650 transitions to the ACTIVE FLOW state 2660. If the endpoint 104 receives a stop flow message while in the RECONFIRM FLOW state 2658, the state machine 2650 transitions to the KEEPALIVE FLOW state 2662.

If the endpoint 104 receives an acknowledgement back on the same route while in the INIT FLOW state 2654, the INIT FLOW state 2654 transitions to the ACTIVE FLOW state 2610. While in the ACTIVE FLOW state 2610, the endpoint 104 sends and receives call messages for a call. The state machine 2650 remains in the ACTIVE FLOW state 2660 until a message is received that interrupts the call. If the endpoint 104 receives an end flow message while in the ACTIVE FLOW state 5660, the state machine 2650 transitions to the IDLE FLOW state 2652. If the endpoint 104 receives a stop flow message while in the ACTIVE FLOW state 5660, the state machine 2650 transitions to the KEEPALIVE FLOW state 2662.

If the endpoint 104 receives a stop flow message while in the INIT FLOW state 2654, the state machine 2650 transitions to the KEEPALIVE FLOW state 2662. While in the KEEPALIVE FLOW state 2662, the endpoint 104 will send keep alive messages to the endpoint 106 to keep the connection open (e.g., to maintain a pinhole through a firewall) as described with respect to step 2222 of FIG. 22. If the endpoint 104 receives a start flow message while in the KEEPALIVE FLOW state 2662, the state machine 2650 transitions to the ACTIVE FLOW state 2660. If the endpoint 104 receives an end flow message while in the KEEPALIVE FLOW state 2662, the state machine 2650 transitions to the IDLE FLOW state 2652.

Figure 27:
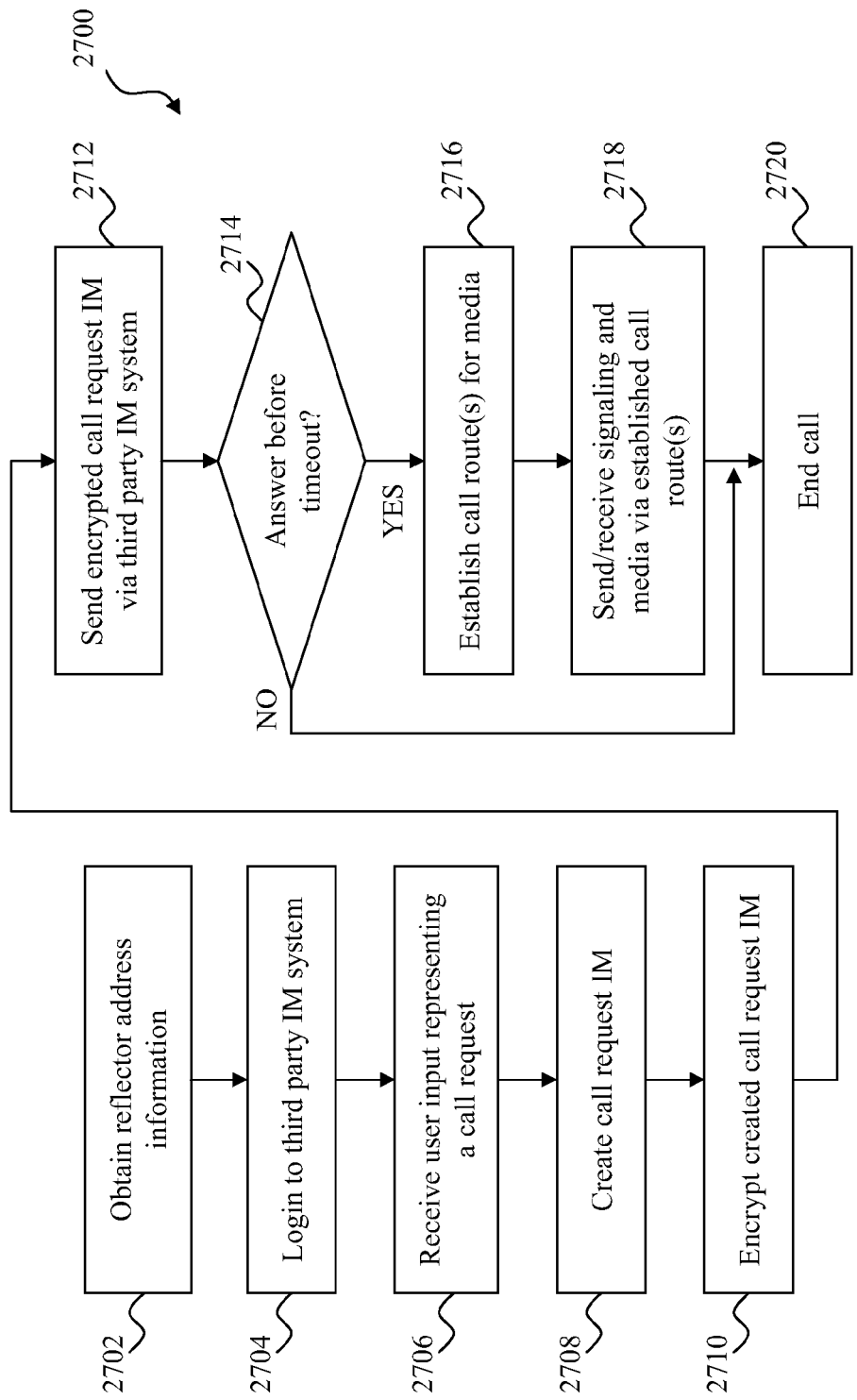
FIG. 27 is a flow chart illustrating one embodiment of a method that may be executed by an endpoint requesting a call within the environment of FIG. 25.

Referring to FIG. 27, a flow chart illustrates one embodiment of a method 2700 that may be used by the endpoint 104 to request a call in the environment of FIG. 25. In the present example, the endpoint 104 is a friend of the endpoint 106 within the third party IM system 2502. Although the call is an audio/video call in the present example, it is understood that it can be any type of call that can be handled by the endpoints 104 and 106.

In step 2702, the endpoint 104 obtains address information for the reflector 1002. Although shown as the first step of the method 2700, step 2702 may occur at any time prior to the need for the address information (e.g., prior to step 2708). In step 2704, the endpoint 104 logs into the third party IM system 2502.

In step 2706, the endpoint 104 receives input representing a call request from a user of the endpoint 104. For example, the user may dial a number associated with the endpoint 106, select the endpoint 106 from a menu or list, or otherwise indicate that the user would like to place the call to the endpoint 106. In the present embodiment, the endpoint 104 recognizes the call request as a request for a call to a client that is currently logged into the third party IM system 2502. In other words, the call request does not identify the endpoint portion of the endpoint 106 as the destination, but instead identifies the IM client 2510 as the destination. In the present embodiment, the endpoint 104 has no knowledge of the endpoint 106 and is not aware that the endpoint 106 has endpoint functionality. Instead, the endpoint 104 views the endpoint 106 only as the IM client 2510 and knows that the IM client 2510 is logged into the third party IM system 2502. Accordingly, the call request is viewed by the endpoint 104 as a request to a client in the third party IM system 2502. It is understood that, in other embodiments, the endpoint 104 may be aware that the IM client 2510 is associated with the endpoint 106 and is therefore tied to endpoint functionality.

In step 2708, the endpoint 104 creates an instant message based on the call request. The instant message may contain header information and a key. In the present example, the header information includes public IP address and port information needed to communicate with the endpoint 104. This public information may be obtained by a STUN request as described in previous embodiments. The header information may also include private (NAT) IP address and port information if applicable. The key represents parameters needed for the call, such as media type, codecs, and similar information.

In step 2710, the endpoint 104 encrypts the created instant message. As described previously, this involves encrypting at least a portion of the optional information in the instant message. In step 2712, the endpoint 104 sends the encrypted instant message to the endpoint 106 via the third party IM system 2502. In step 2714, the endpoint 104 determines whether an answer is received from the endpoint 106 prior to the expiration of a timeout period. The timeout period prevents the endpoint 104 from waiting indefinitely. For example, if the endpoint 106 does not respond or if the endpoint 104 is communicating with a client of the third party IM system 2502 rather than an endpoint, the timeout period ensures that the endpoint 104 ends the call attempt. If there is no answer, the method 2700 moves to step 2720 and ends the call. If there is an answer, the method 2700 moves to step 2716. In step 2716, the endpoints 104 and 106 establish one or more routes for the media leg(s) of the call. For example, the routes may be selected from the public, private, and relay paths described in previous embodiments. The media routes are outside of the third party IM system 2502 and are therefore not limited to text messages.

In step 2718, the call is conducted with signaling and audio/video media going through the selected routes outside of the control of the third party IM system 2502. As described with respect to FIG. 26A, the endpoints 104 and/or 106 may control the call through the use of signaling messages such as pause, resume, and other messages. In other embodiments, at least some of the signaling may occur through the third party IM system 2502 using encrypted instant messages. In step 2720, the call ends.

Figure 28:
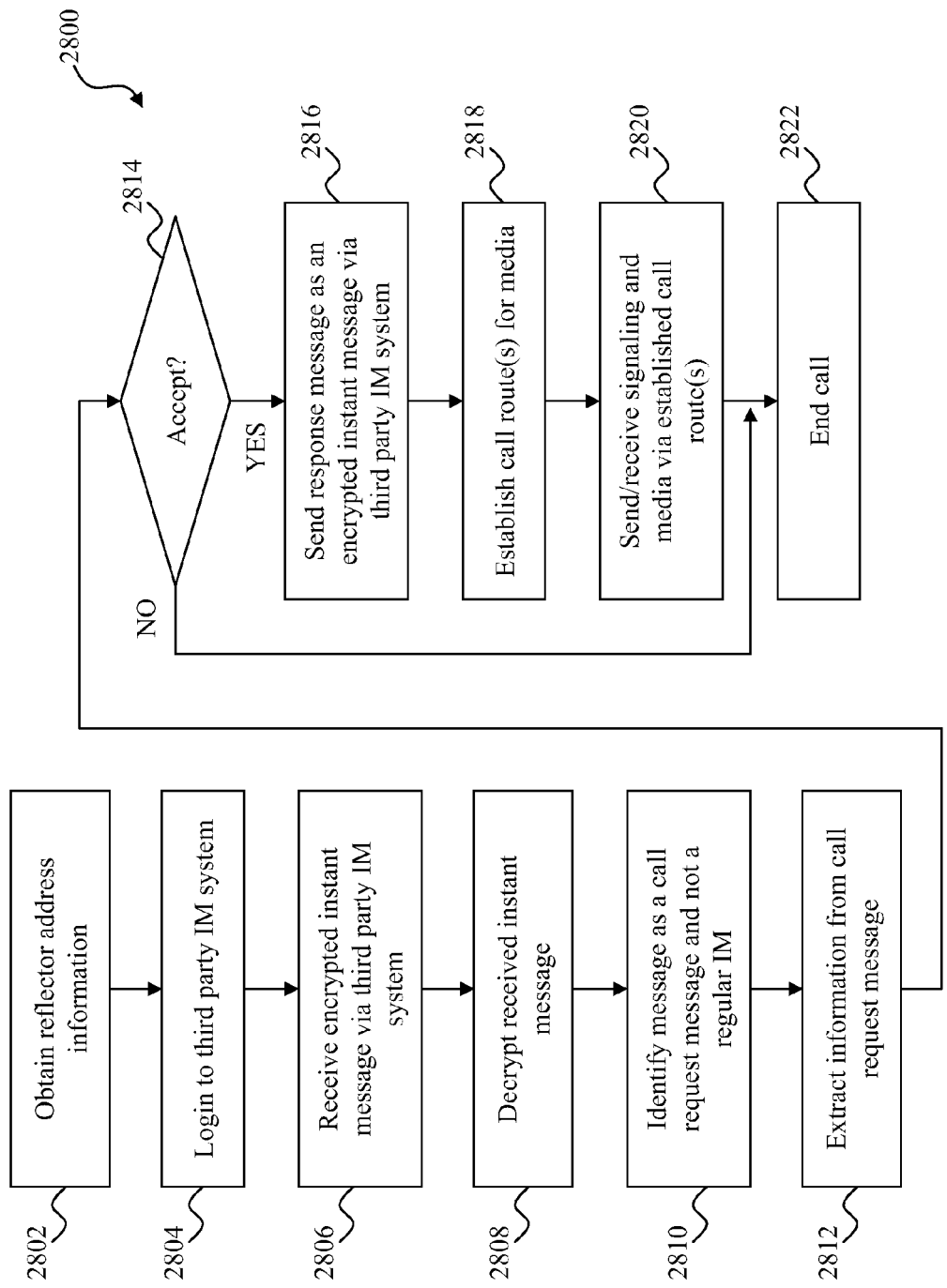
FIG. 28 is a flow chart illustrating one embodiment of a method that may be executed by an endpoint receiving a call request within the environment of FIG. 25.

Referring to FIG. 28, a flow chart illustrates one embodiment of a method 2800 that may be used by the endpoint 106 in receiving a call request in the environment of FIG. 25. In the present example, the endpoint 106 is a friend of the endpoint 104 within the third party IM system 2502. Although the call is an audio/video call in the present example, it is understood that it can be any type of call that can be handled by the endpoints 104 and 106.

In step 2802, the endpoint 106 obtains address information for the reflector 1002. Although shown as the first step of the method 2800, step 2802 may occur at any time prior to the need for the address information (e.g., prior to step 2816). In step 2804, the endpoint 106 logs into the third party IM system 2502. In step 2806, the endpoint 106 receives an encrypted instant message and decrypts the instant message in step 2808. In step 2810, the endpoint 106 identifies the instant message as a request for a call and not a regular instant message. It is understood that step 2810 may be combined with step 2806 in that the receipt of an encrypted instant message may be recognized as a call request rather than a regular instant message.

In step 2612, the endpoint 106 extracts information from the decrypted instant message, such as the address information of the endpoint 104 and any call parameters inserted into the message by the endpoint 104. In step 2614, the endpoint 106 determines whether the call request is to be accepted. For example, the endpoint 106 may display a message to prompt user feedback (e.g., answer or reject the call request) or the endpoint 106 may accept or reject the message based on criteria set forth in a configuration file (e.g., automatically accept the call request if from the endpoint 106). If the call request is not accepted, the method 2800 ends. If the call request is accepted, the method 2800 continues to step 2816.

In step 2816, the endpoint 106 sends a response message to the endpoint 104 via the third party IM system 2502. The response message may be encrypted prior to sending. As described previously, this involves encrypting at least a portion of the optional information in the instant message. In step 2818, the endpoints 104 and 106 establish one or more routes for the media leg(s) of the call. For example, the routes may be selected from the public, private, and relay paths described in previous embodiments. The media routes are outside of the third party IM system 2502 and are therefore not limited to text messages.

In step 2820, the call is conducted with signaling and audio/video media going through the selected routes outside of the control of the third party IM system 2502. As described with respect to FIG. 26A, the endpoints 104 and/or 106 may control the call through the use of signaling messages such as pause, resume, and other messages. In other embodiments, at least some of the signaling may occur through the third party IM system 2502 using encrypted instant messages. In step 2822, the call ends.

Figure 29:
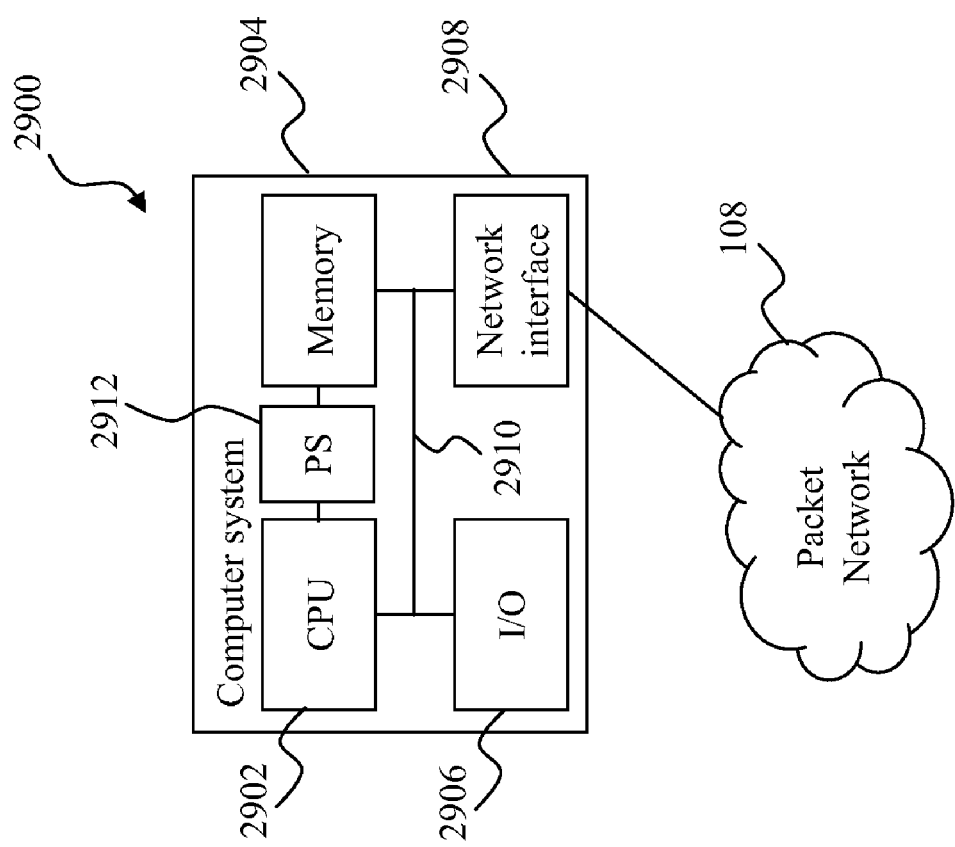
FIG. 29 is a simplified diagram of one embodiment of a computer system that may be used in embodiments of the present disclosure.

Referring to FIG. 29, one embodiment of a computer system 2900 is illustrated. The computer system 2900 is one possible example of a system component or device such as an endpoint or an access server. The computer system 2900 may include a central processing unit ("CPU") 2902, a memory unit 2904, an input/output ("I/O") device 2906, and a network interface 2908. The components 2902, 2904, 2906, and 2908 are interconnected by a transport system (e.g., a bus) 2910. A power supply (PS) 2912 may provide power to components of the computer system 2900, such as the CPU 2902 and memory unit 2904. It is understood that the computer system 2900 may be differently configured and that each of the listed components may actually represent several different components. For example, the CPU 2902 may actually represent a multi-processor or a distributed processing system; the memory unit 2904 may include different levels of cache memory, main memory, hard disks, and remote storage locations; the I/O device 2906 may include monitors, keyboards, and the like; and the network interface 2908 may include one or more network cards providing one or more wired and/or wireless connections to the packet network 108 (FIG. 1). Therefore, a wide range of flexibility is anticipated in the configuration of the computer system 2900.

The computer system 2900 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 2900. The operating system, as well as other instructions (e.g., for the endpoint engine 252 of FIG. 2 if an endpoint), may be stored in the memory unit 2904 and executed by the processor 2902. For example, if the computer system 2900 is the endpoint 104, the memory unit 2904 may include instructions for endpoint functionality and for the IM client 2508. For example, the instructions may include instructions for sending and receiving messages via both a peer-to-peer hybrid network and the third party IM system 2502 to accomplish the method 2700 of FIG. 27 and/or the method 2800 of FIG. 28.

In another embodiment, a method for using a third party instant message system as a signaling channel comprises receiving, by a first endpoint capable of operating within the third party instant message system and also capable of operating within a peer-to-peer hybrid network that is separate from the third party instant message system, user input representing a call request for a call to be placed to a second endpoint that is also capable of operating within the third party instant message system and the peer-to-peer hybrid network; creating, by the first endpoint, a call request message containing address information of the first endpoint, wherein the call request message is an instant message able to sent via the third party instant message system; sending, by the first endpoint, the call request message to the second endpoint via the third party instant messaging system; receiving, by the first endpoint, a response message from the second endpoint via the third party instant message system, wherein the response message contains address information of the second endpoint; establishing, by the first endpoint, at least one media route with the second endpoint to carry media for the call, wherein the at least one media route is established using the peer-to-peer hybrid network and not the third party instant message system; and conducting the call by the first endpoint with the second endpoint, wherein the conducting includes sending and receiving, by the first endpoint, media information for the call via the at least one media route, and sending and receiving, by the first endpoint, signaling information for the call. Sending and receiving the signaling information while conducting the call may include sending and receiving the signaling information using media packets transferred via the at least one media route. The media packets may be real-time transport protocol (RTP) packets created by the first endpoint. Sending and receiving the signaling information while conducting the call may include sending and receiving the signaling information using instant messages transferred via the third party instant message system. The method may further comprise encrypting, by the first endpoint, at least a portion of the call request message prior to sending the call request message to the second endpoint. The method may further comprise obtaining, by the first endpoint, address information for a reflector in the peer-to-peer hybrid network and using, by the first endpoint, the reflector to establish the at least one media route. The method may further comprise logging in to the peer-to-peer network before obtaining the address information for the reflector. The call request message may further include at least one parameter for the call. The method may further comprise determining, by the first endpoint, whether a timeout has occurred after sending the call request message to the second endpoint, wherein the timeout prevents the first endpoint from waiting indefinitely for the response message from the second endpoint if the second endpoint is not an endpoint within the peer-to-peer hybrid network.

In yet another embodiment, a method for using a third party instant message system as a signaling channel comprises receiving, by a first endpoint capable of operating within the third party instant message system and also capable of operating within a peer-to-peer hybrid network that is separate from the third party instant message system, a call request message for a call from a second endpoint that is also capable of operating within the third party instant message system and the peer-to-peer hybrid network, wherein the call request message is an instant message received via the third party instant message system; identifying, by the first endpoint, that the call request message contains a request for the call prior to sending the call request message to a user display associated with the third party instant message system, wherein the identifying prevents the call request message from being displayed to the user; extracting address information of the second endpoint from the call request message; sending, by the first endpoint, a response message to the second endpoint, wherein the response message contains address information of the first endpoint; establishing, by the first endpoint, at least one media route with the second endpoint to carry media for the call, wherein the at least one media route is established using the peer-to-peer hybrid network and not the third party instant message system; and conducting the call by the first endpoint with the second endpoint, wherein the conducting includes sending and receiving, by the first endpoint, media information for the call via the at least one media route, and sending and receiving, by the first endpoint, signaling information for the call. The sending and receiving the signaling information while conducting the call may include sending and receiving the signaling information using media packets transferred via the at least one media route. The media packets may be real-time transport protocol (RTP) packets created by the first endpoint. The sending and receiving the signaling information while conducting the call may include sending and receiving the signaling information using instant messages transferred via the third party instant message system. The method may further comprise decrypting, by the first endpoint, at least a portion of the call request message prior to extracting the address information. The method may further comprise obtaining, by the first endpoint, address information for a reflector in the peer-to-peer hybrid network and using, by the first endpoint, the reflector to establish the at least one media route. The method may further comprise extracting, by the first endpoint, at least one parameter for the call from the call request message. The method may further comprise prompting, by the first endpoint, a user of the first endpoint to accept or reject the request for the call, wherein the prompting occurs via at least one of a display visible to the user, a speaker audible to the user, or a vibrating mechanism that can be felt by the user.

In still another embodiment, a system comprises a network interface; a processor coupled to the network interface; and a memory coupled to the processor and containing a plurality of instructions for execution by the processor, the instructions including instructions for a first endpoint configured to operate within a peer-to-peer hybrid network, the first endpoint including a client of a third party instant message system that enables the first endpoint to communicate via the third party instant message system, the instructions for the first endpoint including instructions for: receiving, by the first endpoint, user input representing a call request for a call to be placed to a second endpoint that is also capable of operating within the third party instant message system and the peer-to-peer hybrid network; creating, by the first endpoint, a call request message containing address information of the first endpoint, wherein the call request message is an instant message able to sent via the third party instant message system; sending, by the first endpoint, the call request message to the second endpoint via the third party instant messaging system; receiving, by the first endpoint, a response message from the second endpoint via the third party instant message system, wherein the response message contains address information of the second endpoint; establishing, by the first endpoint, at least one media route with the second endpoint to carry media for the call, wherein the at least one media route is established using the peer-to-peer hybrid network and not the third party instant message system; and conducting the call by the first endpoint with the second endpoint, wherein the conducting includes sending and receiving, by the first endpoint, media information for the call via the at least one media route, and sending and receiving, by the first endpoint, signaling information for the call. The instructions for sending and receiving the signaling information while conducting the call may include instructions for sending and receiving the signaling information using media packets transferred via the at least one media route. The media packets may be real-time transport protocol (RTP) packets. The instructions for sending and receiving the signaling information while conducting the call may include instructions for sending and receiving the signaling information using instant messages transferred via the third party instant message system. The system may further comprise instructions for encrypting at least a portion of the call request message. The system may further comprise instructions for obtaining address information for a reflector in the peer-to-peer hybrid network, wherein the reflector is used to establish the at least one media route. The system may further comprise instructions for logging in to the peer-to-peer network before obtaining the address information for the reflector.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Some steps may be performed in an order different from that shown and/or may overlap. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for using a third party instant message system as a signaling channel comprising:
   receiving, by a first endpoint capable of operating within the third party instant message system and also capable of operating within a peer-to-peer hybrid network that is separate from the third party instant message system, user input representing a call request for a call to be placed to a second endpoint that is also capable of operating within the third party instant message system and the peer-to-peer hybrid network;

creating, by the first endpoint, a call request message containing address information of the first endpoint, wherein the call request message is an instant message able to sent via the third party instant message system;

sending, by the first endpoint, the call request message to the second endpoint via the third party instant messaging system;

receiving, by the first endpoint, a response message from the second endpoint via the third party instant message system, wherein the response message contains address information of the second endpoint;

establishing, by the first endpoint, at least one media route with the second endpoint to carry media for the call, wherein the at least one media route is established using the peer-to-peer hybrid network and not the third party instant message system; and conducting the call by the first endpoint with the second endpoint, wherein the conducting includes sending and receiving, by the first endpoint, media information for the call via the at least one media route, and sending and receiving, by the first endpoint, signaling information for the call.

2. The method of claim 1 wherein sending and receiving the signaling information while conducting the call includes sending and receiving the signaling information using media packets transferred via the at least one media route.

3. The method of claim 2 wherein the media packets are real-time transport protocol (RTP) packets created by the first endpoint.

4. The method of claim 1 wherein sending and receiving the signaling information while conducting the call includes sending and receiving the signaling information using instant messages transferred via the third party instant message system.

5. The method of claim 1 further comprising encrypting, by the first endpoint, at least a portion of the call request message prior to sending the call request message to the second endpoint.

6. The method of claim 1 further comprising:
obtaining, by the first endpoint, address information for a reflector in the peer-to-peer hybrid network; and
using, by the first endpoint, the reflector to establish the at least one media route.

7. The method of claim 6 further comprising logging in to the peer-to-peer network before obtaining the address information for the reflector.

8. The method of claim 1 wherein the call request message further includes at least one parameter for the call.

9. The method of claim 1 further comprising determining, by the first endpoint, whether a timeout has occurred after sending the call request message to the second endpoint, wherein the timeout prevents the first endpoint from waiting indefinitely for the response message from the second endpoint if the second endpoint is not an endpoint within the peer-to-peer hybrid network.

10. A method for using a third party instant message system as a signaling channel comprising:
receiving, by a first endpoint capable of operating within the third party instant message system and also capable of operating within a peer-to-peer hybrid network that is separate from the third party instant message system, a call request message for a call from a second endpoint that is also capable of operating within the third party instant message system and the peer-to-peer hybrid network, wherein the call request message is an instant message received via the third party instant message system;

identifying, by the first endpoint, that the call request message contains a request for the call prior to sending the call request message to a user display associated with the third party instant message system, wherein the identifying prevents the call request message from being displayed to the user;

extracting address information of the second endpoint from the call request message;

sending, by the first endpoint, a response message to the second endpoint, wherein the response message contains address information of the first endpoint;

establishing, by the first endpoint, at least one media route with the second endpoint to carry media for the call, wherein the at least one media route is established using the peer-to-peer hybrid network and not the third party instant message system; and conducting the call by the first endpoint with the second endpoint, wherein the conducting includes sending and receiving, by the first endpoint, media information for the call via the at least one media route, and sending and receiving, by the first endpoint, signaling information for the call.

11. The method of claim 10 wherein sending and receiving the signaling information while conducting the call includes sending and receiving the signaling information using media packets transferred via the at least one media route.

12. The method of claim 11 wherein the media packets are real-time transport protocol (RTP) packets created by the first endpoint.

13. The method of claim 10 wherein sending and receiving the signaling information while conducting the call includes sending and receiving the signaling information using instant messages transferred via the third party instant message system.

14. The method of claim 10 further comprising decrypting, by the first endpoint, at least a portion of the call request message prior to extracting the address information.

15. The method of claim 10 further comprising:
obtaining, by the first endpoint, address information for a reflector in the peer-to-peer hybrid network; and
using, by the first endpoint, the reflector to establish the at least one media route.

16. The method of claim 10 further comprising extracting, by the first endpoint, at least one parameter for the call from the call request message.

17. The method of claim 10 further comprising prompting, by the first endpoint, a user of the first endpoint to accept or reject the request for the call, wherein the prompting occurs via at least one of a display visible to the user, a speaker audible to the user, or a vibrating mechanism that can be felt by the user.

18. A system comprising:
a network interface;
a processor coupled to the network interface; and
a memory coupled to the processor and containing a plurality of instructions for execution by the processor, the instructions including instructions for a first endpoint configured to operate within a peer-to-peer hybrid network, the first endpoint including a client of a third party instant message system that enables the first endpoint to communicate via the third party instant message system, the instructions for the first endpoint including instructions for:
receiving, by the first endpoint, user input representing a call request for a call to be placed to a second endpoint that is also capable of operating within the third party instant message system and the peer-to-peer hybrid network;

creating, by the first endpoint, a call request message containing address information of the first endpoint, wherein the call request message is an instant message able to sent via the third party instant message system;

sending, by the first endpoint, the call request message to the second endpoint via the third party instant messaging system;

receiving, by the first endpoint, a response message from the second endpoint via the third party instant message system, wherein the response message contains address information of the second endpoint;

establishing, by the first endpoint, at least one media route with the second endpoint to carry media for the call, wherein the at least one media route is established using the peer-to-peer hybrid network and not the third party instant message system; and conducting the call by the first endpoint with the second endpoint, wherein the conducting includes sending and receiving, by the first endpoint, media information for the call via the at least one media route, and sending and receiving, by the first endpoint, signaling information for the call.

19. The system of claim 18 wherein the instructions for sending and receiving the signaling information while conducting the call include instructions for sending and receiving the signaling information using media packets transferred via the at least one media route.

20. The system of claim 19 wherein the media packets are real-time transport protocol (RTP) packets.

21. The system of claim 18 wherein the instructions for sending and receiving the signaling information while conducting the call include instructions for sending and receiving the signaling information using instant messages transferred via the third party instant message system.

22. The system of claim 18 further comprising instructions for encrypting at least a portion of the call request message.

23. The system of claim 18 further comprising instructions for obtaining address information for a reflector in the peer-to-peer hybrid network, wherein the reflector is used to establish the at least one media route.

24. The system of claim 23 further comprising instructions for logging in to the peer-to-peer network before obtaining the address information for the reflector.

* * * * *